(12) United States Patent
Ohta

(10) Patent No.: US 8,041,536 B2
(45) Date of Patent: Oct. 18, 2011

(54) INCLINATION CALCULATION APPARATUS AND INCLINATION CALCULATION PROGRAM, AND GAME APPARATUS AND GAME PROGRAM

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 12/835,355

(22) Filed: Jul. 13, 2010

(65) Prior Publication Data
US 2010/0309117 A1   Dec. 9, 2010

Related U.S. Application Data

(60) Continuation of application No. 11/764,409, filed on Jun. 18, 2007, now Pat. No. 7,877,224, which is a division of application No. 11/408,071, filed on Apr. 21, 2006, now Pat. No. 7,596,466.

(30) Foreign Application Priority Data

Mar. 28, 2006   (JP) ................................. 2006-087160

(51) Int. Cl.
*G01C 9/00*   (2006.01)
(52) U.S. Cl. ........................................................ 702/152
(58) Field of Classification Search .................. 702/152, 702/154
See application file for complete search history.

(56) References Cited

U.S. PATENT DOCUMENTS

| | | | |
|---|---|---|---|
| 3,474,241 A | 10/1969 | Kuipers | |
| 3,660,648 A | 5/1972 | Kuipers | |
| 4,038,876 A | 8/1977 | Morris | |
| 4,402,250 A | 9/1983 | Baasch | |
| 4,558,604 A | 12/1985 | Auer | |
| 4,578,674 A | 3/1986 | Baker et al. | |
| 4,623,930 A | 11/1986 | Oshima et al. | |
| 4,787,051 A | 11/1988 | Olson | |
| 4,839,838 A | 6/1989 | LaBiche et al. | |
| 4,961,369 A | 10/1990 | McGill | |
| 5,045,843 A | 9/1991 | Hansen | |
| 5,059,958 A | 10/1991 | Jacobs et al. | |

(Continued)

FOREIGN PATENT DOCUMENTS
DE   03930581   3/1991
(Continued)

OTHER PUBLICATIONS

U.S. Appl. No. 11/408,071 and its prosecution history including Jun. 18, 2007 Amendment and Apr. 25, 2007 Office Action.

(Continued)

*Primary Examiner* — Drew A Dunn
*Assistant Examiner* — Stephen Cherry
(74) *Attorney, Agent, or Firm* — Nixon & Vanderhye P.C.

(57) ABSTRACT

An inclination calculation apparatus calculates an inclination of an input device operable in terms of a posture thereof. The input device includes an acceleration sensor and an imaging element. In one non-limiting example implementation, the inclination calculation apparatus computes first inclination information representing an inclination of the input device based upon a coordinate position of an imaging target in an acquired image obtained by the imaging element and an estimated coordinate position of a second imaging target not acquired by the imaging element. The inclination calculation apparatus also computes second inclination information representing an inclination of the input device solely from an acceleration detected by the acceleration sensor. The inclination calculation apparatus then calculates an inclination of the input device using the first inclination information and the second inclination information.

2 Claims, 18 Drawing Sheets

U.S. PATENT DOCUMENTS

| | | |
|---|---|---|
| 5,062,696 A | 11/1991 | Oshima et al. |
| 5,128,671 A | 7/1992 | Thomas, Jr. |
| 5,138,154 A | 8/1992 | Hotelling |
| 5,181,181 A | 1/1993 | Glynn |
| D342,256 S | 12/1993 | Payne |
| 5,280,744 A | 1/1994 | DeCarlo et al. |
| 5,329,276 A | 7/1994 | Hirabayashi |
| 5,359,348 A | 10/1994 | Pilcher et al. |
| 5,369,889 A | 12/1994 | Callaghan |
| 5,373,857 A | 12/1994 | Travers et al. |
| 5,396,265 A | 3/1995 | Ulrich et al. |
| 5,421,590 A | 6/1995 | Robbins |
| 5,430,435 A | 7/1995 | Hoch et al. |
| 5,440,326 A | 8/1995 | Quinn |
| 5,453,758 A | 9/1995 | Sato |
| 5,459,489 A | 10/1995 | Redford |
| 5,481,957 A | 1/1996 | Paley et al. |
| 5,484,355 A | 1/1996 | King, II et al. |
| 5,485,171 A | 1/1996 | Copper et al. |
| 5,506,605 A | 4/1996 | Paley |
| 5,554,033 A | 9/1996 | Bizzi |
| 5,573,011 A | 11/1996 | Felsing |
| 5,574,479 A | 11/1996 | Odell |
| 5,587,558 A | 12/1996 | Matsushima |
| 5,598,187 A | 1/1997 | Ide et al. |
| 5,602,569 A | 2/1997 | Kato |
| 5,605,505 A | 2/1997 | Han |
| 5,615,132 A | 3/1997 | Horton et al. |
| 5,627,565 A | 5/1997 | Morishita et al. |
| 5,640,152 A | 6/1997 | Copper |
| 5,645,077 A | 7/1997 | Foxlin et al. |
| 5,679,004 A | 10/1997 | McGowan et al. |
| 5,698,784 A | 12/1997 | Hotelling et al. |
| 5,703,623 A | 12/1997 | Hall et al. |
| 5,745,226 A | 4/1998 | Gigioli, Jr. |
| 5,757,360 A | 5/1998 | Nitta et al. |
| 5,794,081 A | 8/1998 | Itoh et al. |
| 5,796,354 A | 8/1998 | Cartabiano et al. |
| 5,807,284 A | 9/1998 | Foxlin |
| 5,819,206 A | 10/1998 | Horton |
| 5,820,462 A | 10/1998 | Yokoi et al. |
| 5,822,713 A | 10/1998 | Profeta |
| 5,825,350 A | 10/1998 | Case, Jr. et al. |
| 5,835,077 A | 11/1998 | Dao |
| 5,835,156 A | 11/1998 | Blonstein et al. |
| 5,850,624 A | 12/1998 | Gard et al. |
| 5,867,146 A | 2/1999 | Kim et al. |
| 5,875,257 A | 2/1999 | Marrin et al. |
| 5,897,437 A | 4/1999 | Nishiumi et al. |
| 5,898,421 A | 4/1999 | Quinn |
| 5,902,968 A | 5/1999 | Sato et al. |
| 5,912,612 A | 6/1999 | DeVolpi |
| 5,955,988 A | 9/1999 | Blonstein et al. |
| 5,956,035 A | 9/1999 | Scianmanella et al. |
| 5,986,644 A | 11/1999 | Herder et al. |
| 6,002,394 A | 12/1999 | Schein et al. |
| 6,013,007 A | 1/2000 | Root et al. |
| 6,016,144 A | 1/2000 | Blonstein et al. |
| 6,044,297 A | 3/2000 | Sheldon et al. |
| 6,049,823 A | 4/2000 | Hwang |
| 6,052,083 A | 4/2000 | Wilson |
| 6,059,576 A | 5/2000 | Brann |
| 6,069,594 A | 5/2000 | Barnes et al. |
| 6,072,467 A | 6/2000 | Walker |
| 6,084,577 A | 7/2000 | Sato et al. |
| 6,110,039 A | 8/2000 | Oh |
| 6,115,028 A | 9/2000 | Balakrishnan |
| 6,148,100 A | 11/2000 | Anderson et al. |
| 6,155,926 A | 12/2000 | Miyamoto et al. |
| 6,162,191 A | 12/2000 | Foxlin |
| 6,164,808 A | 12/2000 | Shibata et al. |
| 6,176,837 B1 | 1/2001 | Foxlin |
| 6,181,329 B1 | 1/2001 | Stork et al. |
| 6,184,863 B1 | 2/2001 | Sibert et al. |
| 6,191,774 B1 | 2/2001 | Schena et al. |
| 6,198,471 B1 | 3/2001 | Cook |
| 6,200,253 B1 | 3/2001 | Nishiumi et al. |
| 6,222,525 B1 | 4/2001 | Armstrong |
| 6,239,806 B1 | 5/2001 | Nishiumi et al. |
| 6,241,611 B1 | 6/2001 | Takeda et al. |
| 6,243,658 B1 | 6/2001 | Raby |
| 6,244,987 B1 | 6/2001 | Ohsuga et al. |
| 6,264,558 B1 | 7/2001 | Nishiumi et al. |
| 6,304,250 B1 | 10/2001 | Yang et al. |
| 6,312,335 B1 | 11/2001 | Tosaki et al. |
| 6,331,856 B1 | 12/2001 | Van Hook et al. |
| 6,344,791 B1 | 2/2002 | Armstrong |
| 6,351,205 B1 | 2/2002 | Armstrong |
| 6,361,507 B1 | 3/2002 | Foxlin |
| 6,369,794 B1 | 4/2002 | Sakurai et al. |
| 6,375,572 B1 | 4/2002 | Masuyama et al. |
| 6,377,793 B1 | 4/2002 | Jenkins |
| 6,377,906 B1 | 4/2002 | Rowe |
| 6,400,996 B1 | 6/2002 | Hoffberg et al. |
| 6,409,687 B1 | 6/2002 | Foxlin |
| 6,415,223 B1 | 7/2002 | Lin et al. |
| 6,421,056 B1 | 7/2002 | Nishiumi et al. |
| 6,424,333 B1 | 7/2002 | Tremblay |
| 6,466,198 B1 | 10/2002 | Feinstein |
| 6,466,831 B1 | 10/2002 | Shibata et al. |
| 6,473,713 B1 | 10/2002 | McCall et al. |
| 6,474,159 B1 | 11/2002 | Foxlin et al. |
| 6,492,981 B1 | 12/2002 | Stork et al. |
| 6,517,438 B2 | 2/2003 | Tosaki et al. |
| 6,544,126 B2 | 4/2003 | Sawano et al. |
| 6,545,661 B1 | 4/2003 | Goschy et al. |
| 6,563,415 B2 | 5/2003 | Armstrong |
| 6,567,536 B2 | 5/2003 | McNitt et al. |
| 6,577,350 B1 | 6/2003 | Proehl et al. |
| 6,582,380 B2 | 6/2003 | Kazlausky et al. |
| 6,590,536 B1 | 7/2003 | Walton |
| 6,597,443 B2 | 7/2003 | Boman |
| 6,599,194 B1 | 7/2003 | Smith et al. |
| 6,609,977 B1 | 8/2003 | Shimizu et al. |
| 6,616,607 B2 | 9/2003 | Hashimoto et al. |
| 6,636,826 B1 | 10/2003 | Abe et al. |
| 6,650,313 B2 | 11/2003 | Levine et al. |
| 6,672,962 B1 | 1/2004 | Ozaki et al. |
| 6,676,520 B2 | 1/2004 | Nishiumi |
| 6,679,776 B1 | 1/2004 | Nishiumi et al. |
| 6,681,629 B2 | 1/2004 | Foxlin et al. |
| 6,686,954 B1 | 2/2004 | Kitaguchi et al. |
| 6,712,692 B2 | 3/2004 | Basson et al. |
| 6,717,573 B1 | 4/2004 | Shahoian et al. |
| 6,725,173 B2 | 4/2004 | An et al. |
| 6,747,632 B2 | 6/2004 | Howard |
| 6,747,690 B2 | 6/2004 | Mølgaard |
| 6,753,849 B1 | 6/2004 | Curran et al. |
| 6,757,068 B2 | 6/2004 | Foxlin |
| 6,757,446 B1 | 6/2004 | Li et al. |
| 6,786,877 B2 | 9/2004 | Foxlin |
| 6,811,489 B1 | 11/2004 | Shimizu et al. |
| 6,813,584 B2 | 11/2004 | Zhou et al. |
| 6,836,971 B1 | 1/2005 | Wan |
| 6,842,991 B2 | 1/2005 | Levi et al. |
| 6,850,844 B1 | 2/2005 | Walters et al. |
| 6,872,139 B2 | 3/2005 | Sato et al. |
| 6,873,406 B1 | 3/2005 | Hines et al. |
| 6,906,700 B1 | 6/2005 | Armstrong |
| 6,908,388 B2 | 6/2005 | Shimizu et al. |
| 6,922,632 B2 | 7/2005 | Foxlin |
| 6,929,548 B2 | 8/2005 | Wang |
| 6,933,923 B2 | 8/2005 | Feinstein |
| 6,982,697 B2 | 1/2006 | Wilson et al. |
| 6,984,208 B2 | 1/2006 | Zheng |
| 6,990,639 B2 | 1/2006 | Wilson |
| 6,998,966 B2 | 2/2006 | Pedersen et al. |
| 7,000,469 B2 | 2/2006 | Foxlin et al. |
| 7,002,591 B1 | 2/2006 | Leather et al. |
| 7,031,875 B2 | 4/2006 | Ellenby et al. |
| 7,098,891 B1 | 8/2006 | Pryor |
| 7,098,894 B2 | 8/2006 | Yang et al. |
| 7,102,616 B1 | 9/2006 | Sleator |
| 7,107,168 B2 | 9/2006 | Oystol et al. |
| 7,126,584 B1 | 10/2006 | Nishiumi et al. |
| 7,127,370 B2 | 10/2006 | Kelly et al. |
| 7,139,983 B2 | 11/2006 | Kelts |

| | | |
|---|---|---|
| 7,149,627 B2 | 12/2006 | Ockerse et al. |
| 7,154,475 B2 | 12/2006 | Crew |
| 7,158,118 B2 | 1/2007 | Liberty |
| 7,173,604 B2 | 2/2007 | Marvit et al. |
| 7,176,919 B2 | 2/2007 | Drebin et al. |
| 7,182,691 B1 | 2/2007 | Schena |
| 7,183,480 B2 | 2/2007 | Nishitani et al. |
| 7,184,059 B1 | 2/2007 | Fouladi et al. |
| 7,220,220 B2 | 5/2007 | Stubbs et al. |
| 7,231,063 B2 | 6/2007 | Naimark et al. |
| 7,236,156 B2 | 6/2007 | Liberty et al. |
| 7,239,301 B2 | 7/2007 | Liberty et al. |
| 7,262,760 B2 | 8/2007 | Liberty |
| 7,292,151 B2 | 11/2007 | Ferguson et al. |
| 7,301,527 B2 | 11/2007 | Marvit |
| 7,301,648 B2 | 11/2007 | Foxlin |
| 7,335,134 B1 | 2/2008 | LaVelle |
| 7,395,181 B2 | 7/2008 | Foxlin |
| 7,414,611 B2 | 8/2008 | Liberty |
| 7,445,550 B2 | 11/2008 | Barney et al. |
| 2002/0024500 A1 | 2/2002 | Howard |
| 2002/0028071 A1 | 3/2002 | Mølgaard |
| 2002/0072418 A1 | 6/2002 | Masuyama et al. |
| 2002/0075335 A1 | 6/2002 | Rekimoto |
| 2002/0140666 A1 | 10/2002 | Bradski |
| 2002/0140745 A1 | 10/2002 | Ellenby et al. |
| 2002/0158843 A1 | 10/2002 | Levine et al. |
| 2003/0038778 A1 | 2/2003 | Noguera et al. |
| 2003/0063068 A1 | 4/2003 | Anton et al. |
| 2003/0073492 A1 | 4/2003 | Tosaki et al. |
| 2003/0107551 A1 | 6/2003 | Dunker |
| 2003/0193572 A1 | 10/2003 | Wilson et al. |
| 2003/0204361 A1 | 10/2003 | Townsend et al. |
| 2003/0216176 A1 | 11/2003 | Shimizu et al. |
| 2003/0222851 A1 | 12/2003 | Lai et al. |
| 2004/0028258 A1 | 2/2004 | Naimark et al. |
| 2004/0070564 A1 | 4/2004 | Dawson |
| 2004/0075650 A1 | 4/2004 | Paul et al. |
| 2004/0095317 A1 | 5/2004 | Zhang et al. |
| 2004/0134341 A1 | 7/2004 | Sandoz et al. |
| 2004/0140954 A1 | 7/2004 | Faeth |
| 2004/0143413 A1 | 7/2004 | Oystol et al. |
| 2004/0193413 A1 | 9/2004 | Wilson et al. |
| 2004/0204240 A1 | 10/2004 | Barney |
| 2004/0218104 A1 | 11/2004 | Smith et al. |
| 2004/0222969 A1 | 11/2004 | Buchenrieder |
| 2004/0227725 A1 | 11/2004 | Calarco et al. |
| 2004/0229693 A1 | 11/2004 | Lind et al. |
| 2004/0239626 A1 | 12/2004 | Noguera |
| 2004/0259651 A1 | 12/2004 | Storek |
| 2004/0268393 A1 | 12/2004 | Hunleth et al. |
| 2005/0020369 A1 | 1/2005 | Davis et al. |
| 2005/0054457 A1 | 3/2005 | Eyestone et al. |
| 2005/0076161 A1 | 4/2005 | Albanna et al. |
| 2005/0125826 A1 | 6/2005 | Hunleth et al. |
| 2005/0174324 A1 | 8/2005 | Liberty et al. |
| 2005/0212752 A1 | 9/2005 | Marvit et al. |
| 2005/0212767 A1 | 9/2005 | Marvit et al. |
| 2005/0243061 A1 | 11/2005 | Liberty et al. |
| 2005/0253806 A1 | 11/2005 | Liberty et al. |
| 2005/0256675 A1 | 11/2005 | Kurata |
| 2006/0028446 A1 | 2/2006 | Liberty et al. |
| 2006/0092133 A1 | 5/2006 | Touma et al. |
| 2006/0148563 A1 | 7/2006 | Yang |
| 2006/0152487 A1 | 7/2006 | Grunnet-Jepsen et al. |
| 2006/0152488 A1 | 7/2006 | Salsman et al. |
| 2006/0152489 A1 | 7/2006 | Sweetser et al. |
| 2006/0178212 A1 | 8/2006 | Penzias |
| 2006/0256081 A1 | 11/2006 | Zalewski et al. |
| 2006/0264260 A1 | 11/2006 | Zalewski et al. |
| 2006/0282873 A1 | 12/2006 | Zalewski et al. |
| 2006/0287086 A1 | 12/2006 | Zalewski et al. |
| 2006/0287087 A1 | 12/2006 | Zalewski et al. |
| 2007/0252815 A1 | 11/2007 | Kuo et al. |
| 2007/0265076 A1 | 11/2007 | Lin et al. |
| 2008/0273011 A1 | 11/2008 | Lin |
| 2008/0278445 A1 | 11/2008 | Sweetser et al. |

FOREIGN PATENT DOCUMENTS

| | | |
|---|---|---|
| DE | 19701344 | 7/1997 |
| DE | 19701374 | 7/1997 |
| DE | 19648487 | 6/1998 |
| DE | 19814254 | 10/1998 |
| DE | 19937307 | 2/2000 |
| DE | 10029173 | 1/2002 |
| DE | 10241392 | 5/2003 |
| DE | 10219198 | 11/2003 |
| EP | 0 852 961 A1 | 7/1998 |
| EP | 1287 864 A2 | 3/2003 |
| GB | 1524334 | 9/1978 |
| GB | 2284478 | 6/1995 |
| GB | 2307133 | 5/1997 |
| GB | 2316482 | 2/1998 |
| GB | 2319374 | 5/1998 |
| JP | 3-059619 | 11/1991 |
| JP | 2901476 | 12/1993 |
| JP | 3262677 | 5/1994 |
| JP | 3194841 | 10/1994 |
| JP | 6-308879 | 11/1994 |
| JP | 3273531 | 11/1994 |
| JP | 7-028591 | 1/1995 |
| JP | 3228845 | 1/1995 |
| JP | 7-146123 | 6/1995 |
| JP | 3517482 | 6/1995 |
| JP | 7-200142 | 8/1995 |
| JP | 7-302148 | 11/1995 |
| JP | 7-318332 | 12/1995 |
| JP | 8-095704 | 4/1996 |
| JP | 8-106352 | 4/1996 |
| JP | 8-114815 | 5/1996 |
| JP | 8-122070 | 5/1996 |
| JP | 8-152959 | 6/1996 |
| JP | 8-211993 | 8/1996 |
| JP | 8-335136 | 12/1996 |
| JP | 9-230997 | 9/1997 |
| JP | 9-274534 | 10/1997 |
| JP | 9-319510 | 12/1997 |
| JP | 10-154038 | 6/1998 |
| JP | 10-214155 | 8/1998 |
| JP | 2000-270237 | 9/2000 |
| JP | 2000-308756 | 11/2000 |
| JP | 2001-159951 | 6/2001 |
| JP | 2001-175412 | 6/2001 |
| JP | 2002-062981 | 2/2002 |
| JP | 2002-091692 | 3/2002 |
| JP | 2004-062774 | 2/2004 |
| JP | 2006-113019 | 4/2006 |
| NL | 9300171 | 8/1994 |
| RU | 2125853 C1 | 2/1999 |
| RU | 2126161 C1 | 2/1999 |
| RU | 2141738 C1 | 11/1999 |
| WO | WO 9712337 | 4/1997 |
| WO | WO 9811528 | 3/1998 |
| WO | WO 0187426 | 11/2001 |
| WO | WO 0191042 A2 | 11/2001 |
| WO | WO 03107260 A2 | 6/2003 |
| WO | WO 03088147 A1 | 10/2003 |
| WO | WO 2004/012130 A1 | 2/2004 |
| WO | WO 2004039055 | 5/2004 |
| WO | WO 2004/051391 A2 | 6/2004 |
| WO | WO 2004/066615 A1 | 8/2004 |

OTHER PUBLICATIONS

Partial European Search Report dated Jul. 5, 2007 issued in EP 06008201.3.

Nister, David: "A Minimal Solution to the Generalised 3-Point Problem"; Proc. of Conf. on Computer Vision and Pattern Recognition (CVPR); Jun. 27, 2004; pp. 560-567; XP-002455848.

EP Search Report dated Nov. 8, 2007 in EP 06008201.3.

ADXL202 Specification Sheet: Low Cost ±2 g Dual Axis i MEMs® Accelerometer with Digital Output; Analog Devices, Inc., 1998.

ADXL330 Specification Sheet: Small, Low Power, 3-Axis ±3 g i MEMs® Accelerometer; Analog Devices, Inc., 2007.

Pictures of Microsoft Xwand retrieved on May 13, 2009 from http://www.kf12.com/blogs/uploads/xwand.jpg and http://www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using the XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

Selectech Air Mouse, Description; retrieved on May 5, 2009 from http://cgi.ebay.com.my/ws/eBayISAPI.dII?ViewItem&item=350096666675&indexURL.

Odell, "An Optical Pointer for Infrared Remote Controllers," Proceedings of International Conference on Consumer Electronics (1995).

Odell, Transcript of Testimony, Investigation No. 337-TA-658, Before the United States International Trade Commission, vol. IV, redacted (May 14, 2009).

Selectech, Selectech AirMouse Devices (image) (1991).

Selectech, "Selectech AirMouse Remote Controls, Model # AM-R1," photographs (1991).

Selectech, "Airmouse Remote Control System Model AM-1 User's Guide," Colchester, VT (Sep. 24, 1991).

Selectech, Facsimile Transmission from Rossner to Monastiero, Airmouse Remote Controls, Colchester, VT (Mar. 25, 1992).

Selectech, "Changing Driver Versions on CDTV/AMIGA" (Oct. 17, 1991).

Selectech, "AirMouse Remote Controls, AirMouse Remote Control Warranty" (1991).

Selectech, Software, "AirMouse for DOS and Windows IBM & Compatibles," "AirMouse Remote Control B0100EN-C, Amiga Driver, CDTV Driver, Version: 1.00," "AirMouse Remote Control B0100EM-C.1, Apple Macintosh Serial Driver Version: 1.00 (1.01B)," "AirMouse Remote Control B0100EL-B/3.05 DOS Driver Version: 3.0, Windows Driver Version. 1.00," AirMouse Remote Control MS-DOS Driver Version: 3.00/3.05, Windows 3.0 Driver Version: 1.00 (1991).

Wilson, "Wireless User Interface Devices for Connected Intelligent Environments," Ubicomp 2003 Workshop (2003).

Wilson, "WorldCursor: Pointing in Intelligent Environments with a Tele-operated Laser Pointer," UIST '03 Companion (Nov. 2003).

Wilson, Research page, biography available at http://research.microsoft.com/en-us/um/people/awilson/?0sr=a, Microsoft Corp. (2009).

A. Wilson, XWand video, http://research.microsoft.com/en-us/um/awilson/publications/wilsonchi2003/wilsonchi2003.html (Mar. 2002).

Wilson, Transcript of Testimony, Investigation No. 337-TA-658, Before the United States International Trade Commission, vol. V (May 15, 2009).

Acar, "Robust Micromachined Vibratory Gyroscopes" Dissertation (Dec. 2004).

Acar, et al., "Experimental evaluation and comparative analysis of commercial variable-capacitance MEMS accelerometers," *Journal of Micromechanics and Microengineering*, vol. 13 (1), pp. 634-645 (May 2003).

Agard, Agard, "Advances in Strapdown Inertial Systems," Lecture Series Advisory Group for Aerospace Research and Development Neuilly-Sur-Seine (France) (1984).

Albrecht, "An Adaptive Digital Filter to Predict Pilot Head Look Direction for Helmet-mounted Displays," MS Thesis University of Dayton (1989).

Algrain, "Estimation of 3-D Angular Motion Using Gyroscopes and Linear Accelerometers," IEEE Transactions on Aerospace and Electronic Systems, vol. 27, No. 6, pp. 910-920 (Nov. 1991).

Algrain, et al., "Accelerometer Based Line-of-Sight Stabilization Approach for Pointing and Tracking System," Second IEEE Conference on Control Applications, vol. 1, Issue 13-16 pp. 159-163 (Sep. 1993).

Algrain, et al., "Interlaced Kalman Filtering of 3-D Angular Motion Based on Euler's Nonlinear Equations," IEEE Transactions on Aerospace and Electronic Systems, vol. 30, No. 1 (Jan. 1994).

Allen, et al., "A General Method for Comparing the Expected Performance of Tracking and Motion Capture Systems," {VRST} '05: Proceedings of the ACM symposium on Virtual reality software and technology, pp. 201-210 (Nov. 2005).

Allen, et al., "Tracking: Beyond 15 Minutes of Thought," SIGGRAPH 2001 Course 11 (Course Pack) from Computer Graphics (2001).

A. Alves Santiago, "Extended Kalman filtering applied to a full accelerometer strapdown inertial measurement unit," M.S. Thesis Massachusetts Institute of Technology. Dept. of Aeronautics and Astronautics, Santiago (1992).

Analog Devices "ADXL50 Single Axis Accelerometer" (Data Sheet), http://www.analog.com/en/obsolete/adx150/products/product.html (Mar. 1996).

Analog Devices "ADXL202E Low-Cost ±2 g Dual-Axis Accelerometer with Duty Cycle Output" (Data Sheet), Rev. A (2000).

Analog Devices "ADXL330 Small, Low Power, 3-Axis ±2 g iMEMS Accelerometer" (Data Sheet), Rev. PrA (2005).

Analog Devices "ADXRS150 ±150°/s Single Chip Yaw Rate Gyro with Signal Conditioning" (Data Sheet), Rev. B (2004).

Analog Devices "ADXRS401 ±75°/s Single Chip Yaw Rate Gyro with Signal Conditioning" (Data Sheet), Rev. O (2004).

Ang, et al., "Design and Implementation of Active Error Canceling in Hand-held Microsurgical Instrument," Proceedigns of the 2001 IEEE/RSJ International Conference on Intelligent Robots and Systems, vol. 2, (Oct. 2001).

Ang, et al., "Design of All-Accelerometer Inertial Measurement Unit for Tremor Sensing in Hand-held Microsurgical Instrument," Proceedings of the 2003 IEEE International Conference on Robotics & Automation (Sep. 2003).

Apostolyuk, Vladislav, "Theory and design of micromechanical vibratory gyroscopes," MEMS/NEMS Handbook, Springer, 2006, vol. 1, pp. 173-195 (2006).

Arcanatech, IMP (Photos) (1994).

Arcanatech, "IMP User's Guide" (1994).

Ascension Technology, The Bird 6D Input Devices (specification) (1998).

Ator, "Image-Velocity with Parallel-Slit Reticles," Journal of the Optical Society of America (Dec. 1963).

Azarbayejani, et al, "Real-Time 3-D Tracking of the Human Body," Proceedings of IMAGE'COM 96 (1996).

Azarbayejani, et al., "Visually Controlled Graphics," IEEE Transactions on Pattern Analysis and Machine Intelligence, vol. 15, No. 6, pp. 602-605 (Jun. 1993).

Azuma et al., "Improving Static and Dynamic Registration in an Optical See-Through HMD," International Conference on Computer Graphics and Interactive Techniques Proceedings of the 21st annual conference on Computer graphics and interactive techniques, pp. 197-204 (1994).

Azuma et al., "Making Augmented Reality Work Outdoors Requires Hybrid Tracking, "Proceedings of the International Workshop on. Augmented Reality, San Francisco, CA, Nov. 1, 1998, Bellevue, Washington, pp. 219-224 (1999).

Azuma, "Predictive Tracking for Augmented Reality," Ph.D. Dissertation, University of North Carolina at Chapel Hill (1995).

Azuma, et al., "A Frequency-Domain Analysis of Head-Motion Prediction," Proceedings of SIGGRAPH '94, pp. 401-408 (1995).

Azuma, et al., "A motion-stabilized outdoor augmented reality system," Proceedings of IEEE Virtual Reality '99, Houston, TX (Mar. 1999).

Bachmann et al., "Inertial and Magnetic Posture Tracking for Inserting Humans into Networked Virtual Environments," Virtual Reality Software and Technology archive, Proceedings of the ACM Symposium on Virtual Reality Software and Technology, Baniff, Alberta, Canada, pp. 9-16 (2001).

Bachmann et al., "Orientation Tracking for Humans and Robots Using Inertial Sensors" (CIRA '99), Naval Postgraduate School, Monterey, CA (1999).

Bachmann, "Inertial and Magnetic Angle Tracking of Limb Segments for Inserting Humans into Synthetic Environments," Dissertation, Naval Postgraduate School, Monterey, CA (Dec. 2000).
Baker et al., "Active Multimodal Control of a Floppy Telescope Structure," Proc. SPIE, vol. 4825, 74 (Mar. 2003).
Balakrishnan, "The Rockin' Mouse: Integral 3D Manipulation on a Plane," (CHI '97), Univ. Toronto, (1997).
Ballagas, et al., Jan, "iStuff: A Physical User Interface Toolkit for Ubiquitous Computer Environments," Proceedings of the SIGCHI Conference on Human Factors in Computing Systems, vol. 5, No. 1, at 537-44 (ACM) (Apr. 5-10, 2003).
Baraff, "An Introduction to Physically Based Modeling," SIGGRAPH 97 Course Notes (1997).
Baudisch, et al., "Soap: a pointing device that works in mid-air" Proc. UIST (2006).
BBN Report, "Virtual Environment Technology for Training (VETT)," The Virtual Environment and Teleoperator Research Consortium (VETREC) (Mar. 1992).
Behringer, "Improving Registration Precision Through Visual Horizon Silhouette Matching," Proceedings of the international workshop on Augmented reality: placing artificial objects in real scenes: placing artificial objects in real scenes, Bellevue, Washington, United States pp. 225-232 (1999).
Behringer, "Registration for Outdoor Augmented Reality Applications Using Computer Vision Techniques and Hybrid Sensors," Virtual Reality, 1999 Proceedings., IEEE Computer Society, pp. 244-261 (1999).
Bei, "BEI GyrochipTM Model QRS11 Data Sheet," BEI Systron Donner Inertial Division, BEI Technologies, Inc., (Sep. 1998).
BEI Systron Donner Inertial Division, Gyrochip Theory of Operation (2001).
Benbasat, "An Inertial Measurement Unit for User Interfaces," Massachusetts Institute of Technology Dissertation, (Sep. 2000).
Benbasat, et al., "An Inertial Measurement Framework for Gesture Recognition and Applications," Gesture and Sign Language in Human-Computer Interaction, International Gesture Workshop, GW 2001, London, UK, 2001 Proceedings, LNAI 2298, at 9-20, I. Wachsmuth and T. Sowa (eds.), Springer-Verlag Berlin Heibelberg (2001, 2002).
Beuter, A., Publications, University of Quebec at Montreal, http://wwvv.er.uqam.ca/nobel/r11040/publicat.htm (Aug. 2007).
BGM-109 Tomahawk, http://en.wikipedia.org/wiki/BGM-109_Tomahawk, Wikipedia, Jan. 2009.
Bhatnagar, "Position trackers for Head Mounted Display systems: A survey" (Technical Report), University of North Carolina at Chapel Hill (Mar. 1993).
Bianchi, "A Tailless Mouse, New cordless Computer Mouse Invented by ArcanaTech." Inc. Article (Jun. 1992).
Bishop, "The Self-Tracker: A Smart Optical Sensor on Silicon," Ph.D. Dissertation, Univ. of North Carolina at Chapel Hill (1984).
Bishop, et al., "Grids Progress Meeting" (Slides), University of North Carolina at Chapel Hill, NC (1998).
Bishop, et al., SELF-TRACKER: Tracking for Hybrid Environments without Infrastructure (1996).
Bona, et al., "Optimum Reset of Ship's Inertial Navigation System," IEEE Transactions on Aerospace and Electronic Systems (1965).
Borenstein, et al., "Where am I? Sensors and Methods for Mobile Robot Positioning" (1996).
Boser, "3-Axis Accelerometer with Differential Sense Electronics," http://www.eecs.berkeley.edu/~boser/pdf/3axis.pdf (1997).
Boser, "Accelerometer Design Example: Analog Devices XL-05/5," http://www.eecs.berkeley.edu/~boser/pdf/x105.pdf (1996).
Bowman et al., 3D User Interfaces: Theory and Practice, Addison-Wesley, Inc., (2005).
Bowman et al., "An Introduction to 3-D User Interface Design," MIT PRESENCE, vol. 10, No. 1, pp. 96-108 (2001).
Britton et al., "Making Nested rotations Convenient for the User," ACM SIGGRAPH Computer Graphics, vol. 12, Issue 3, pp. 222-227 (Aug. 1978).
Britton, "A Methodology for the Ergonomic Design of Interactive Computer Graphic Systems, and its Application to Crystallography" (UNC Thesis) (1977).

Business Wire, "Feature/Virtual reality glasses that interface to Sega channel," Time Warner, TCI: project announced concurrent with COMDEX (Nov. 1994).
Business Wire, "Free-space 'Tilt' Game Controller for Sony Playstation Uses Scenix Chip; SX Series IC Processes Spatial Data in Real Time for On-Screen" (Dec. 1999).
Business Wire, "InterSense Inc. Launches InertiaCube2—The World's Smallest Precision Orientation Sensor With Serial Interface" (Aug. 14, 2001).
Business Wire, "Logitech MAGELLAN 3D Controller," Logitech (Apr. 1997).
Business Wire, "Mind Path Introduces GYROPOINT RF Wireless Remote" (Jan. 2000).
Business Wire, "Pegasus' Wireless PenCell Writes on Thin Air with ART's Handwriting Recognition Solutions," Business Editors/High Tech Writers Telecom Israel 2000 Hall 29, Booth 19-20 (Nov. 2000).
Business Wire, "RPI ships low-cost pro HMD Plus 3D Mouse and VR PC graphics card system for CES" (Jan. 1995).
Buxton, Bill, "Human input/output devices," In M. Katz (ed.), Technology Forecast: 1995, Menlo Park, C.A.: Price Waterhouse World Firm Technology Center, 49-65 (1994).
Buxton, Bill, A Directory of Sources for Input Technologies, http://www.biilbuxton.com/InputSources.html, Apr. 2001 (last update 2008).
Byte, "Imp Coexists With Your Mouse," What's New, ArcanaTec (Jan. 1994).
Canaday, R67-26 "The Lincoln Wand," IEEE Transactions on Electronic Computers, vol. EC-16, No. 2, p. 240 (Apr. 1967).
Caruso et al., "New Perspective on Magnetic Field Sensing," Sensors Magazine (Dec. 1998).
Caruso et al., "Vehicle Detection and Compass Applications using AMR Magnetic Sensors," Honeywell (May 1999).
Caruso, "Application of Magnetoresistive Sensors in Navigation Systems," Sensors and Actuators, SAE SP-1220, pp. 15-21 (Feb. 1997).
Caruso, "Applications of Magnetic Sensors for Low Cost Compass Systems," Honeywell, SSEC, http://www.ssec.honeywell.com/magnetic/datasheets/lowcost.pdf (May 1999).
Chatfield, "Fundamentals of High Accuracy Inertial Navigation," vol. 174 Progress in Astronautics and Aeronautics, American Institute of Aeronautics and Astronautics, Inc. (1997).
Cheng, "Direct interaction with large-scale display systems using infrared laser tracking devices," ACM International Conference Proceeding Series; vol. 142 (2003).
Cho, et al., "Magic Wand: A Hand-Drawn Gesture Input Device in 3-D Space with Inertial Sensors," Proceedings of the 9th Intl Workshop on Frontiers in Handwriting Recognition (IWFHR-9 2004), IEEE (2004).
Computergram, "RPI Entertainment Pods Improve Virtual Experience" (1995).
Cookbook, Numerical Recipes Electronic Edition, http://www.library.cornell.edu/nr/cbookcpdf.html.
Cooke, et al., "NPSNET: flight simulation dynamic modeling using quaternions," Presence, vol. 1, No. 4,pp. 404-420, MIT Press (1992/1994).
CSIDC Winners—Tablet-PC Classroom System Wins Design Competition, IEEE Computer Society Press, vol. 36, Issue 8, pp. 15-18, IEEE Computer Society (Aug. 2003).
Cutrone, "Hot products: Gyration GyroPoint Desk, GyroPoint Pro gyroscope-controlled wired and wireless mice" (Computer Reseller News) (Dec. 1995).
Cutts, "A Hybrid Image/Inertial System for Wide-Area Tracking" (Internal to UNC-CH Computer Science) (Jun. 1999).
Deruyck, et al., "An Electromagnetic Position Sensor," Polhemus Navigation Sciences, Inc., Burlington, VT (Nov. 1973.).
Donelson, et al., "Spatial Management of Information" (1978).
Eiβele, "Orientation as an additional User Interface in Mixed-Reality Environments," 1. workshop Ervwiterte and Virtuelle Realität, pp. 79-90. Gi-Fachgruppe AR/VR (2007).
Enura, et al., "Sensor Fusion Based Measurement of Human Head Motion," 3rd IEEE International Workshop on Robot and Human Communication (Jul. 1994).
Ferrin, "Survey of Helmet Tracking Technologies," Proc. SPIE vol. 1456, p. 86-94 (Apr. 1991).

Foxlin et al., "An Inertial Head-Orientation Tracker with Automatic Drift Compensation for Use with HMD' s," Proceedings of the conference on Virtual reality software and technology, Singapore, Singapore, pp. 159-173 (1994).

Foxlin et al., "Miniature 6-DOF Inertial System for Tracking HMDs," SPIE vol. 3362 (Apr. 1998).

Foxlin et al., "Miniaturization, Calibration & Accuracy Evaluation of a Hybrid Self-Tracker," The Second IEEE and ACM International Symposium on Mixed and Augmented Reality, pp. 151-160 (2003).

Foxlin et al., "WearTrack: A Self-Referenced Head and Hand Tracker for Wearable Computers and Portable VR," International Symposium on Wearable Computers (ISWC 2000), Oct. 16-18, 2000, Atlanta, GA (2000).

Foxlin, "FlightTracker: A Novel Optical/Inertial Tracker for Cockpit Enhanced Vision, Symposium on Mixed and Augmented Reality," Proceedings of the 3rd IEEE/ACM International Symposium on Mixed and Augmented Reality, pp. 212-221 (Nov. 2004).

Foxlin, "Generalized architecture for simultaneous localization, auto-calibration, and map-building," IEEE/RSJ Conf. on Intelligent Robots and Systems, Lausanne, Switzerland (Oct. 2002).

Foxlin, "Head-tracking Relative to a Moving Vehicle or Simulator Platform Using Differential Inertial Sensors," InterSense, Inc., Presented: Helmet and Head-Mounted Displays V, SPIE vol. 4021, AeroSense Symposium, Orlando, FL, Apr. 24-25, 2000.

Foxlin, "Inertial Head Tracker Sensor Fusion by a Complementary Separate-bias Kalman Filter," Proceedings of the IEEE 1996 Virtual Reality Annual International Symposium, pp. 185-194, 267 (1996).

Eric Fuchs, "Inertial Head-Tracking," MS Thesis, Massachusetts Institute of Technology, Dept. of Electrical Engineering and Computer Science (Sep. 1993).

Foxlin, "Motion Tracking Requirements and Technologies," Chapter 7, from Handbook of Virtual Environment Technology, Stanney Kay, Ed. (2002).

Foxlin, "Pedestrian. Tracking with Shoe-Mounted Inertial Sensors," IEEE Computer Graphics and Applications, vol. 25, No. 6, pp. 38-46 (Nov. 2005).

Foxlin, et al., "Constellation: A Wide-Range Wireless Motion-Tracking System for Augmented Reality and Virtual Set Applications," ACM SIGGRAPH, pp. 372-378 (1998).

Foxlin, et al., "VIS-Tracker: A Wearable Vision-Inertial Self-Tracker," IEEE Computer Society (2003).

Freiburg Center for Data Analysis and Modeling—Publications, http://www.fdm.uni-freiburg.de/cms/puplications/publications/ (Aug. 2007).

Friedmann, et al., "Device Synchronization Using an Optimal Linear Filter," SI3D '92: Proceedings of the 1992 symposium on interactive 3D graphics, pp. 57-62 (1992).

Friedmann, et al., "Synchronization in virtual realities," MIT Presence, vol. 1, No. 1, pp. 139-144 (1992).

Frohlich, "The Yo Yo: An interaction device combining elastic and isotonic control," at littp://www.uni-weimar.de/cms/methen/vr/research/hci/3d-handheld-interaction/the-yoyo-a-handheld-device-combining-elastic-and-isotonic-input.html (2003).

Green, et al., "ADI's iMEMS Angular Rate Sensing Gyroscope," Analog Dialogue (Jan. 2003).

Grimm et al., "Real-Time Hybrid Pose Estimation from Vision and Inertial Data," Proceedings, First Canadian Conference on Computer and Robot Vision, pp. 480-486 (2004).

Gyration Inc., "The Magic Inside GyroPoint".

Gyration, "Gyration Gp110 Ultra Cordless Optical Mouse Data Sheet," http://www.gyration.com/descriptions/document/GP110-SPEC-EN.pdf (2002).

Gyration, "Gyration Gp110 Ultra Cordless Optical Mouse User Manual," http://www.gyration.com/descriptions/document/GP110-MANUAL-EN.pdf (2002).

Gyration, "Gyration Ultra Cordless Optical Mouse," photos (2002).

Gyration, "Gyration MicroGyro 100 Developer Kit Data Sheet," littp://web.archive.org/web/19980708122611/www.gyration.com/html/devkit.html (Jul. 1998).

Hamilton Institute, http://www.dcs.gla.ac.uk/.about.rod/, R. Murray-Smith (Aug. 2007).

Harada, et al., "Portable Absolute Orientation Estimation Device with Wireless Network under Accelerated Situation" Proceedings, 2004 IEEE International Conference on Robotics and Automation, vol. 2, Issue , Apr. 26-May 1, 2004 pp. 1412-1417 vol. 2 (Apr. 2004).

Harada, et al., "Portable orientation estimation device based on accelerometers, magnetometers and gyroscope sensors for sensor network," Proceedings of IEEE International Conference on Multisensor Fusion and Integration for Intelligent Systems, MFI2003, pp. 191-196 (Jul. 2003).

Haykin, et al,, "Adaptive Tracking of Linear Time-Variant Systems by Extended RLS Algorithms, IEEE Transactions on Signal Processing," vol. 45, No. 5 (May 1997).

Heath, "Virtual Reality Resource Guide AI Expert," v9 n5 p. 32(14) (May 1994).

Hinckley et al., "The VideoMouse: A Camera-Based Multi-Degree-of-Freedom Input Device" A59, ACM UIST'99 Symposium on User Interface Software & Technology, CHI Letters 1 (1), pp. 103-112. (Jan. 1999).

Hinckley, "Synchronous Gestures for Multiple Persons and Computers", CHI Letters vol. 5 No. 2 (ACM 2003) & Proceedings of the 16th Annual ACM UIST 2003 Symposium on User Interface Software & Technology, at 149-58 (UIST '03 Vancouver BC Canada) (ACM) (Nov. 2003).

Hinckley, et al., "Sensing Techniques for Mobile Interaction," Proceedings of the 13th Annual ACM Symposium on User Interface Software and Technology (San Diego, Cal.), ACM UIST 2000 & Technology, CHI Letters 2 (2), at 91-100 (ACM) (2000).

Hinckley, et al. , "A Survey of Design Issues in Spatial Input," Proceedings of the ACM Symposium on User Interface Software and Technology (1994).

Hogue, "MARVIN: A Mobile Automatic Realtime Visual and INertial tracking system," Master's Thesis, York University (2003).

Hogue, et al., "An optical-inertial tracking system for fully-enclosed VR displays," Proceedings of the 1st Canadian Conference on Computer and Robot Vision, pp. 22-29 (May 2004).

Hollands, Robin, "Sourceless Trackers," VR News (Apr. 1995).

Holloway, Richard Lee, "Registration Errors in Augmented Reality Systems," Ph.D. Dissertation, University of North Carolina at Chapel Hill (1995).

Hudson Soft, "Brochure of Toukon Road Brave Warrior, Brave Spirits" (1998).

Inman, "Cheap sensors could capture your every move," http://technology.newscientist.com/article/dn12963-cheap-sensors-could-capture-your-every-move.html (Nov. 2007).

Intersense, "InterSense lnertiaCube2 Devices," (Specification) (image) (2001).

Intersense, "InterSense InertiaCube2 Manual for Serial Port Model" (2001).

Intersense, "InterSense IS-1200 FlightTracker Prototype Demonstration" (Video) (Nov. 2004).

Intersense, "InterSense IS-1200 InertiaHawk Datasheet" (2009).

Intersense, "InterSense IS-1200 VisTracker Datasheet" (2007).

Intersense, "InterSense IS-1200 VisTracker Devices," (image) (2007).

Intersense, "InterSense IS-900 MicroTraxTM Datasheet" (2007).

Intersense, "InterSense IS-900 Systems Datasheet" (2007).

Intersense, "InterSense MicroTrax Demo Reel," http://www.youtube.com/watch?v=O2F4fu_CISo (2007).

Intersense, "InterSense Mobile Mixed Reality Demonstration" (Video), http://www.youtube.com/watch?v=daVdzGK0nUE&feature=channel_page (Oct. 2006).

Intersense, "InterSense Motion Gaming Tech Demo," http://www.youtube.com/watch?v=7-3y5tdju4E, InterSense (Mar. 2008).

Intersense, "IS-1200 VisTracker Augmented Maintenance Demonstration" (Video), http://www.intersense.com/IS-1200_Systems.aspx, http://www.youtube.com/watch?v=IMI78s91WQo&feature=channel_page (Jan. 2009).

Intersense, "IS-1200 VisTracker Industrial Cart Demonstration" (Video), InterSense http://www.intersense.com/IS-1200_Systems.aspx http://www.youtube.com/watch?v=7xKLCvDGMgY&feature=channel_page (Jan. 2008).

Intersense, "Technical Overview IS-900 Motion Tracking System" http://www.intersense.com/uploadedFiles/Products/White_Papers/IS900_Tech_Overview_Enhanced.pdf (1999).

Intersense, Inc., "Comparison of InterSense IS-900 System and Optical Systems," http://www.intersense.com/uploadedFiles/Products/White_Papers/Comparison%20of%20InterSense%20IS-900%20System%20and%20Optical%20Systems.pdf (Jul. 12, 2004).

Izumori et al, High School Algebra: Geometry (1986) (高等学校の代数・幾何 改訂版).

Jacob, "Human-Computer Interaction—Input Devices" http://www.cs.tufts.edu/~jacob/papers/surveys.html, "Human-Computer Interaction: Input Devices," ACM Computing Surveys, vol. 28, No. 1, pp. 177-179 (Mar. 1996).

Jakubowsk, et al., "Increasing Effectiveness of Human Hand Tremor Separation Process by Using Higher-Order Statistics," Measurement Science Review, vol. 1 (2001).

Jakubowski, et al., "Higher Order Statistics and Neural Network for Tremor Recognition," IEEE Transactions on Biomedical Engineering, vol. 49, No. 2 (Feb. 2002).

Jian, et al., "Adaptive Noise Cancellation," Rice University, http://www.ece.rice.edu/.about.klwang/elec434/elec434.htm, (Aug. 2007).

Jiang, "Capacitive position-sensing interface for micromachined inertial sensors," Dissertation at Univ. of Cal. Berkley (2003).

Ju, et al., "The Challenges of Designing a User Interface for Consumer Interactive Television Consumer Electronics Digest of Technical Papers.," IEEE 1994 International Conference on Volume, Issue, Jun. 21-23, 1994 pp. 114-115 (Jun. 1994).

Keir, et al., "Gesture-recognition with Non-referenced Tracking," IEEE Symposium on 3D User Interfaces, pp. 151-158 (Mar. 25-26, 2006).

Kessler, et al., "The Simple Virtual Environment Library" (MIT Presence) (2000).

Kindratenko, "A Comparison of the Accuracy of an Electromagnetic and a Hybrid Ultrasound-Inertia Position Tracking System," MIT Presence, vol. 10, No. 6, Dec. 2001, 657-663 (2001).

Klein et al.,"Tightly Integrated Sensor Fusion for Robust Visual Tracking," British Machine Vision Computing, vol. 22, No. 10, pp. 769-776 (2004).

Kohlhase, "NASA Report, The Voyager Neptune travel guide," Jet Propulsion Laboratory Publication 89-24, excerpt (Jun. 1989).

Krumm, et al.,"How a Smart Environment Can Use Perception," Ubicomp 2001 (Sep. 2001).

Kuipers, Jack B., "SPASYN—An Electromagnetic Relative Position and Orientation Tracking System," IEEE Transactions on Instrumentation and Measurement, vol. 29, No. 4, pp. 462-466 (Dec. 1980).

La Scala, et al., "Design of an Extended Kalman Filter Frequency Tracker," IEEE Transactions on Signal Processing, vol. 44, No. 3 (Mar. 1996).

Larimer et al., "VEWL: A Framework for building a Windowing Interface in a Virtual Environment," in Proc. of IFIP TC13 Int. Conf. on Human-Computer Interaction Interact'2003 (Zürich, http://people.cs.vt.edu/~bowman/papers/VEWL_final.pdf (2003).

Laughlin, et al., "Inertial Angular Rate Sensors: Theory and Applications," SENSORS Magazine (Oct. 1992).

Lee et al., "Tilta-Pointer: the Free-Space Pointing Device," Princeton COS 436 Project, http://www.milyehuang.com/cos436/project/specs.html (2004).

Lee, et al., "Innovative Estimation Method with Measurement Likelihood for all-Accelerometer Type Inertial Navigation System," IEE Transactions on Aerospace and Electronic Systems, vol. 38, No. 1 (Jan. 2002).

Lee, et al., "Two-Dimensional Position Detection System with MEMS Accelerometer for Mouse Applications" Design Automation Conference, 2001. Proceedings, 2001 pp. 852-857 (Jun. 2001).

Leonard, "Computer Pointer Controls 3D Images in Free Space," Electronic Design, pp. 160, 162, 165, (Nov. 1991).

Liang, et al., "On. Temporal-Spatial Realism in the Virtual Reality Environment," ACM 1991 Symposium on User Interface Software and Technology (Nov. 1991).

Link, "Field-Qualified Silicon Accelerometers From 1 Milli g to 200,000 g," SENSORS (Mar. 1993).

Liu, et al., "Enhanced Fisher Linear Discriminant Models for Face Recognition," Proc. 14.sup.th International Conference on Pattern Recognition, Queensland, Australia (Aug. 1998).

Lobo et al., "Vision and Inertial Sensor Cooperation Using Gravity as a Vertical Reference," IEEE Trans. on Pattern Analysis and Machine Intelligence, vol. 25, No. 12, pp. 1597-1608 (Dec. 2003).

Logitech, Logitech 2D/6D Mouse Devices Specification (1991).

Logitech, "Logitech 2D/60 Mouse Technical Reference Manual" (1991) (front page only).

Logitech, "Logitech Tracker—Virtual Reality Motion Tracker." http://www.vrealities.com/logitech.html.

Logitech, Inc., "3D Mouse & Head Tracker Technical Reference Manual" (1992).

Luinge, Inertial sensing of human movement, Thesis, University of Twente (2002).

Luinge, et al., "Estimation of orientation with gyroscopes and accelerometers," Proceedings of the First Joint BMES/EMBS Conference, 1999., vol. 2, p. 844 (Oct. 1999).

Luthi, P. et al., "Low Cost Inertial Navigation System," and translation (2000).

Mackenzie et al., "A two-ball mouse affords three degrees of freedom," Extended Abstracts of the CHI '97 Conference on Human Factors in Computing Systems, pp. 303-304. New York: ACM (1997).

Mackinlay, "Rapid Controlled Movement Through a Virtual 3D Workspace," ACM SIGGRAPH Computer Graphics archive, vol. 24, No. 4, pp. 171-176 (Aug. 1990).

Maclean, "Designing with Haptic Feedback", Proceedings of IEEE Robotics and Automation (ICRA '2000), at 783-88 (Apr. 22-28, 2000).

Masliah, "Measuring the Allocation of Control in 6 Degree of Freedom Human-Computer Interaction Tasks," Proceedings of the SIGCHI conference on Human factors in computing systems, pp. 25-32 (2001).

Maybeck, "Stochastic Models, Estimation and Control," vol. 1, Mathematics in Science and Engineering, vol. 141 (1979).

Merrill, "FlexiGesture: A sensor-rich real-time adaptive gesture and affordance learning platform for electronic music control," Thesis, Massachusetts Institute of Technology (Jun. 2004).

Meyer et al., "A Survey of Position Tracker," vol. 1, Issue 2, pp. 173-200, MIT Presence, (1992).

Microsoft Research Corp., "XWand Devices" (image).

Miles, "New pads lack control," The Times, Dec. 6, 1999 (Dec. 1999).

Mizell, "Using Gravity to Estimate Accelerometer Orientation," IEEE Computer Society (2003).

Morris, "Accelerometry—a technique for the measurement of human body movements," J Biomechanics 6: 729-736 (1973).

Mulder, "How to Build an Instrumental Glove Based on the Powerglove Flex Sensors," PCVR 16, pp. 10-14 (1994).

Mulder, "Human movement tracking technology," School of Kinesiology, Simon Fraser University (Jul. 1994).

Myers, et al., "Interacting at a Distance: Measuring the Performance of Laser Pointers and Other Devices," CHI 2002, (Apr. 2002).

N.I.C.E., "The N.I.C.E. Project" (video), http://www.niceproject.com/about/ (1997).

Naimark, et al., "Circular Data Matrix Fiducial System and Robust Image Processing for a Wearable Vision-Inertial Self-Tracker," Proceedings. International Symposium on Mixed and Augmented Reality, ISMAR (2002).

Naimark, et al., "Encoded LED System for Optical Trackers," Fourth IEEE and ACM International Symposium on Mixed and Augmented Reality, pp. 150-153 (2005).

Navarrete, et al., "Eigenspace-based Recognition of Faces: Comparisons and a new Approach," Image Analysis and Processing (2001).

Newswire PR, "Five New Retailers to Carry Gyration's Gyropoint Point and Gyropoint Pro" (1996).

Newswire PR, "Three-Axis MEMS-based Accelerometer From STMicroelectronics Targets Handheld Terminals," STMicro (Feb. 2003).

Nichols, "Geospatial Registration of Information for Dismounted Soldiers (GRIDS)," Contractor's Progress, Status, and Management Report (Milestone 3 Report to DARPA ETO) (Oct. 1998).

Nintendo, Nintendo Entertainment System (NES) (1984).
Nintendo, NES System and Controllers (1984)—(illustration —1 page).
Nintendo, NES Controller (1984)—(illustration—1 page).
Nintendo, NES Zapper Guns (1984)—(illustration—1 page).
Nintendo, NES Duck Hunt Game (1984)—(illustration—1 page).
Nintendo, Nintendo GameBoy System (1989).
Nintendo, Nintendo Super NES (SNES) (1991).
Nintendo, SNES System & Controllers (1991)—(illustration—1 page).
Nintendo, SNES Superscope (1991)—(illustration—1 page).
Nintendo, Nintendo 64 System (N64) (1996).
Nintendo, Nintendo 64 System and Controllers (1996)—(illustration—1 page).
Nintendo, Nintendo 64 Controller (1996)—(illustration—1 page).
Nintendo, Nintendo N64 Controller with Rumble Pack (1996-1997)—(illustration—1 page).
Nintendo, Nintendo N64 Rumble Packs (1996-1997)—(illustration—1 page).
Nintendo, Nintendo GameBoy Color System (1998).
Nintendo, GameBoy Color (1998)—(illustration—1 page).
Nintendo, Nintendo: Kirby Tilt & Tumble game, packaging and user manual (Aug. 2000-2001).
Nintendo, Pokémon Pinball (1998)— (illustration—1 page).
Nintendo, Nintendo Game Boy Advance System (2001).
Nintendo, Nintendo Game Boy Advance (2001)—(illustration—1 page).
Nintendo, Nintendo: WarioWare: Twisted game, packaging and user manual (2004-2005).
Nintendo, Nintendo Game Boy Advance Wireless Adapter (Sep. 26, 2003)—(illustration—1 page).
Nintendo, Nintendo GameCube System (2001).
Nintendo, GameCube System and. Controller (2001)—(illustration—1 page).
Nintendo, GameCube Controller (2001)—(illustration—1 page).
Nintendo, Wavebird Wireless Controllers (May 2002)—(illustration—1 page).
Nintendo, G3 Wireless Controller (Pelican) (2001)—(illustration—1 page).
Nintendo, Game Boy Advance SP System (2003).
Nintendo, Nintendo Game Boy Color Game Cartridge with Built-In Rumble (Jun. 28, 2009)—(illustration—1 page).
Nishiyama, "A Nonlinear Filter for Estimating a Sinusoidal Signal and its Parameters in White Noise: On the Case of a Single Sinusoid," IEEE Transactions on Signal Processing, vol. 45, No. 4 (Apr. 1997).
Nishiyama, "Robust Estimation of a Single Complex Sinusoid in White Noise-H.infin. Filtering Approach," IEEE Transactions on Signal Processing, vol. 47, No. 10 (Oct. 1999).
Ojeda, et al., "No GPS? No Problem!" University of Michigan Develops Award-Winning Personal Dead-Reackoning (PDR) System for Walking Users, http://www.engin.umich.edu/research/mr1/urpr/In_Press/P135.pdf (post 2004).
Omelyan, "On the numerical integration of motion for rigid polyatomics: The modified quaternion approach" Computers in Physics, vol. 12 No. 1, pp. 97-103 (1998).
Ovask.A, "Angular Acceleration Measurement: A Review," Instrumentation and Measurement Technology Conference, Conference Proceedings. IEEE, vol. 2 (Oct. 1998).
Pat, et al., "The Tango: A Tangible Tangoreceptive Whole-Hand Interface," Proceedings of World Haptics and IEEE Eurohaptics Conference, Symposium on Haptic Interfaces for Virtual Environment and Teleoperator Systems (2005).
Paradiso, et al., "Interactive Therapy with Instrumented Footwear," CHI 2004, Apr. 24-29, 2004, Vienna, Austria (2004).
Park, Adaptive control strategies for MEMS gyroscopes (Dissertation), Univ. Cal. Berkley (2000).
Pctracker, Product Technology Brief, at http://www.intersense.com/uploadedFiles/Products/White_Papers/PCTracker_Tech_Overview.pdf.
Pelican Accessories G3 Wireless Controller (Sep. 6, 2002).
Perforce, Perforce Controller (image).

Pham, Hubert, "Pointing in Intelligent Environments with the WorldCursor," Proceedings of Interact 2003, Andrew Wilson & (2003).
Phillips, "Forward/Up Directional Incompatibilities During Cursor Placement Within Graphical User Interfaces," Ergonomics, informaworld.com (May 2005).
Phillips, "On the Right Track: A unique optical tracking system gives users greater freedom to explore virtual worlds" (Apr. 2000).
Pierce et al., "Image Plane Interaction Techniques in 3D Immersive Environments," Proceedings of the 1997 symposium on Interactive 3D graphics, portal.acm.org (1997).
Pilcher, "AirMouse Remote Controls," IEEE Conference on Consumer Electronics (1992).
Pique, "Semantics of Interactive Rotations," Interactive 3D Graphics, Proceedings of the 1986 workshop on Interactive 3D graphics, pp. 259-269 (Oct. 1986).
Piyabongkarn, "Development of a MEMS Gyroscope for Absolute Angle Measurement," IEEE Transactions on Control Systems Technology, vol. 13, Issue 2, pp. 185-195 (Mar. 2005).
Piyabongkarn, "Development of a MEMS Gyroscope for Absolute Angle Measurement," Dissertation, Univ. Minnesota (Nov. 2004).
Polhemus, "Polhemus 3SPACE FASTRAK devices" (image) (2000).
Pryor et al., "A Reusable Software Architecture for Manual Controller Integration," IEEE Conf. on Robotics and Automation, Univ of Texas (Apr. 1997).
Raab, et al., "Magnetic Position and Orientation Tracking System," IEEE Transactions on Aerospace and Electronic Systems, vol. AES-15, No. 5, pp. 709-718 (Sep. 1979).
Raethjen, et al., "Tremor Analysis in Two Normal Cohorts," Clinical Neurophysiology 115 (2004).
Rebo, "Helmet-mounted virtual environment display system," Thesis, Air Force Institute of Technology, Defense Technical Information Center (Dec. 1988).
Rebo, et al., "Helmet-Mounted Virtual Environment Display System," Proc. SPIE vol. 1116, pp. 80-84 (Sep. 1989).
Rekimoto, "Tilting Operations for Small Screen Interfaces," Proceedings of the 9th Annual ACM Symposium on User Interface Software and Technology, pp. 167-168 (1996).
Reunert, "Fiber-Optic Gyroscopes: Principles and Applications," Sensors, (Aug. 1993).
Ribo, et al., "Hybrid Tracking for Outdoor Augmented Reality Applications," IEEE Computer Graphics and Applications, vol. 22, No. 6, pp. 54-63 (Nov./Dec. 2002).
Riviere, C., Robotics Institute, http://www.ri.cmu.edu/people/riviere.sub.--cameron.html http://www.ri.cmu.edu/person.html?type=publications&person_id=248 (Aug. 2007).
Riviere, et al., "Adaptive Canceling of Physiological Tremor for Improved Precision in Microsurgery," IEEE Transactions on Biomedical Engineering, vol. 45, No. 7 (Jul. 1998).
Riviere, et al., "Toward Active Tremor Canceling in Handheld Microsurgical Instruments," IEEE Transactions on Robotics and Automation, vol. 19, No. 5 (Oct. 2003).
Robbinett et al., "Implementation of Flying, Scaling, and Grabbing in Virtual Worlds," ACM Symposium (1992).
Roberts, "The Lincoln Wand," AFIPS Conference Proceedings, MIT Lincoln Laboratory (1966).
Robinett et al., "The Visual Display Transformation for Virtual Reality," University of North Carolina at Chapel Hill (1994).
Roetenberg, "Inertial and magnetic sensing of human motion," Thesis (2006).
Roetenberg, et al., "Inertial and Magnetic Sensing of Human Movement Near Ferromagnetic Materials," Proceedings. The Second IEEE and ACM International Symposium on Mixed and Augmented Reality (Mar. 2003).
Rolland, et al., "A Survey of Tracking Technology for Virtual Environments," University of Central Florida, Center for Research and Education in Optics Lasers (CREOL) (2001).
Sakai, et al., "Optical Spatial Filter Sensor for Ground Speed," Optical Review, vol. 2, No. 1 pp. 65-67 (1994).
Saxena et al., "In Use Parameter Estimation of Inertial Sensors by Detecting Multilevel Quasi-Static States," Lecture Notes in Computer Science, 2005—Berlin: Springer-Verlag, (Apr. 2004).

Sayed, "A Framework for State-Space Estimation with Uncertain Models," IEEE Transactions on Automatic Control, vol, 46, No. 7 (Jul. 2001).

Sayed, UCLA Adaptive Systems Laboratory—Horne Page, UCLA, http://asl.ee.ucla.edu/index.php?option=com.sub.--frontpage&Itemid=1 (Aug. 2007).

Schofield, Jack et al., Coming up for airpad, The Guardian (Feb. 2000).

Screen Shot of Brave Spirits (1998).

Seoul National Univ., "EMMU System"—Seoul National Univ Power Point Presentation, www.computer.org/portal/cms_docs_ieeecs/ieeecs/education/csidc/CSIDC03Presentations/SNU.ppt (2003).

Shoemake, Ken, Quaternions, UPenn, Online.

Simon, et al. "The YoYo: A Handheld Combining Elastic and Isotonic Input," http://www.uni-weimar.de/cms/fileadmin/medien/vr/documents/publications/TheYoYo-Interact2003-Talk.pdf (2003).

Simon, et al., "The YoYo: A Handheld Device Combining Elastic and Isotonic Input," Human-Computer Interaction=INTERACT'03, pp. 303-310 (2003).

Smith, "Gyrevolution: Orienting the Digital Era," http://www.gyration.com/images/pdfs/Gyration_White_Paper.pdf (2007).

Sorenson, et al., "The Minnesota Scanner: A Prototype Sensor for Three-Dimensional Tracking of Moving Body Segments," IEEE Transactions on Robotics and Animation (Aug. 1989).

Sourceforge,Com, "ARToolkit API Documentation" (SourceForge web pages) (2004-2006).

Stovall, "Basic Inertial Navigation," NAWCWPNS TM 8128, Navigation and Data Link Section, Systems Integration Branch (Sep. 1997).

Sutherland, "A Head-Mounted Three Dimensional Display," AFIPS '68 (Fall, part I); Proceedings of the Dec. 9-11, 1968, fall joint computer conference, part I, pp. 757-764 (Dec. 1968).

Sutherland, Ivan E., "Sketchpad: A Man-Machine Graphical Communication System," AFIPS '63 (Spring): Proceedings of the May 21-23, 1963, Spring Joint Computer Conference, pp. 329-346 (May 1963).

Sweetster, "A Quaternion Algebra Tool Set," http://world.std.corn/%7Esweetser/quaternions/intro/tools/tools.html (Jun. 2005).

Thinkoptics, Thinkoptics Wavit devices (image) (2007).

Timmer, "Data Analysis and Modeling Dynamic Processes in the Life Sciences," Freiburg Center for Data Analysis and Modeling, http://webber.physik.uni-freiburg.de/.about.jeti/ (Aug. 2007).

Timmer, "Modeling Noisy Time Series: Physiological Tremor," International Journal of Bifurcation and Chaos, vol. 8, No. 7 (1998).

Timmer, et al, "Pathological Tremors: Deterministic Chaos or Nonlinear Stochastic Oscillators?" Chaos, vol. 10, No. 1 (Mar. 2000).

Timmer, et al., "Characteristics of Hand Tremor Time Series," Biological Cybernetics, vol. 70 (1993).

Timmer, et al., Cross-Spectral Analysis of Physiological Tremor and Muscle Activity: II Application to Synchronized Electromyogram, Biological Cybernetics, vol. 78 (1998).

Timmer, et al., "Cross-Spectral Analysis of Tremor Time Series," International Journal of Bifurcation and Chaos, vol. 10, No. 11 (2000).

Titterton et al., "Strapdown Inertial Navigation Technology," pp. 1-56 and pp. 292-321 (May 1997).

Keiichi Sawada et al., "A Wearable Attitude-Measurement System Using a Fiberoptic Gyroscope," MIT Presence (Apr. 2002).

UNC Computer Science Department, "News & Notes from Sitterson Hall," UNC Computer Science, Department Newsletter, Issue 24, Spring 1999 (Apr. 1999).

Univ. Illinois at Chicago, "CAVE—A Virtual Reality Theater," http://www.youtube.com/watch?v=-Sf6bijwSCE 1993.

Univ. Wash., "ARToolkit" (U. Wash. web pages) (1999).

Urban, "BAA 96-37 Proposer Information," DARPA/ETO (1996).

US Dynamics Corp, "Spinning Mass Mechanical Gyroscopes" (Aug. 2006).

US Dynamics Corp, "The Concept of 'Rate' (more particularly, angular rate pertaining to rate gyroscopes) (rate gyro explaination)," (Aug. 2006).

US Dynamics Corp, "US Dynamics Model 475 Series Rate Gyroscope Technical Brief—brief discussion on rate gyroscope basics, operation, and uses, and a dissection of the model by major component" (Dec. 2005).

US Dynamics Corp, "US Dynamics Rate Gyroscope Interface Brief (rate gyro IO)" (Aug. 2006).

Van Den Bogaard, "Using linear filters for real-time smoothing of rotational data in virtual reality application," http://www.science.uva.nl/research/ias/alumni/m.sc.theses/theses/RobvandenBogaard.pdf (Aug. 2004).

Van Laerhoven, et al., "Using an Autonomous Cube for Basic Navigation and Input," Proceedings of the 5th International Conference on Multimodal interfaces, Vancouver, British Columbia, Canada, pp. 203-210 (2003).

Van Rheeden, et al., "Noise Effects on Centroid Tracker Aim Point Estimation," IEEE Trans. on Aerospace and Electronic Systems, vol. 24, No. 2, pp. 177-185 (Mar. 1988).

Vaz, et al, "An Adaptive Estimation of Periodic Signals Using a Fourier Linear Combiner," IEEE Transactions on Signal Processing, vol. 42, Issue 1, pp. 1-10 (Jan. 1994).

Verplaetse, "Inertial Proprioceptive Devices: Self-Motion Sensing Toys and Tools," IBM Systems Journal (Sep. 1996).

Verplaetse, "Inertial-Optical Motion-Estimating Camera for Electronic Cinematography," Masters of Science Thesis, MIT, (1997).

Vorozcovs, et al.,"The Hedgehog: A Novel Optical Tracking Method for Spatially Immersive Displays," MIT Presence, vol. 15, No, 1, pp. 108-121 (2006).

Wang, et al., "Tracking a Head-Mounted Display in a Room-Sized Environment with Head-Mounted Cameras," SPIE 1990 Technical Symposium on Optical Engineering and Photonics in Aerospace Sensing, vol. 1290, pp. 47-57 (1990).

Ward, et al., "A Demonstrated Optical Tracker With Scalable Work Area for Head-Mounted Display Systems," Symposium on Interactive 3D Graphics, Proceedings of the 1992 Symposium on Interactive 3D Graphics, pp. 43-52, ACM Press, Cambridge, MA (1992).

Watt, *3D Computer Graphics*, "Three-Dimensional Geometry in Computer Graphics,", pp. 1-22 Addison-Wesley (1999).

Welch et al., "HiBall-3100™ Wide-Area, High-Precision Tracker and 3D Digitizer," http://www.3rdtech.com/HiBall.htm (2002-2006).

Welch et al., HiBall Devices (image) (2002-2006).

Welch et al., Motion Tracking: No Silver Bullet, but a Respectable Arsenal IEEE Computer Graphics and Applications, vol. 22, No. 6, pp, 24-38 (Nov. 2002).

Welch, "Hybrid Self-Tracker: An Inertial/Optical Hybrid Three-Dimensional. Tracking System," Tech. Report TR95-048, Dissertation Proposal, Univ. of North Carolina at Chapel Hill, Dept. Computer Science, Chapel Hill, N.C. (1995).

Welch, "A Self-Contained Wide-Area Tracker Using Sensor Fusion" (2001).

Welch, "Hawkeye Zooms in on Mac Screens with Wireless Infrared Penlight Pointer," Mac Week (May 1993).

Welch, et al., "Complementary Tracking and Two-Handed Interaction for Remote 3D Medical Consultation with a PDA," Proceedings of Trends and Issues in Tracking for Virtual Environments, Workshop at the IEEE Virtual Reality 2007 Conference (Mar. 2007).

Welch, et al., "High-Performance Wide-Area Optical Tracking: The HiBall Tracking System," MIT Presence: Teleoperators & Virtual Environments (2001).

Welch, et al., "SCAAT: Incremental Tracking with Incomplete Information," Computer Graphics, SIGGRAPH 97 Conference Proceedings, pp. 333-344 (Aug. 1997).

Welch, et al., "Source Code for HiBall+Inerital device," UNC-CH Computer Science (Jun. 1998).

Welch, et al., "The HiBall Tracker: High-Performance Wide-Area Tracking for Virtual and Augmented Environments," ACM SIGGRAPH, Addison-Wesley (1999).

Welch, et al., "The High-Performance Wide-Area Optical Tracking : The HiBall Tracking System," MIT Presence, Presence, vol. 10 , No. 1 (Feb. 2001).

Welch, et al., "Tracking for Training in Virtual Environments: Estimating the Pose of People and Devices for Simulation and Assessment," [J. Cohn, D. Nicholson, and D. Schmorrow, editors, The PSI Handbook of Virtual Environments for Training and Education: Developments for the Military and Beyond, Chap. 1, pp. 23-47] (2008).

Widrow, et al., "Fundamental Relations Between the LMS Algorithm and the DFT," IEEE Transactions on Circuits and Systems, vol. 34, No. CAS-7, (Jul. 1987).

Williams, et al., "Physical Presence: Palettes in Virtual Spaces," Society of Photo-Optical instrumentation Engineers (SPIE) Conference Series, vol. 3639, No. 374-384 (May 1999).

Wormell, "Unified Camera, Content and Talent Tracking in Digital Television and Movie Production," InterSense, Inc. & Mark Read, Hypercube Media Concepts, Inc. Presented: NAB 2000, Las Vegas, NV, Apr. 8-13, 2000 (2000).

Wormell, et al,, "Advancements in 3D Interactive Devices for Virtual Environments," ACM International Conference Proceeding Series; vol. 39 (2003).

Worringham, et al.,."Directional Stimulus-Response Compatibility: A Test of Three Alternative Principles," Ergonomics, vol. 41, Issue 6, pp. 864-880 (Jun. 1998).

Worringham, et al., "Tablet-PC Classroom System Wins Design Competition," Computer, vol. 36, No. 8, pp. 15-18 (Aug. 2003).

Yang, et al., "Implementation and Evaluation of 'Just Follow Me': An Immersive, VR-Based, Motion-Training System," MIT Presence: Teleoperators and Virtual Environments, vol. 11 No. 3, at 304-23 (MIT Press) (Jun. 2002).

You, et al., "Hybrid Inertial and Vision Tracking for Augmented Reality Registration," http://graphics.usc.edu/cgit/pdf/papers/Vr1999.PDF (1999).

You, et al., "Orientation Tracking for Outdoor Augmented Reality Registration," IEE Computer Graphics and Applications, IEEE, vol. 19, No. 6, pp. 36-42 (Nov. 1999).

Youngblut, et al., "Review of Virtual Environment Interface Technology," Institute for Defense Analyses (Jul. 1996).

Yun, et al., "Recent Developments in Silicon Microaccelerometers," SENSORS, University of California at Berkeley (Oct. 1992).

Zhai, "Human Performance in Six Degree of Freedom Input Control," Thesis, University of Toronto (1995).

Zhou, et al., "A survey—Human Movement Tracking and Stroke Rehabilitation," Technical Report: CSM-420, ISSN 1744-8050, Dept. of Computer Sciences, University of Essex, UK (Dec. 8, 2004).

Zhu, et al., "A Real-Time Articulated Human Motion Tracking Using Tri-Axis Inertial/Magnetic Sensors Package," IEEE Transactions on Neural Systems and Rehabilitation Engineering, vol. 12, No. 2 (Jun. 2004).

English Translation of WO 2004/051391.

Japanese Notice of Reasons for Rejection mailed Oct. 18, 2010 (3 pages).

INCLINATION CALCULATION APPARATUS AND INCLINATION CALCULATION PROGRAM, AND GAME APPARATUS AND GAME PROGRAM

CROSS REFERENCE TO RELATED APPLICATION

This application is a continuation of U.S. Application No. 11/764,409 filed Jun. 18, 2007, now U.S. Pat. No. 7,877,224, which is a divisional of U.S. Application No. 11/408,071 filed Apr. 21, 2006, now U.S. Pat. No. 7,596,466, the entire content of which is incorporated by reference. The disclosure of Japanese Patent Application No. 2006-087160 is incorporated herein by reference.

BACKGROUND

1. Field of Present Exemplary Embodiments

The present non-limiting exemplary embodiments disclosed herein relate to an inclination calculation apparatus and an inclination calculation program, and more specifically to an inclination calculation apparatus and an inclination calculation program for calculating an inclination of an input device using an output from acceleration detection means included in the input device.

2. Description of Background Art

Conventionally, technologies for calculating an inclination of a device including acceleration detection means have been proposed. For example, patent document 1 (Japanese Laid-Open Patent Publication No. 2001-159951) describes an information processing device including acceleration detection means. In this information processing device, an inclination of the device is calculated from an acceleration detected by the acceleration detection means (an angle of the device with respect to a direction of gravity), and an operation command is generated using the calculated inclination. According to such a method for calculating an inclination of a device using the acceleration detection means, the inclination of the device is calculated by calculating the direction of an acceleration of gravity detected by the acceleration detection means.

However, the technology described in patent document 1 has a problem in that since the inclination of the input device is calculated only from the detected acceleration, the detected inclination may not be correct. When, for example, the device is being moved by the user or being vibrated by the destabilization of the user's hand, the detected acceleration includes acceleration components caused by an inertial force in addition to the acceleration of gravity. Therefore, the direction of the detected acceleration is offset from the direction of the acceleration of gravity. As a result, an accurate inclination cannot be calculated.

According to the technology described in patent document 1, processing for correcting the inclination so as to be as close as possible to the accurate value is executed; for example, a low-frequency component is extracted from the detected acceleration. However, even with such processing, a method of using only the acceleration has a limit in terms of the accuracy of the calculated inclination. When processing for correcting the inclination is executed, there occurs another problem in that the calculation of the inclination is delayed with respect to the detection of the acceleration.

SUMMARY OF PRESENT NON-LIMITING, EXEMPLARY EMBODIMENTS

Therefore, one aspect of the present non-limning exemplary embodiments disclosed herein is to provide an inclination calculation apparatus and an inclination calculation program capable of performing highly precise calculation of an inclination of an input device to be used as an operation input while utilizing the advantages of calculating the inclination using a detected acceleration.

The present non-limiting exemplary embodiments disclosed herein have the following features to attain the object mentioned above. The reference numerals, additional explanations and the like in parentheses in this section of the specification indicate the correspondence with the embodiments described later for easier understanding of the present invention and do not limit the present invention in any way.

A first aspect of present non-limitin exemplary embodiments disclosed herein is directed to an inclination calculation apparatus (game apparatus 3) for sequentially calculating an inclination of an input device (controller 7) operable in terms of a posture thereof. The input device includes acceleration detection means (acceleration sensor 37) for detecting an acceleration in at least two axial directions and imaging means (imaging element 40) for taking an image of two imaging targets. The inclination calculation apparatus comprises image information processing means (CPU 10, etc. for executing step S3; hereinafter, only the corresponding step number(s) will be mentioned in this section), acceleration information processing means (step S4), and inclination calculation means (step S5). The image information processing means sequentially calculates first inclination information (first vector data 531) representing an inclination of the input device from positions of the two imaging targets (markers 8a and 8b) in a taken image obtained by the imaging means. The acceleration information processing means sequentially calculates second inclination information (second vector data 533) representing an inclination of the input device from an acceleration detected by the acceleration detection means. The inclination calculation means calculates an inclination (output vector) of the input device using the first inclination information and the second inclination information.

In a second aspect of present non-limiting exemplary embodiments disclosed herein, the inclination calculation means may select one of a calculation method using the first inclination information (first method) and a calculation method using the second inclination information (second method), and calculate the inclination of the input device by the selected calculation method.

In a third aspect of present non-limiting, exemplary embodiments, the inclination calculation apparatus may further comprise first determination means (step S21) for determining whether or not calculation of the first inclination information by the image information processing means was successful. In this case, the inclination calculation means calculates the inclination of the input device using at least the first inclination information when the first determination means determines that the calculation of the first inclination information was successful (step S28), and calculates the inclination of the input device using the second inclination information without using the first inclination information when the first determination means determines that the calculation of the first inclination information was unsuccessful (step S22).

In a fourth aspect of present non limiting, exemplary embodiments, the inclination calculation apparatus may further comprise second determination means (step S42) for determining whether or not the inclination of the input device is within a range in which the imaging means is assumed to be capable of taking an image of the two imaging targets. In this case, the inclination calculation means calculates the inclination of the input device using at least the first inclination information when the second determination means determines that the inclination of the input device is within the range (step S28), and calculates the inclination of the input device using the second inclination information without using the first inclination information when the second determination means determines that the inclination of the input device is outside the range (step S22).

In a fifth aspect of present non-limiting, exemplary embodiments, the acceleration detection means may be capable of detecting an acceleration in three axial directions including one axial direction (Z' axis) along an imaging direction of the imaging means. In this case, the second determination means determines whether or not the inclination of the input device is within the range in accordance with whether or not a magnitude of the acceleration in the one axial direction along the imaging direction is equal to or less than a predetermined threshold value.

In a sixth aspect of present non-limiting, exemplary embodiments, the acceleration detection means may be capable of detecting an acceleration in at least two axial directions (X' axis and Y' axis) which are not along an imaging direction of the imaging means. In this case, the second determination means determines whether or not the inclination of the input device is within the range in accordance with whether or not a magnitude of the acceleration in the two axial directions which are not along the imaging direction is equal to or greater than a predetermined threshold value.

In a seventh aspect of present non-limiting, exemplary embodiments, the inclination calculation means may include comparison means (steps S25 and S26) and correction means (step S27). The comparison means compares the first inclination information and the second inclination information. The correction means sets, as the inclination of the input device, an inclination obtained by correcting the inclination represented by the first inclination information in accordance with the comparison result obtained by the comparison means.

In an eighth aspect of present non-limiting, exemplary embodiments, the comparison means may compare a direction of the inclination represented by the first inclination information and a direction of the inclination represented by the second inclination information, and determine whether the two directions are closer to being identical to each other or closer to being opposite to each other. In this case, the correction means performs a correction for making the direction of the inclination represented by the first inclination information opposite when the two directions are determined to be closer to being opposite to each other.

In a ninth aspect of present non-limiting, exemplary embodiments, the inclination calculation apparatus may further comprise third determination means (step S24) for determining whether or not a change amount of a direction of the acceleration detected by the acceleration detection means is equal to or less than a predetermined value. In this case, the correction means performs a correction only when the determination result of the third determination means is positive.

In a tenth aspect of present non-limiting, exemplary embodiments, the inclination calculation apparatus may further comprise fourth determination means for determining whether or not a difference between a magnitude of the acceleration detected by the acceleration detection means and a magnitude of an acceleration of gravity is equal to or less than a predetermined value. In this case, the correction means performs a correction only when the determination result of the fourth determination means is positive.

In an eleventh aspect of present non-limiting, exemplary embodiments, the inclination calculation apparatus may further comprise fifth determination means for determining whether or not a change amount of a value of the acceleration detected by the acceleration detection means is equal to or less than a predetermined value. In this case, the correction means performs a correction only when the determination result of the fifth determination means is positive.

The present non-limiting, exemplary embodiments may be provided in the form of an inclination calculation program for causing a computer of an inclination calculation apparatus to execute the above-described invention. The present non-limiting, exemplary embodiments may be provided in the form of a game apparatus using an inclination calculated by the above invention as an operation input for a game, or in the form of a game program for causing a computer of the game apparatus to execute the above-described invention.

According to the first aspect, the image information processing means calculates the first inclination information using the taken image. Therefore, the inclination of the controller 7 can be accurately calculated. The acceleration information processing means calculates the second inclination information using the acceleration. Therefore, even when the image information processing means cannot calculate the first inclination information, the second inclination information can be calculated. According to this aspect, a final inclination is calculated using the first and second inclination information. Thus, the inclination can be calculated utilizing the advantages of both the first method of calculating the inclination using the taken image and the second method of calculating the inclination using the acceleration. More specifically, while the advantage of the second method of being capable of constantly calculating the inclination is utilized, the inclination can be calculated with high precision by the first method.

According to the second aspect, one of the first inclination information and the second inclination information is selected. Thus, more suitable information among the two types of inclination information can be used to calculate the inclination of the input device.

According to the third aspect, when the first inclination information is calculated, the inclination is calculated using the first inclination information. Therefore, the inclination of the controller 7 can be accurately calculated. In addition, when the first inclination information is not calculated, the inclination is calculated using the second inclination information. Even if the first inclination information is not calculated, the inclination can be calculated. Thus, the inclination of the controller 7 is accurately calculated, and the situation where the inclination cannot be calculated is avoided.

According to the fourth aspect, the second determination means can determine whether or not an image of the imaging targets can be taken by the imaging means. Only when it is determined that the image of the imaging targets can be taken, the inclination of the input device is calculated using the first inclination information. When the image of the imaging targets cannot be taken by the imaging means, the image processing means cannot calculate the first inclination information or calculates inaccurate inclination information. According to this aspect, an inaccurate inclination of the input device can be prevented from being calculated, based on inaccurate inclination information. Therefore, the inclination of the input device can be calculated more accurately.

According to the fifth aspect, the determination by the second determination means is facilitated using the magnitude of the acceleration in one axial direction along the imaging direction.

According to the sixth aspect, the determination by the second determination means is facilitated using the magnitude of the acceleration in two axial directions which are not along the imaging direction.

According to the seventh aspect, the first inclination information is corrected in accordance with the comparison result between the first inclination information and the second inclination information. Therefore, the first inclination information can be calculated more accurately. As a result, the inclination of the input device can be calculated more accurately.

According to the eighth aspect, the direction of the inclination represented by the first inclination information is corrected to be opposite in accordance with the direction of the inclination represented by the second inclination information. With a method of calculating an inclination from an image of two imaging targets, the direction of the information to be calculated may possibly be opposite. According to this aspect, when the direction of the inclination represented by the first inclination information is opposite, the first inclination information is corrected using the second inclination information. Therefore, the first inclination information can be calculated more accurately. As a result, the inclination of the input device can be calculated more accurately.

According to the ninth aspect, only when the change amount of the direction of the acceleration is equal to or less than a predetermined value, the first inclination information is corrected. Based on the change amount of the direction of the acceleration, it can be determined whether or not the input device is being violently moved. When the input device is being violently moved, the possibility that the detected acceleration is not accurate is high. According to this aspect, when the detected acceleration is not accurate, the above-mentioned correction using the acceleration is not performed. Therefore, the correction can be performed more accurately.

According to the tenth aspect, only when the difference between the magnitude of the acceleration and the magnitude of the acceleration of gravity is equal to or less than a predetermined value, the first inclination information is corrected. Based on the difference, it can be determined whether or not the input device is being violently moved. When the input device is being violently moved, the possibility that the detected acceleration is not accurate is high. According to this aspect, when the detected acceleration is not accurate, the above-mentioned correction using the acceleration is not performed. Therefore, the correction can be performed more accurately.

According to the eleventh aspect, only when the change amount of the value of the acceleration is equal to or less than a predetermined value, the first inclination information is corrected. Based on the change amount of the value of the acceleration, it can be determined whether or not the input device is being violently moved. When the input device is being violently moved, the possibility that the detected acceleration is not accurate is high. According to this aspect, when the detected acceleration is not accurate, the above-mentioned correction using the acceleration is not performed. Therefore, the correction can be performed more accurately.

These and other features, aspects and advantages of the present invention will become more apparent from the following detailed description of the present invention when taken in conjunction with the accompanying drawings.

DESCRIPTION OF NON-LIMITING, EXEMPLARY EMBODIMENTS

First Embodiment

Figure 1:
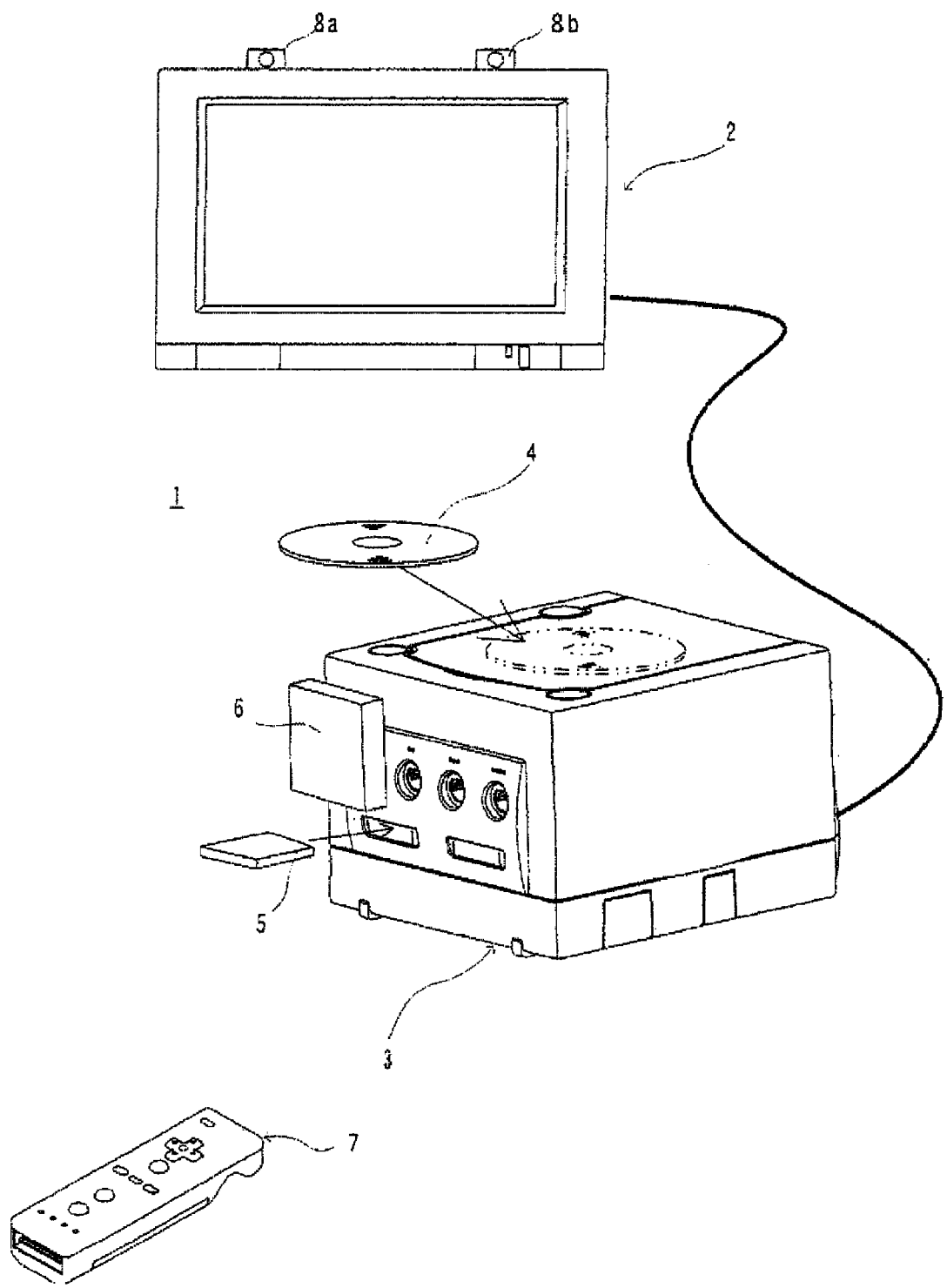
FIG. 1 is an external view of a game system including a game apparatus 3 as an exemplary inclination calculation apparatus according to one embodiment of the present invention.

With reference to FIG. 1, a game system 1 including a game apparatus as an example of an inclination calculation apparatus according to a first embodiment of the present invention will be described. FIG. 1 is an external view illustrating the game system 1. In the following exemplary description, the game apparatus according to the present invention is of an installation type.

As shown in FIG. 1, the game system 1 includes an installation type game apparatus (hereinafter, referred to simply as a "game apparatus") 3, which is connected to a display (hereinafter, referred to as a "monitor") 2 such as a home-use TV receiver including a speaker via a connection cord, and a controller 7 for giving operation data to the game apparatus 3. Two markers 8a and 8b are provided in the vicinity of the monitor 2 (above the screen of the monitor 2 in FIG. 1). The markers 8*a* and 8*b* are specifically infrared LEDs, and each outputs infrared light forward from the monitor 2. The game apparatus 3 is connected to a receiving unit 6 via a connection terminal. The receiving unit 6 receives operation data which is wirelessly transmitted from the controller 7. The controller 7 and the game apparatus 3 are connected to each other by wireless communication. On the game apparatus 3, an optical disc 4 as an example of an exchangeable information storage medium is detachably mounted. The game apparatus 3 has, on a top main surface thereof, a power ON/OFF switch, a game processing reset switch, and an OPEN switch for opening a top lid of the game apparatus 3. When a player presses the OPEN switch, the lid is opened, so that the optical disc 4 is mounted or dismounted.

On the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored on the memory card 5 and display the game image on the monitor 2. The player playing with the game apparatus 3 can enjoy the game by operating the controller 7 while watching the game image displayed on the display screen of the monitor 2.

The controller 7 wirelessly transmits operation data from a communication section 36 included therein (described later) to the game apparatus 3 connected to the receiving unit 6, using the technology of, for example, Bluetooth (registered trademark). The controller 7 is operation means for operating an operation target (an object displayed on the display screen of the monitor 2). The controller 7 includes an operation section having a plurality of operation buttons. As described later in detail, the controller 7 also includes an acceleration sensor 37 (described later) for detecting an acceleration in at least two axial directions perpendicular to each other. Data representing an acceleration detected by the acceleration sensor 37 is transmitted to the game apparatus 3 as a part of the operation data. The controller 7 also includes an imaging information calculation section 35 (described later) for taking an image seen from the controller 7. The imaging information calculation section 35 takes an image of each of the markers 8*a* and 8*b* located in the vicinity of the monitor 2. Coordinate set data representing the positions of the images of the markers 8*a* and 8*b* in the image taken by the imaging information calculation section 35 (taken image) is transmitted to the game apparatus 3 as a part of the operation data. The game apparatus 3 calculates an inclination of the controller 7 using the data representing the acceleration and the coordinate set data.

Figure 2:
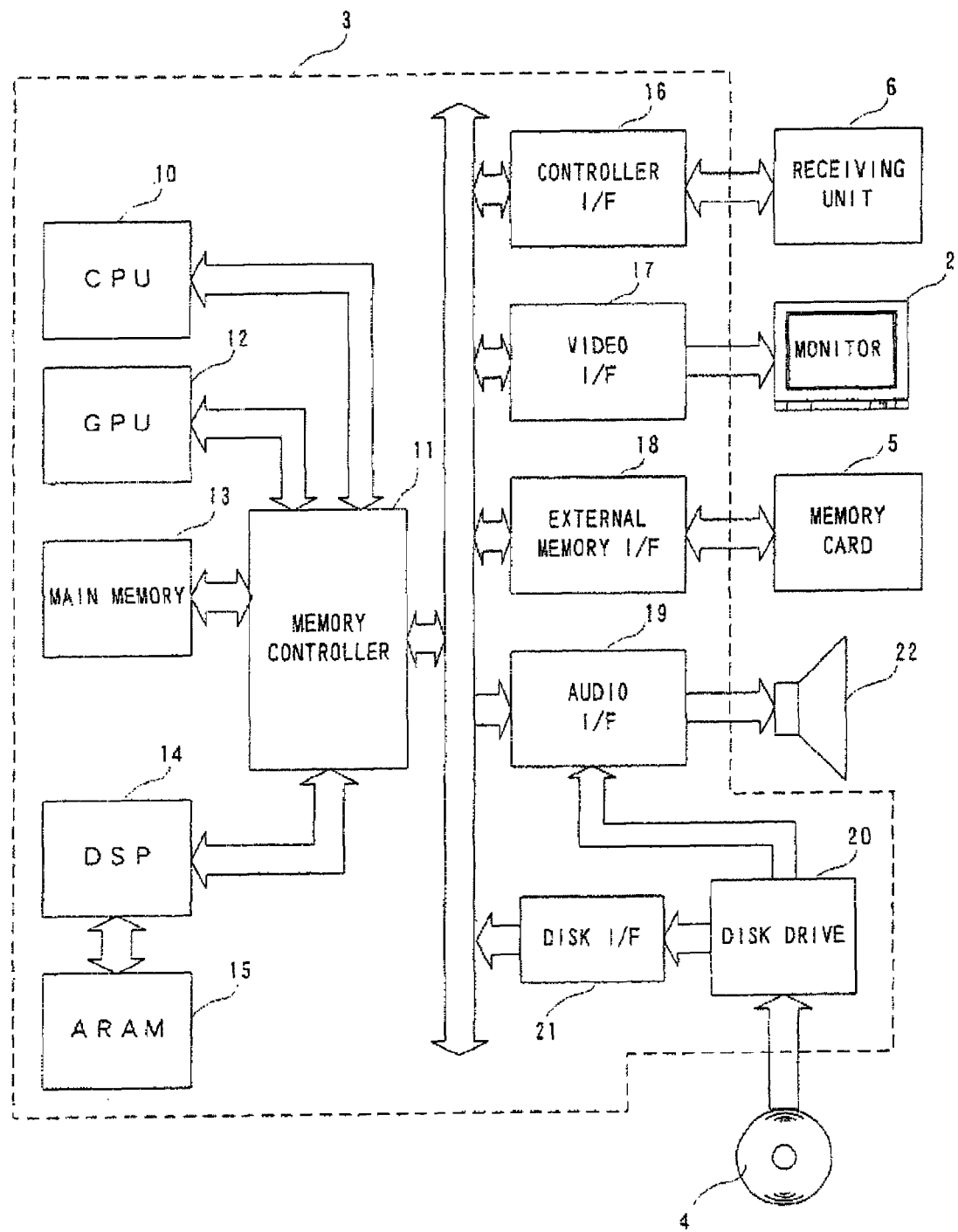
FIG. 2 is a functional block diagram of the game apparatus 3.

With reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 10 for executing various types of programs. The CPU 10 executes a start program stored in a boot ROM (not shown) to, for example, initialize memories including a main memory 13, and then executes a game program stored on the optical disc 4 to perform game processing or the like in accordance with the game program. The CPU 10 is connected to a GPU (Graphics Processing Unit) 12, the main memory 13, a DSP (Digital Signal Processor) 14, and an ARAM (Audio RAM) 15 via a memory controller 11. The memory controller 11 is connected to a controller I/F (interface) 16, a video I/F 17, an external memory I/F 18, an audio I/F 19, and a disc I/F 21 via a predetermined bus. The controller I/F 16, the video I/F 17, the external memory I/F 18, the audio I/F 19 and the disc I/F 21 are respectively connected to the receiving unit 6, the monitor 2, the external memory card 5, a speaker 22 and a disc drive 20.

The GPU 12 performs image processing based on an instruction from the CPU 10. The GPU 12 includes, for example, a semiconductor chip for performing calculation processing necessary for displaying 3D graphics. The GPU 12 performs the image processing using a memory dedicated for image processing (not shown) and a part of the storage area of the main memory 13. The GPU 12 generates game image data and a movie to be displayed on the display screen of the monitor 2 using such memories, and outputs the generated data or movie to the monitor 2 via the memory controller 11 and the video I/F 17 as necessary.

The main memory 13 is a storage area used by the CPU 10, and stores a game program or the like necessary for processing performed by the CPU 10 as necessary. For example, the main memory 13 stores a game program read from the optical disc 4 by the CPU 10, various types of data or the like. The game program, the various types of data or the like stored in the main memory 13 are executed by the CPU 10.

The DSP 14 processes sound data or the like generated by the CPU 10 during the execution of the game program. The DSP 14 is connected to the ARAM 15 for storing the sound data or the like. The ARAM 15 is used when the DSP 14 performs predetermined processing (for example, storage of the game program or sound data already read). The DSP 14 reads the sound data stored in the ARAM 15 and outputs the sound data to the speaker 22 included in the monitor 2 via the memory controller 11 and the audio I/F 19.

The memory controller 11 comprehensively controls data transfer, and is connected to the various I/Fs described above. The controller I/F 16 includes, for example, four controller I/Fs, and communicably connects the game apparatus 3 to an external device which is engageable via connectors of the controller I/Fs. For example, the receiving unit 6 is engaged with such a connector and is connected to the game apparatus 3 via the controller I/F 16. As described above, the receiving unit 6 receives the operation data from the controller 7 and outputs the operation data to the CPU 10 via the controller I/F 16. In other embodiments, the game apparatus 3 may include a receiving module for receiving the operation data transmitted from the controller 7, instead of the receiving unit 6. In this case, the operation data received by the receiving module is output to the CPU 10 via a predetermined bus. The video I/F 17 is connected to the monitor 2. The external memory I/F 18 is connected to the external memory card 5 and is accessible to a backup memory or the like provided in the external card 5. The audio I/F 19 is connected to the speaker 22 built in the monitor 2, and is connected such that the sound data read by the DSP 14 from the ARAM 15 or sound data directly output from the disc drive 20 is output from the speaker 22. The disc I/F 21 is connected to the disc drive 20. The disc drive 20 reads data stored at a predetermined reading position of the optical disc 4 and outputs the data to a bus of the game apparatus 3 or the audio I/F 19.

Figure 3A:
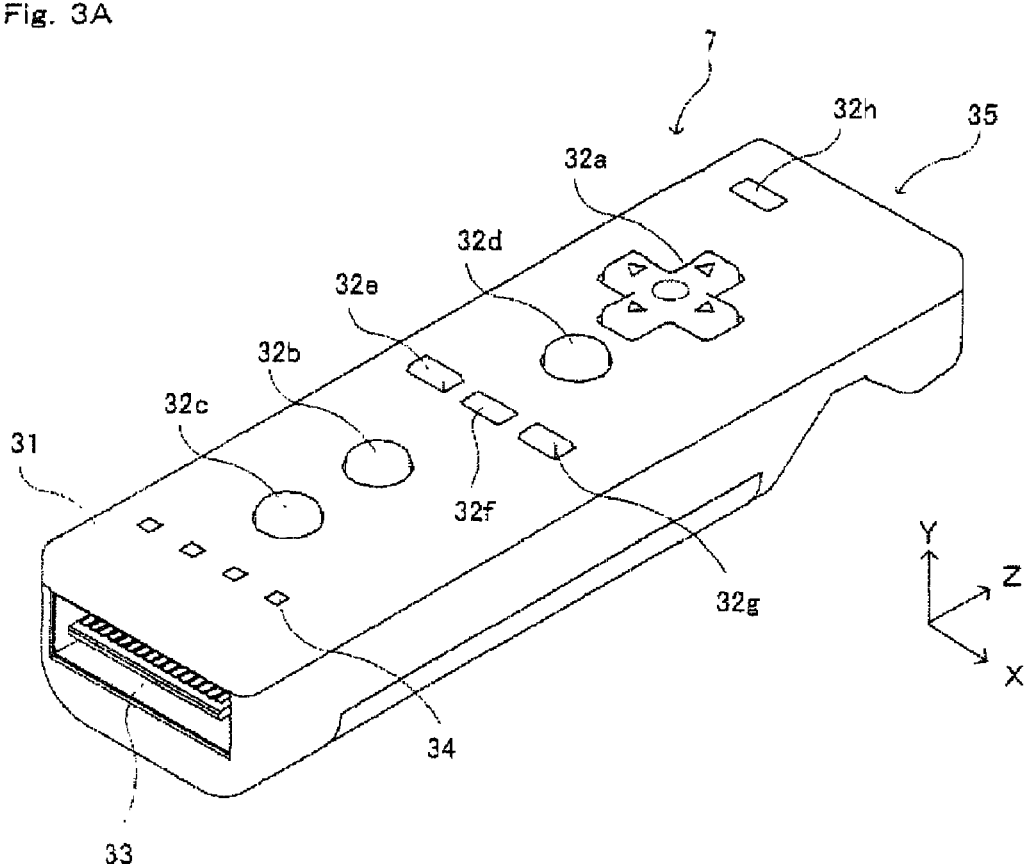
FIG. 3A is an isometric view of a controller 7.
Figure 3B:
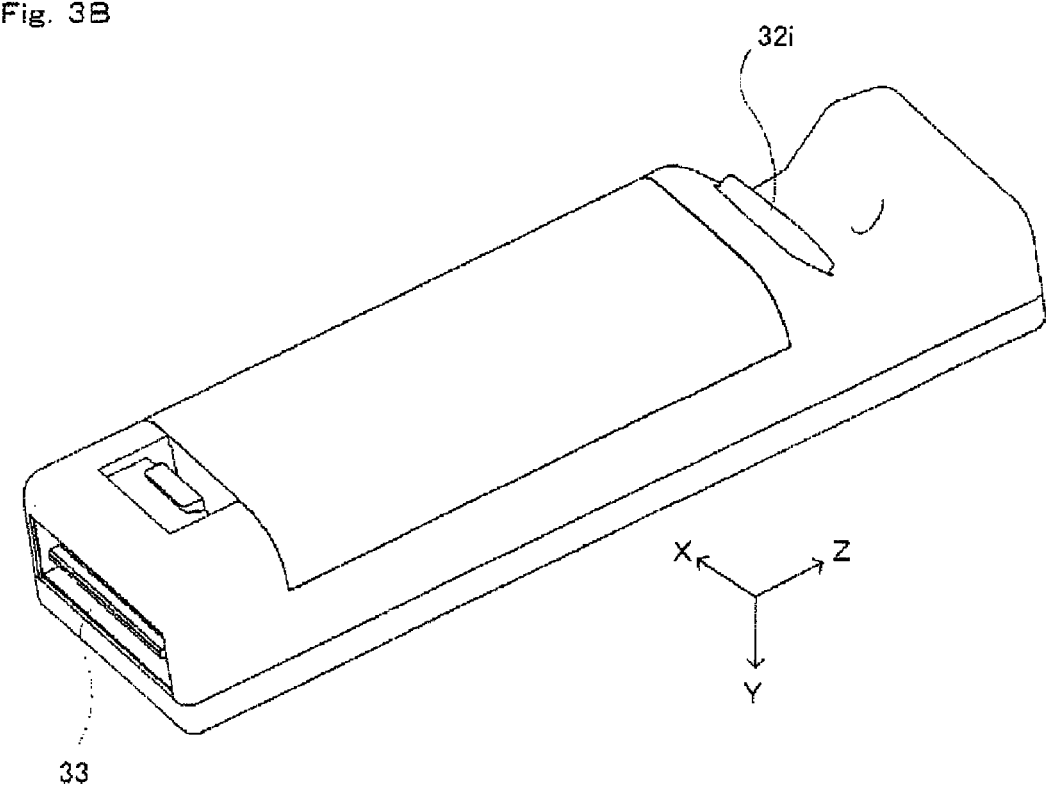
FIG. 3B is another isometric view of the controller 7.
Figure 4:
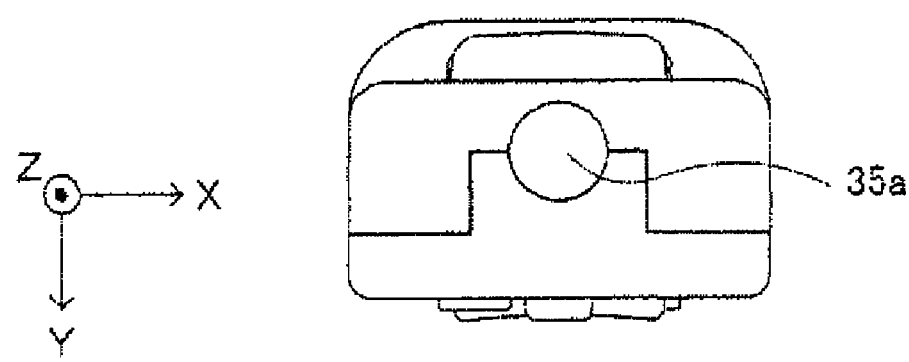
FIG. 4 is a front view of the controller 7.

With reference to FIG. 3A through FIG. 8, the controller 7 as an exemplary input device will be described. FIG. 3A through FIG. 5B are external isometric views of the controller 7. FIG. 3A is an isometric view of the controller 7 seen from the top rear side thereof. FIG. 3B is an isometric view of the controller 7 seen from the bottom rear side thereof. FIG. 4 is a front view of the controller 7.

As shown in FIG. 3A, FIG. 3B and FIG. 4, the controller 7 includes a housing 31 formed by plastic molding or the like.

The housing 31 has a generally parallelepiped shape extending in a longitudinal or front-rear direction (the Z-axis direction shown in FIG. 3A). The overall size of the housing 31 is small enough to be held by one hand of an adult or even a child. The player can use the controller 7 to perform a game operation of pressing buttons provided thereon, a game operation of changing the inclination of the controller 7 itself (the angle of the controller 7 with respect to a direction of gravity), and a game operation of changing the position or direction of the controller 7 itself. For example, the player can change the inclination of the controller 7 to move an operation target (object) appearing in the game space. Also for example, the player can rotate the controller 7 with the longitudinal direction thereof as an axis to move the operation target through processing of the linear acceleration signals generated by the acceleration sensor 37. The player can change the position indicated by the controller 7 on the display screen to move the object appearing in the game space. The "position indicated by the controller 7 on the display screen" is ideally a position at which a phantom straight line extending from a front end of the controller 7 in the longitudinal direction crosses the display screen of the monitor 2. However, it is not necessary that the "position indicated by the controller 7 on the display screen" is strictly such a position. It is sufficient that the game apparatus 3 can calculate a position in the vicinity thereof. Hereinafter, a position indicated by the controller 7 on the display screen will be referred to as an "indicated position" or an "indicated position by the controller 7". The longitudinal direction of the controller 7 (housing 31) will be sometimes referred to as an "indicated direction".

The housing 31 has a plurality of operation buttons. Provided on a top surface of the housing 31 are a cross key 32a, an X button 32b, a Y button 32c, a B button 32d, a select switch 32e, a menu switch 32f, and a start switch 32g. On a bottom surface of the housing 31, a recessed portion is formed. On a rear slope surface of the recessed portion, an A button 32i is provided. These buttons and switches are assigned various functions in accordance with the game program executed by the game apparatus 3, but this will not be described in detail because the functions are not directly relevant to the present invention. On the top surface of the housing 31, a power switch 32h is provided or remotely turning on or off the game apparatus 3.

Figure 5A:
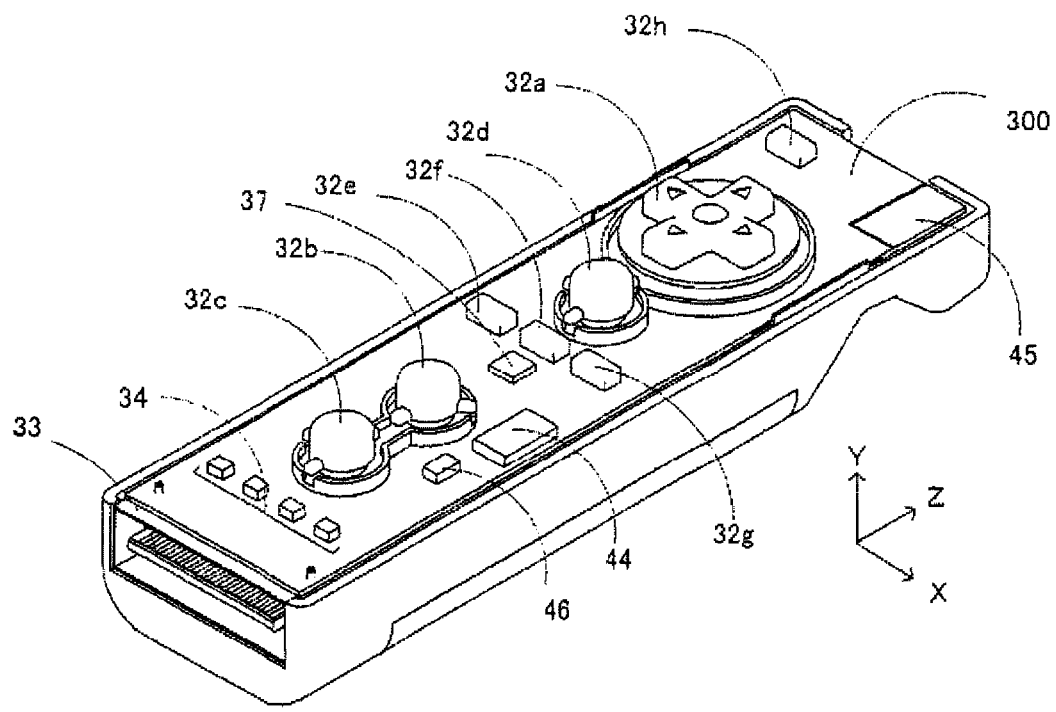
FIG. 5A is a view illustrating an internal structure of the controller 7.
Figure 5B:
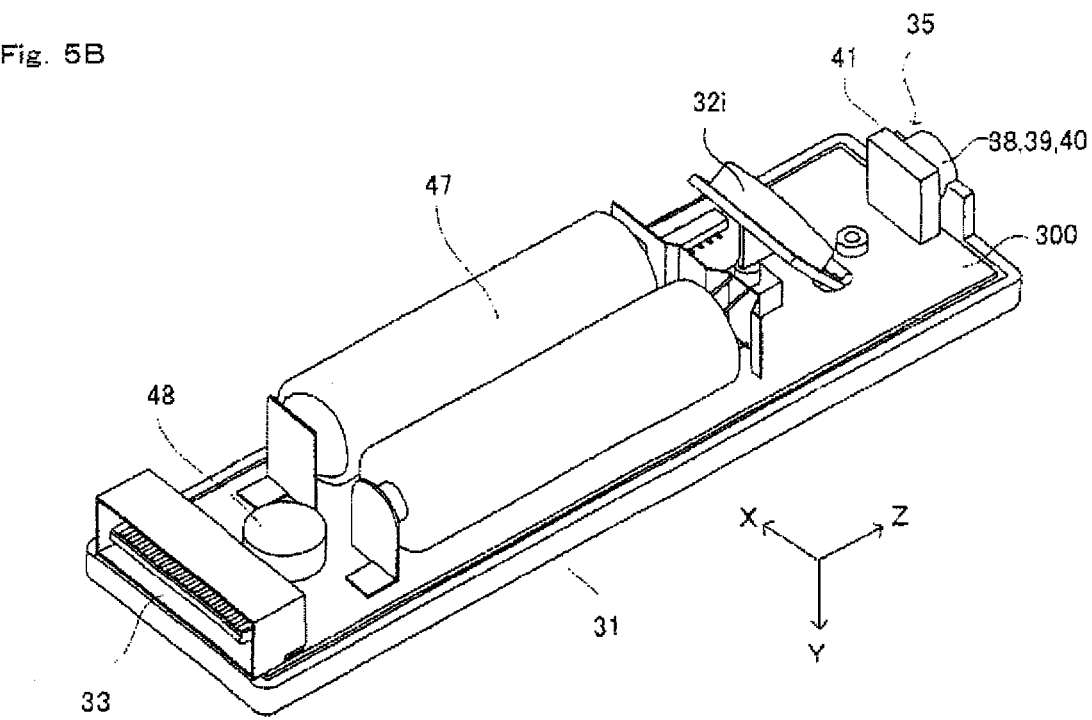
FIG. 5B is another view illustrating the internal structure of the controller 7.

The controller 7 has the imaging information calculation section 35 (FIG. 5B). As shown in FIG. 4, a light incident opening 35a of the imaging information calculation section 35 is provided on a front surface of the housing 31. On a rear surface of the housing 31, a connector 33 is provided. The connector 33 is, for example, a 32-pin edge connector, and is used for connecting the controller 7 to another device. In a rear part of the top surface of the housing 31, a plurality of LEDs 34 are provided. The controller 7 is assigned a controller type (number) so as to be distinguishable from the other controllers 7. The LEDs 34 are used for informing the player of the controller type which is currently set to controller 7 that he/she is using. Specifically, when the controller 7 transmits the operation data to the game apparatus 3, one of the plurality of LEDs 34 corresponding to the controller type is lit up.

Figure 6:
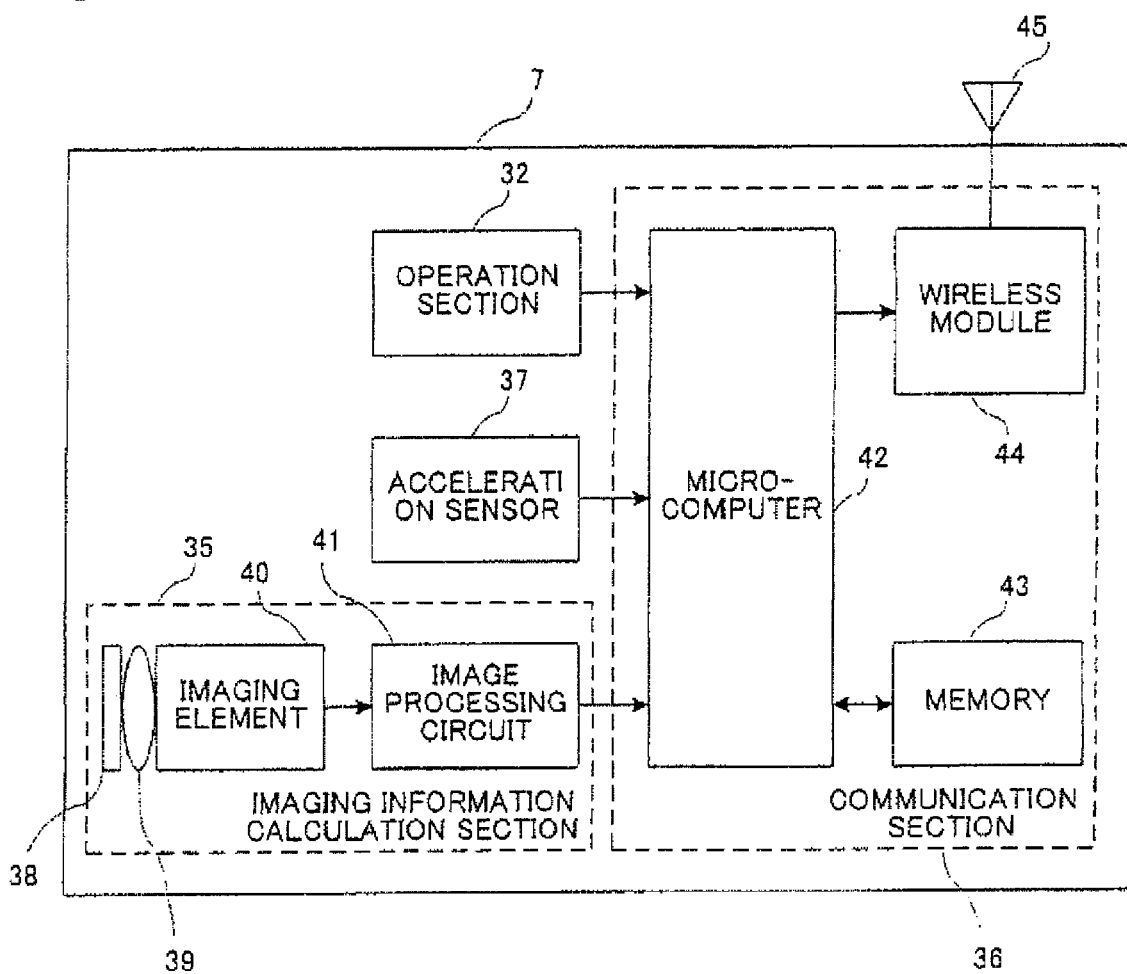
FIG. 6 is a block diagram illustrating a structure of the controller 7.

With reference to FIG. 5A, FIG. 5B and FIG. 6, an internal structure of the controller 7 will be described. FIG. 5A and FIG. 5B illustrate an internal structure of the controller 7. FIG. 5A is an isometric view illustrating a state where an upper casing (a part of the housing 31) of the controller 7 is removed. FIG. 5B is an isometric view illustrating a state where a lower casing (a part of the housing 31) of the controller 7 is removed. FIG. 5B shows a reverse side of a substrate 300 shown in FIG. 5A.

As shown in FIG. 5A, the substrate 300 is fixed inside the housing 31. On a top main surface of the substrate 300, the operation buttons 32a through 32h, the acceleration sensor 37, the LEDs 34, a quartz oscillator 46, a wireless module 44, an antenna 45 and the like are provided. These elements are connected to a microcomputer 42 (see FIG. 6) via lines (not shown) formed on the substrate 300 and the like. The wireless module 44 and the antenna 45 allow the controller 7 to act as a wireless controller. The quartz oscillator 46 generates a reference clock of the microcomputer 42 described later.

As shown in FIG. 5B, at a front edge of a bottom main surface of the substrate 300, the imaging information calculation section 35 is provided. The imaging information calculation section 35 includes an infrared filter 38, a lens 39, an imaging element 40 and an image processing circuit 41 located in this order from the front surface of the controller 7. These elements are attached to the bottom main surface of the substrate 300. At a rear edge of the bottom main surface of the substrate 300, the connector 33 is attached. The operation button 32i is attached on the bottom main surface of the substrate 300 rearward to the imaging information calculation section 35, and cells 47 are accommodated rearward to the operation button 32i. On the bottom main surface of the substrate 300 between the cells 47 and the connector 33, a vibrator 48 is attached. The vibrator 48 may be, for example, a vibration motor or a solenoid. The controller 7 is vibrated by an actuation of the vibrator 48, and the vibration is conveyed to the player holding the controller 7. Thus, a so-called vibration-responsive game is realized.

Figure 7:
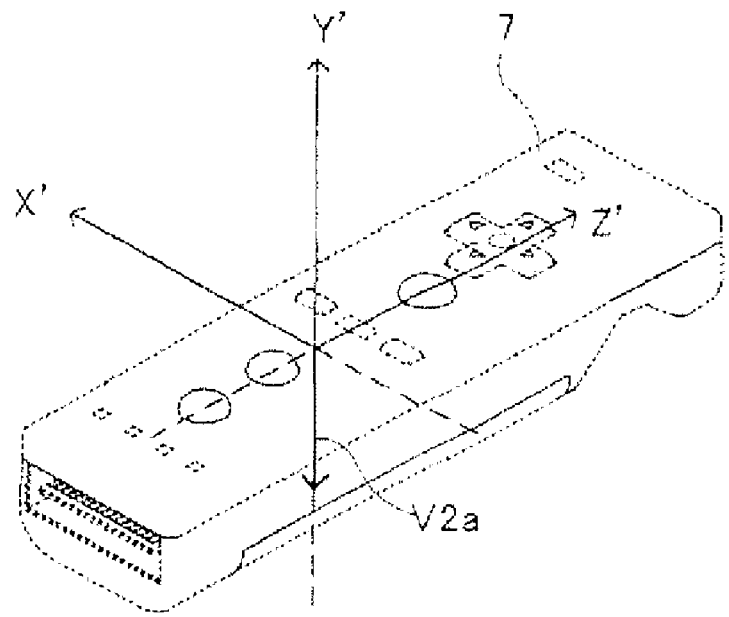
FIG. 7 is a view illustrating the relationship between the inclination of the controller 7 and the output from an acceleration sensor.
Figure 8:
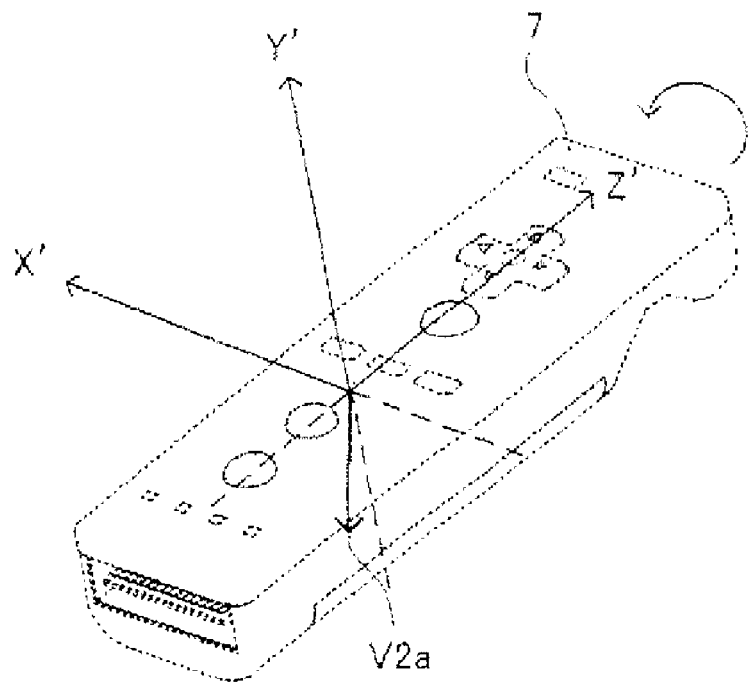
FIG. 8 is another view illustrating the relationship between the inclination of the controller 7 and the output from the acceleration sensor.

FIG. 6 is a block diagram showing the structure of the controller 7. The controller 7 includes the acceleration sensor 37 mentioned above. The acceleration sensor 37 detects an acceleration of the controller 7 (including an acceleration of gravity). Namely, the acceleration sensor 37 detects a force applied to the controller 7 (including gravity) and outputs the detected force as an acceleration. FIG. 7 and FIG. 8 show the relationship between the inclination of the controller 7 and the output of the acceleration sensor 37. As shown in FIG. 7 and FIG. 8, the acceleration sensor 37 detects an acceleration in each of three axial directions regarding the controller 7, i.e., the up down direction (Y'-axis direction in FIG. 7), the left-right direction (X'-axis direction in FIG. 7), and the front-rear direction (the Z'-axis direction in FIG. 7). Namely, the acceleration sensor 37 detects an acceleration in a linear direction along each axis, and therefore an output from the acceleration sensor 37 represents a value of an acceleration in each axis. Therefore, the detected acceleration is represented as a three-dimensional vector in an X'-Y'-Z' coordinate system (see FIG. 7 and FIG. 8) which is set based on the controller 7. Herein, the upward direction regarding the controller 7 is set as a positive Y'-axis direction, the horizontal direction regarding the controller 7 is set as a positive Z'-axis direction, and the leftward direction regarding the controller 7 in the case where the controller 7 is viewed from the rear end thereof toward the front end thereof is set as a positive X'-axis direction.

As explained above, the controller 7 preferably includes a three-axis, linear acceleration sensor 37 that detects linear acceleration in each of the three axial directions described above. Alternatively, a two axis linear accelerometer that only detects linear acceleration along each of the X-axis and Y-axis (or other pair of axes) may be used in another embodiment depending on the type of control signals desired. As a non-limiting example, the three-axis or two-axis linear accelerometer 37 may be of the type available from Analog Devices, Inc. or STMicroelectronics N.V. Preferably, the acceleration sensor 37 is an electrostatic capacitance or capacitance-coupling type that is based on silicon micro-machinedMEMS (microelectromechanical systems) technology. However, any other suitable accelerometer technology (e.g., piezoelectric type or piezoresistance type) now existing or later developed may be used to provide the three-axis or two-axis acceleration sensor 37.

As one skilled in the art understands, linear accelerometers, as used in acceleration sensor 37, are only capable of detecting acceleration along a straight line corresponding to each axis of the acceleration sensor. In other words, the direct output of the acceleration sensor 37 is limited to signals indicative of linear acceleration (static or dynamic) along each of the two or three axes thereof. As a result, the acceleration sensor 37 cannot directly detect movement along a non-linear (e.g. arcuate) path, rotation, rotational movement, angular displacement, tilt, position, attitude or any other physical characteristic.

However, through additional processing of the linear acceleration signals output from the acceleration sensor 37, additional information relating to the controller 7 can be inferred or calculated, as one skilled in the art will readily understand from the description herein. For example, by detecting static, linear acceleration (i.e., gravity), the linear acceleration output of the acceleration sensor 37 can be used to infer or calculate tilt or inclination of the object relative to the gravity vector by correlating tilt angles with detected linear acceleration. In this way, the acceleration sensor 37 can be used in combination with the micro-computer 42 (or another processor) to determine tilt, attitude or position of the controller 7. Similarly, various movements and/or positions of the controller 7 can be calculated or inferred through processing of the linear acceleration signals generated by the acceleration sensor 37 when the controller 7 containing the acceleration sensor 37 is subjected to dynamic accelerations by, for example, the hand of a user. In another embodiment, the acceleration sensor 37 may include an embedded signal processor or other type of dedicated processor for performing any desired processing of the acceleration signals output from the accelerometers therein prior to outputting signals to micro-computer 42. For example, the embedded or dedicated processor could convert the detected acceleration signal to a corresponding tilt angle when the acceleration sensor is intended to detect static acceleration (i.e., gravity).

FIG. 7 shows a state where an acceleration of gravity (vector V2a in FIG. 7) is directed downward regarding the controller 7. In this state, the value V2a of an acceleration detected by the acceleration sensor 37 (hereinafter, referred to as an "acceleration vector") is in a negative Y'-axis direction. In FIG. 7 and FIG. 8, it is assumed that the controller 7 is in a still state. In the state shown in FIG. 7, only the Y' coordinate value of the acceleration vector V2a is not zero, and both the X' coordinate value and the Z' coordinate value of the acceleration vector V2a are zero. FIG. 8 shows a state in which the controller 7 is inclined as a result of being rotated from the state shown in FIG. 7 around the Z' axis. In the state shown in FIG. 8, the direction of the acceleration vector V2a is changed from the state in FIG. 7. The X' coordinate value and the Y' coordinate value of the acceleration vector V2a are not zero, and the Z' coordinate value of the acceleration vector V2a is zero because the controller 7 has been rotated around the Z' axis. As shown in FIG. 7 and FIG. 8, the acceleration sensor 37 can detect a value of an acceleration having three axial directions regarding the controller 7 as components. Thus, a calculation handling the value of the acceleration as an acceleration vector having the three axial components is performed by software processing using a computer such as the microcomputer 42 or the CPU 10, and thus an inclination of the controller 7 can be calculated. Data representing the acceleration detected by the acceleration sensor 37 (acceleration data) is output to the communication section 36. In the first embodiment, the acceleration sensor 37 outputs a value in accordance with the acceleration sequentially (specifically, frame by frame). The game apparatus 3 performs a predetermined calculation handling the value as an acceleration vector to calculate the inclination (posture) of the controller 7, and executes game processing in accordance with the inclination.

In this embodiment, the magnitude of an acceleration which is detected when the controller 7 is in a still state, i.e., the magnitude of an acceleration which represents only an acceleration of gravity, is set as 1. For example, the values of the components of the acceleration vector V2a detected in the state shown in FIG. 7 are (0, 1, 0).

In the first embodiment, it is intended to calculate an inclination of the controller 7 in two axial directions vertical to the imaging direction of the imaging means, i.e., the X'-Y' directions. Therefore, in the first embodiment, an acceleration sensor for detecting an acceleration in only two axial directions (X'-Y' directions) may be used instead of the acceleration sensor 37 for detecting an acceleration in three axial directions. The acceleration sensor 37 is typically of a static capacitance type, but may be of any other system.

The controller 7 includes the operation section 32 (operation buttons), the imaging information calculation section 35, and the communication section 36 in addition to the acceleration sensor 37. In this embodiment, the controller 7 only needs to include acceleration detection means (the acceleration sensor 37) and may not absolutely need to include the operation section 32 or the imaging information calculation section 35.

Returning to FIG. 6, the imaging information calculation section 35 uses the image taken by the imaging means to calculate the positions of the markers 8a and 8b on the image. The imaging information calculation section 35 is a system for analyzing image data taken by imaging means and detecting the position of the center of gravity, the size and the like of an area having a high brightness in the image data. The imaging information calculation section 35 has, for example, a maximum sampling period of about 200 frames/sec., and therefore can trace and analyze even a relatively fast motion of the controller 7.

Specifically, the imaging information calculation section 35 includes the infrared filter 38, the lens 39, the imaging element 40 and the image processing circuit 41. The infrared filter 38 allows only infrared light to pass therethrough, among light incident on the front surface of the controller 7. The markers 8a and 8b located in the vicinity of the display screen of the monitor 2 are infrared LEDs for outputting infrared light forward from the monitor 2. Therefore, the provision of the infrared filter 38 allows the image of each of the markers 8a and 8b to be taken more accurately. The lens 39 collects the infrared light which has passed through the infrared filter 38 and outputs the infrared light to the imaging element 40. The imaging element 40 is a solid-state imaging device such as, for example, a CMOS sensor or a CCD. The imaging element 40 takes an image of the infrared light collected by the lens 39. Accordingly, the imaging element 40 takes an image of only the infrared light which has passed through the infrared filter 38 and generates image data. Hereinafter, an image taken by the imaging element 40 will be referred to as a "taken image". The image data generated by the imaging element 40 is processed by the image processing circuit 41. The image processing circuit 41 calculates the positions of the imaging targets (the markers 8a and 8b) in the taken image. The positions are represented in a coordinate system (x-y coordinate system) in which the downward direction of the taken image is a positive y-axis direction and the rightward direction of the taken image is a positive x-axis direction. The image processing circuit 41 outputs coordinate values indicating the respective positions of the markers 8*a* and 8*b* in the taken image to the communication section 36 as imaging data. Since these coordinate values vary in accordance with the direction or position of the controller 7 itself, the game apparatus 3 can calculate the direction and position of the controller 7 using these coordinate values.

The communication section 36 includes the microcomputer 42, a memory 43, the wireless module 44 and the antenna 45. The microcomputer 42 controls the wireless module 44 for wirelessly transmitting the data obtained by the microcomputer 42 while using the memory 43 as a storage area during processing.

Data which is output from the operation section 32, the acceleration sensor 37 and the imaging information calculation section 35 to the microcomputer 42 is temporarily stored in the memory 43. The wireless transmission from the communication section 36 to the receiving unit 6 is performed at a predetermined time interval. Since game processing is generally performed at a cycle of 1/60 sec., the wireless transmission needs to be performed at a cycle of a shorter time period. At the transmission timing to the receiving unit 6, the microcomputer 42 outputs the data stored in the memory 43 to the wireless module 44 as operation data. The wireless module 44 uses, for example, the Bluetooth (registered trademark) technology to modulate a carrier wave of a predetermined frequency with the operation data and radiate the resultant very weak electric signal from the antenna 45. Namely, the operation data is modulated into a very weak electric signal by the wireless module 44 and transmitted from the controller 7. The very weak electric signal is received by the receiving unit 6 on the side of the game apparatus 3. The received very weak electric signal is demodulated or decoded, so that the game apparatus 3 can obtain the operation data. The CPU 10 of the game apparatus 3 executes the game processing based on the obtained operation data and the game program.

The shape of the controller 7, and the shape, number, position or the like of the operation buttons and switches shown in FIG. 3A through FIG. 5B are merely exemplary, and may be altered without departing from the scope of the present invention. The position of the imaging information calculation section 35 in the controller 7 (the light incident opening 35*a* of the imaging information calculation section 35) does not need to be on the front surface of the housing 31, and may be on another surface as long as light can enter from the outside of the housing 31. In this case, the "indicated direction" is a direction vertical to the light incident opening, i.e., the direction in which the imaging element 40 takes images of the imaging targets.

By using the controller 7, the player can perform a game operation of changing the inclination of the controller 7, of changing the position of the controller 7 itself, or of rotating the controller 7, in addition to the conventional game operation of pressing the operation buttons or switches. Hereinafter, the game operations using the controller 7 will be described.

Figure 9:
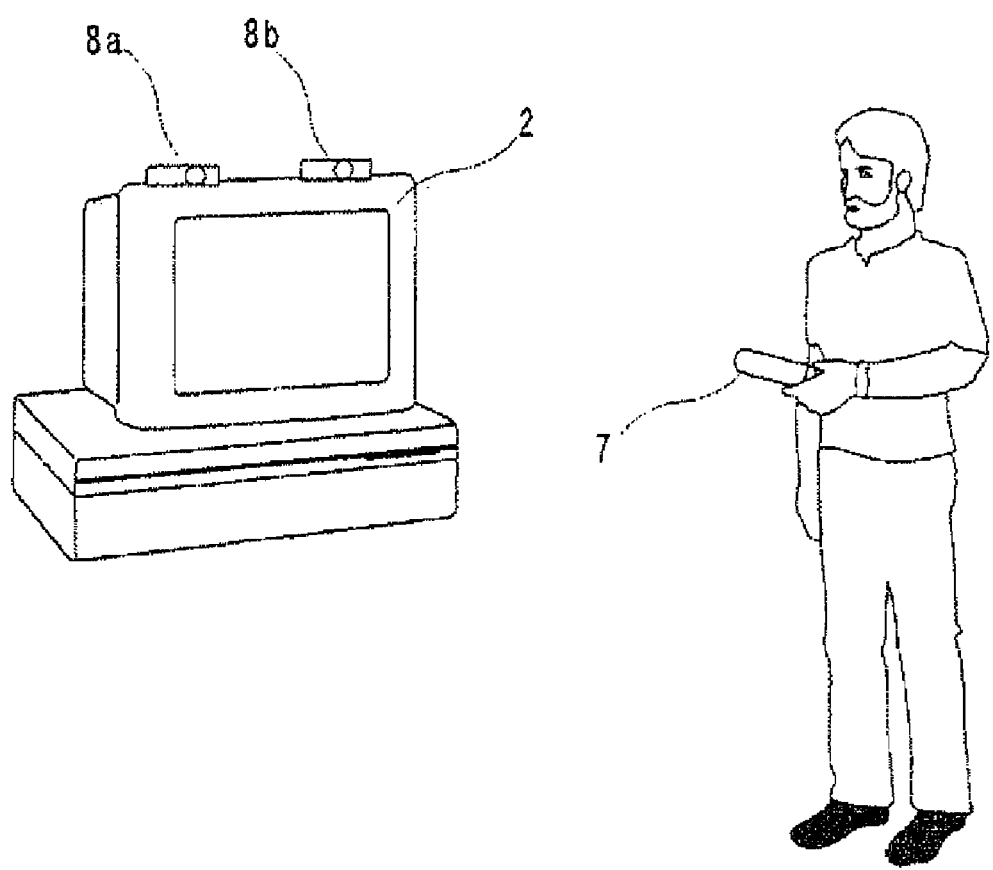
FIG. 9 shows a general view of a game operation using the controller 7.

FIG. 9 is a general view of a game operation using the controller 7. As shown in FIG. 9, when playing the game using the controller 7 with the game system 1, the player holds the controller 7 with one hand. The markers 8*a* and 8*b* are located parallel to the transverse or width direction of the monitor 2. In this embodiment, the player uses the controller 7 at almost the same height as the monitor 2 and holds the controller 7 in the state where the longitudinal direction of the controller 7 is almost parallel to the ground. The player holds the controller 7 such that the front surface of the controller 7 (having the light incident opening 35*a* by which the imaging information calculation section 35 takes the image of each of the markers 8*a* and 8*b*) faces the markers 8*a* and 8*b*. In this state, the player performs a game operation of changing the inclination of the controller 7, of changing the position indicated by the controller 7 on the display screen (indicated position), or of changing the distance between the controller 7 and the markers 8*a* and 8*b*.

Figure 10:
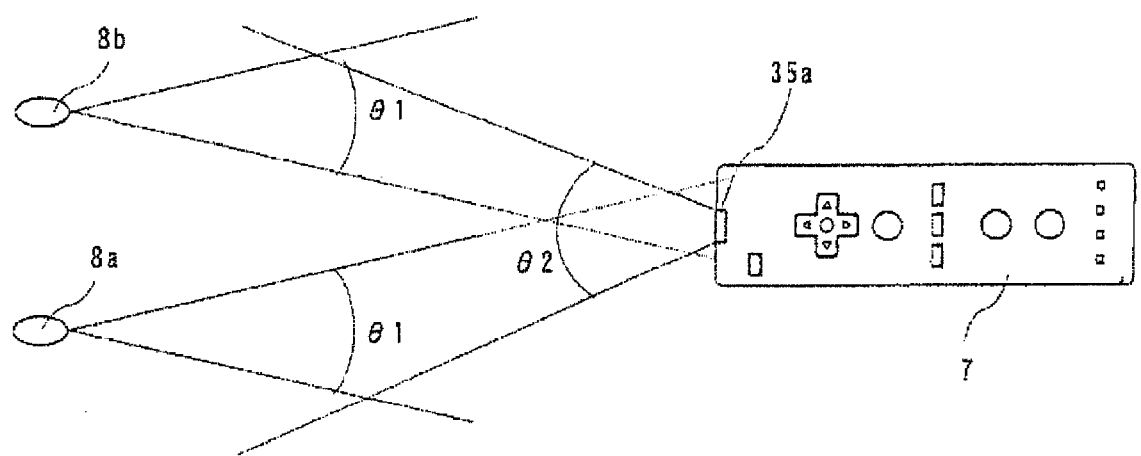
FIG. 10 illustrates viewing angles of markers 8a and 8b and the controller 7.

FIG. 10 illustrates the viewing angles of the markers 8*a* and 8*b* and the controller 7. As shown in FIG. 10, the markers 8*a* and 8*b* each radiate infrared light at a viewing angle $\theta 1$. The imaging element 40 of the imaging information calculation section 35 can receive light incident thereon at a viewing angle $\theta 2$ centered around the viewing direction of the controller 7. For example, the viewing angle $\theta 1$ of each of the markers 8*a* and 8*b* is 34° (half value angle), and the viewing angle $\theta 2$ of the imaging element 40 is 41°. The player holds the controller 7 at the position and the direction with which the imaging element 40 can receive the infrared light from both the markers 8*a* and 8*b*. Specifically, the player holds the controller 7 in a range in which at least one of the markers 8*a* and 8*b* exists in the viewing angle $\theta 2$ of the imaging element 40 and the controller 7 exists in the viewing angle $\theta 1$ of at least one of the markers 8*a* and 8*b*. In this state, the controller 7 can detect the marker 8*a* and/or the marker 8*b*. When the position or the direction of the controller 7 is outside the above-described range, the marker 8*a* and/or the marker 8*b* cannot be detected. Thus, the game apparatus 3 cannot calculate the inclination of the controller 7 using the taken image. Hereinafter, the above-described range will be referred to as a "detectable range".

Figure 11:
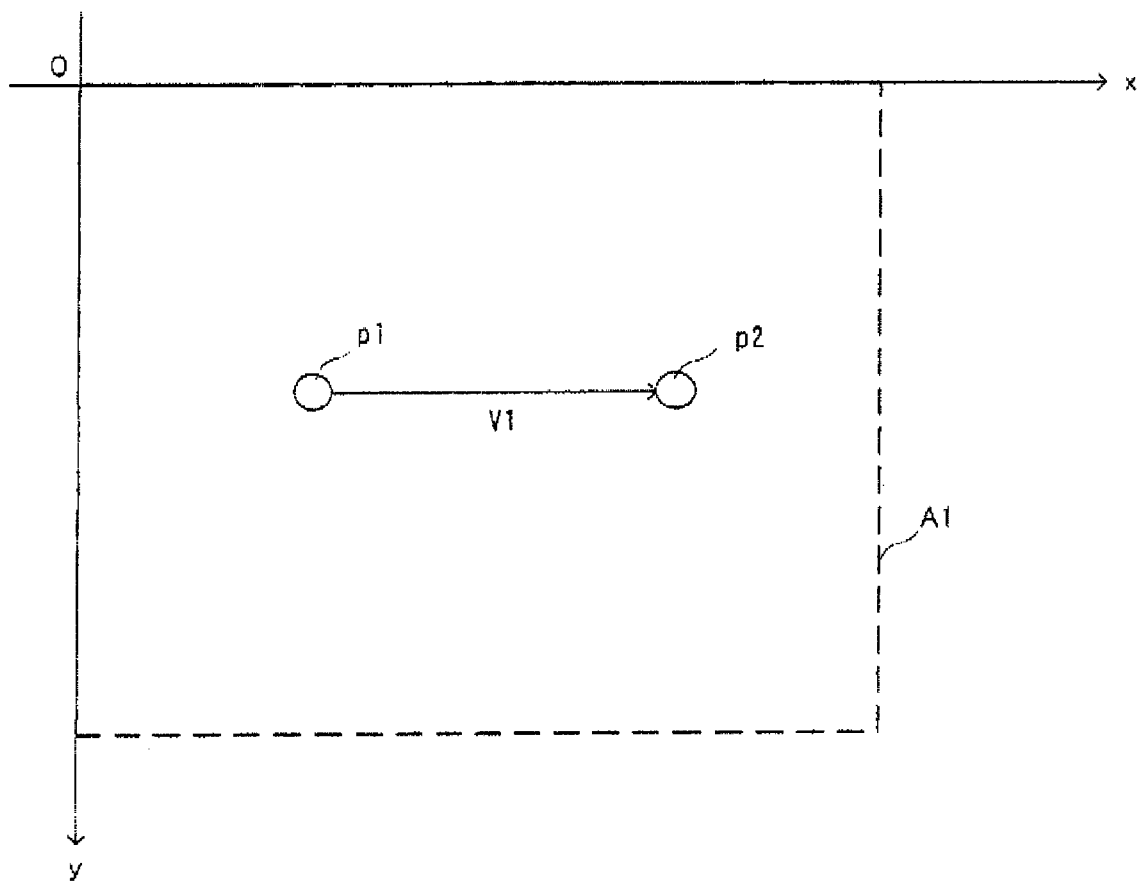
FIG. 11 shows an example of a taken image including target images.

In the case where the controller 7 is held in the detectable range, the image of each of the markers 8*a* and 8*b* is taken by the imaging information calculation section 35. Namely, the taken image obtained by the imaging information calculation section 35 includes the image of each of the markers 8*a* and 8*b* (target images). FIG. 11 shows an example of a taken image including the target images. In FIG. 11, area A1 indicated by the dashed line represents an area in the taken image. The image processing circuit 41 uses image data of the taken image including the target images to detect coordinate sets representing positions of the markers 8*a* and 8*b* in the taken image.

Specifically, the image processing circuit 41 detects a coordinate set representing a position of an area in the taken image matching a predetermined condition on an area-by-area basis. The predetermined condition is a condition for detecting a target image. Specifically, the predetermined condition is that the area needs to have a brightness having a predetermined value or higher (high brightness area) and needs to have a size within a predetermined range. The predetermined condition only needs to be a condition for detecting a target image, and in other embodiments, may include a condition regarding the color of the image. The target images appear as high brightness areas in the image data of a taken image. Therefore, the image processing circuit 41 first detects the high brightness areas as candidates of the target images. Next, based on the size of each detected high brightness area, the image processing circuit 41 determines whether or not the high brightness area is a target image. The taken image may include images other than the target images (images 8*a*' and 8*b*' of the markers 8*a* and 8*b*) due to sunlight coming through a window or light of a fluorescent lamp in the room. The above-described determination is performed in order to distinguish the target images 8a' and 8b' from the other images so that the target images are accurately detected. Specifically, it is determined whether or not each detected high brightness area has a size within a predetermined size range. When the high brightness area has a size within the predetermined size range, the high brightness area is determined to be a target image; whereas when the high brightness area has a size outside the predetermined size range, the high brightness area is determined not to be a target image.

The image processing circuit 41 calculates the position of a high brightness area which is determined to be a target image as a result of the determination. Specifically, the image processing circuit 41 calculates the position of the center of gravity of the high brightness area. The position of the center of gravity can be calculated at a more detailed scale than the resolution of the imaging element 40. In this embodiment, the resolution of the taken image obtained by the imaging element 40 is 126×96, and the position of the center of gravity is calculated at a scale of 1024×768. Namely, the coordinate set of the position of the center of gravity is represented by integer values from (0, 0) to (1024, 768). As shown in FIG. 11, a position in the taken image is represented by a coordinate system (x-y coordinate system) in which the upper left corner of the taken image is the origin, the downward direction from the origin is a positive y-axis direction, and the rightward direction from the origin is a positive x-axis direction. The image processing circuit 41 outputs data representing the coordinate set calculated by the above-described calculation processing. As described above, the data on the coordinate set is transmitted to the game apparatus 3 by the microcomputer 42 as the operation data. In this embodiment, the processing up to the calculation of a coordinate set representing the position of the target image based on the taken image is executed by the image processing circuit 41 and/or the microcomputer 42 of the controller 7. For example, the taken image may be transmitted to the game apparatus 3 so that processing equivalent to the subsequent processing is executed by the CPU 10 of the game apparatus 3 or the like.

In this manner, the image processing circuit 41 detects a coordinate set representing the position of an area in the taken image which matches a predetermined condition on an area-by-area basis. In the following description, a coordinate set detected by the image processing circuit 41 will sometimes be referred to as a "marker coordinate set".

Hereinafter, an overview of processing of calculating an inclination of the controller 7 will be described. In this embodiment, an inclination of the controller 7 regarding the rotation around the Z' axis will be calculated.

In this embodiment, the game apparatus 3 first calculates two types of inclinations of the controller 7 using two different methods. According to a first method, an inclination of the controller 7 is calculated from information obtained by the imaging information calculation section 35 (taken image). According to a second method, an inclination of the controller 7 is calculated from information obtained by the acceleration sensor 37 (acceleration data). The game apparatus 3 uses the two types of inclinations obtained by two methods to calculate a final inclination of the controller 7 which is to be used for a game operation.

In this embodiment, a direction of the inclination of the controller 7 is represented as a vector. In the following description, a vector representing the inclination obtained by the first method will be referred to as a "first vector", and a vector representing the inclination obtained by the second method will be referred to as a "second vector". The game apparatus 3 calculates a final inclination of the controller 7 using the first vector and the second vector. In the following description, the vector which is used for a game operation as a vector representing an inclination of the controller 7 will be referred to as an "output vector". In this embodiment, processing of calculating the first vector and the second vector, and processing of calculating the output vector using the first vector and the second vector, are executed frame by frame.

Figure 12:
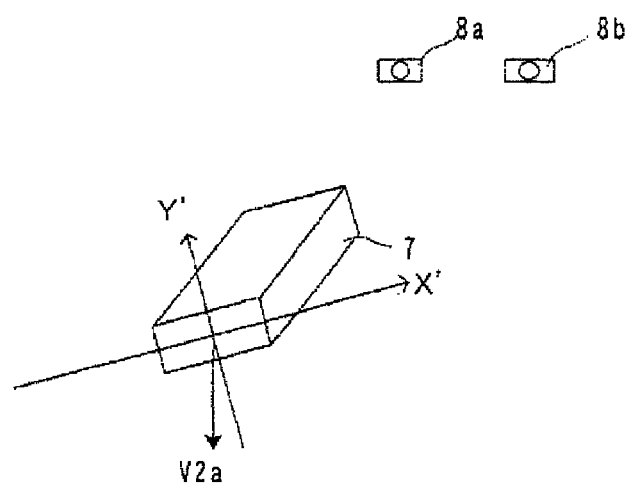
FIG. 12 shows the controller 7 in an inclined state as a result of being rotated around the Z' axis.
Figure 13:
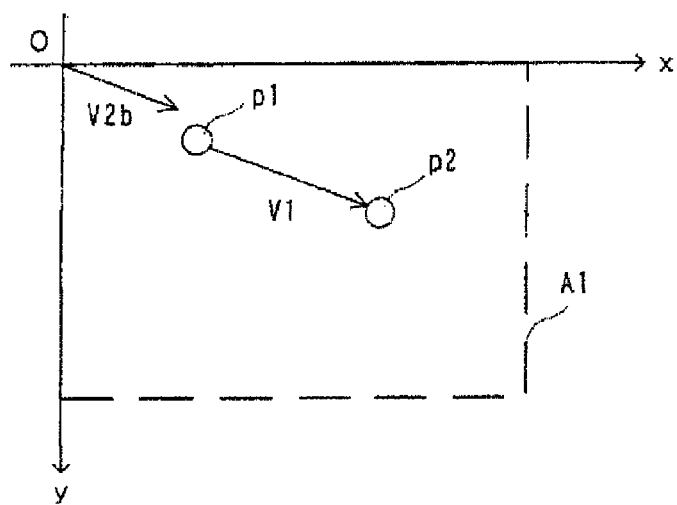
FIG. 13 shows a first vector and a second vector obtained in a state shown in FIG. 12.

With reference to FIG. 11 through FIG. 13, processing of calculating a first vector by the first method will be described. In the taken image shown in FIG. 11, point p1 and point 2 each represent the position of a marker image on the x-y plane. In the following description, a coordinate set representing the position of a marker image will be referred to as a "marker coordinate set". In this embodiment, data representing a marker coordinate set is transmitted from the controller 7 to the game apparatus 3. When the images of the markers 8a and 8b are properly taken, data on two marker coordinate sets (in the example of FIG. 11, a coordinate set representing point p1 and a coordinate set representing point p2) is transmitted.

Upon obtaining the two marker coordinate sets, the game apparatus 3 calculates a vector V1 connecting the two marker coordinate sets. The calculated vector V1 is the first vector. The first vector V1 has one of the two marker coordinate sets as a start point and the other marker coordinate set as an end point. The first vector V1 represents an inclination of the controller 7 regarding the rotation around the Z' axis (see FIG. 7). For example, in the case where the direction connecting the markers 8a and 8b is parallel to the X' axis of the controller 7, the first vector V1 is parallel to the x axis as shown in FIG. 11. FIG. 12 shows the controller 7 in an inclined state as a result of being rotated around the Z' axis. As shown in FIG. 12, in the case where the X' axis of the controller 7 is inclined at a predetermined angle with respect to the direction connecting the markers 8a and 8b, the game apparatus 3 obtains coordinate set data on points p1 and p2 as shown in FIG. 13 from the controller 7. FIG. 13 shows a first vector and a second vector obtained in the state shown in FIG. 12. As shown in FIG. 13, the first vector V1 represents a direction inclined at the predetermined angle with respect to the x axis. Since the direction of the first vector V1 varies in accordance with the inclination of the controller 7 regarding the rotation around the Z' axis, the inclination of the controller 7 regarding the rotation around the Z' axis can be found based on the first vector V1.

Next, with reference to FIG. 12 and FIG. 13, processing of calculating a second vector by the second method will be described. In the case where the controller 7 is in the state of FIG. 12, a vector representing an acceleration detected by the acceleration sensor 37 is a vector V2a shown in FIG. 12. In this embodiment, acceleration data representing the vector V2a is transmitted from the controller 7 to the game apparatus 3. The vector V2a is a three-dimensional vector represented in the X'-Y'-Z9' coordinate system.

Upon obtaining the vector V2a from the controller 7, the game apparatus 3 converts the vector V2a into a vector of the x-y coordinate system. The game apparatus 3 also calculates a second vector V2b using the post-conversion vector. In this embodiment, the second vector V2b is calculated using a second vector calculated previously (previous second vector) and the vector of the x-y coordinate system converted from the vector V2a obtained currently by the acceleration sensor 37. In this specification, the term "previous" means "immediately previous". The processing of calculating the second vector V2b will be described in detail later (see FIG. 17 and FIG. 18). When, for example, the vector V2a shown in FIG. 12 is detected by the acceleration sensor 37, the second vector obtained by the conversion is the vector V2b shown in FIG. 13. When the detection by the imaging information calculation section 35 and the detection by the acceleration sensor 37 are accurate, the first vector V1 and the second vector V2b are directed in the same direction as shown in FIG. 13.

The first method and the second method have the following characteristics. The first method is advantageous in being able to calculating an inclination more accurately than the second method, but is disadvantageous in occasionally not being able to calculate the first vector. The first vector cannot be calculated when, for example, the position and the posture of the controller 7 are not in the detectable range; sunlight, light from a fluorescent lamp in the room or other light displayed on the monitor 2 is incorrectly recognized as the light from the markers 8a and 8b; or the controller 7 is too far from the markers 8a and 8b to detect the light from the markers 8a and 8b. In these cases, the marker coordinate sets are not detected, only one marker coordinate set is detected, or three or more marker coordinate sets are detected. Therefore, the game apparatus 3 cannot calculate the first vector V1.

The second method is advantageous in being able to constantly calculate the second vector V2b because the acceleration sensor 37 always outputs acceleration data, but is disadvantageous in being lower in terms of precision of the detected inclination than the first method. For example, when the controller 7 is being moved by the player, the acceleration detected by the acceleration sensor 37 includes other acceleration components caused by an inertial force in addition to the acceleration of gravity. When such an acceleration is detected, the inclination cannot be accurately calculated.

In this embodiment, the game apparatus 3 calculates an output vector using the first vector V1 and the second vector V2b in consideration of the advantages and the disadvantages of the first method and the second method. Specifically, when the first vector V1 is calculated, the output vector is calculated based on the first vector V1. When the first vector V1 is not calculated, the output vector is calculated based on the second vector V2b. With this method, when the first vector is calculated, the inclination of the controller 7 is accurately calculated, whereas when the first vector is not calculated, the inclination of the controller 7 is calculated using the second vector V2b so as to avoid the situation where the inclination is not calculated.

Figure 14:
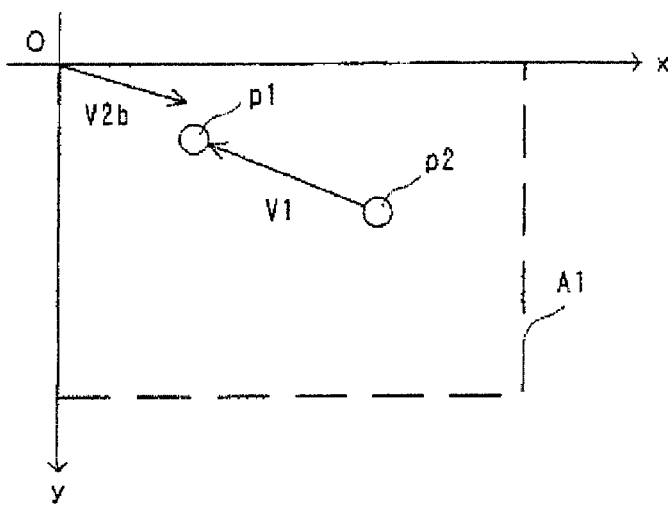
FIG. 14 shows a first vector V1 and a second vector V2b in one state.

Also in the first embodiment, when the first vector V1 is calculated, the game apparatus 3 compares the first vector V1 and the second vector V2b and corrects the first vector V1 in accordance with the comparison result, instead of simply setting the first vector V1 as the output vector. Specifically, when the directions of the first vector V1 and the second vector V2b are opposite to each other, the first vector V1 is corrected to be directed in the opposite direction. FIG. 14 shows the first vector V1 and the second vector V2b in one state. In the state shown in FIG. 14, the directions of the first vector V1 and the second vector V2b are different from each other by 180°. In this case, the game apparatus 3 corrects the vector V1 so as to be directed in the opposite direction and sets the post-correction vector as the output vector.

The first vector V1 is corrected based on the comparison result for the following reason. With the first method, the first vector V1 may possibly be directed in the opposite direction to a vector corresponding to the direction of the actual inclination of the controller 7. With the first method, a vector connecting the two marker coordinate sets is set as the first vector V1. When each of the two marker coordinate sets is incorrectly recognized as the start point or the end point, the direction of the first vector V1 is different from the accurate direction by 180°. By contrast, the second vector V2b calculated by the second method may not possibly correspond to the actual inclination of the controller 7 strictly accurately, but usually is not directed in the opposite direction. Therefore, in this embodiment, when the direction of the second vector V2b and the direction of the first vector V1 are significantly different (by an angle close to 180 °; for example, 90° to 270 °), the direction of the first vector V1 is regarded as being opposite to the actual direction. The first vector V1 is corrected so as to be directed oppositely. Thus, the first vector V1 can be calculated more accurately, and as a result, the inclination of the controller 7 can be more accurately calculated.

Figure 15:
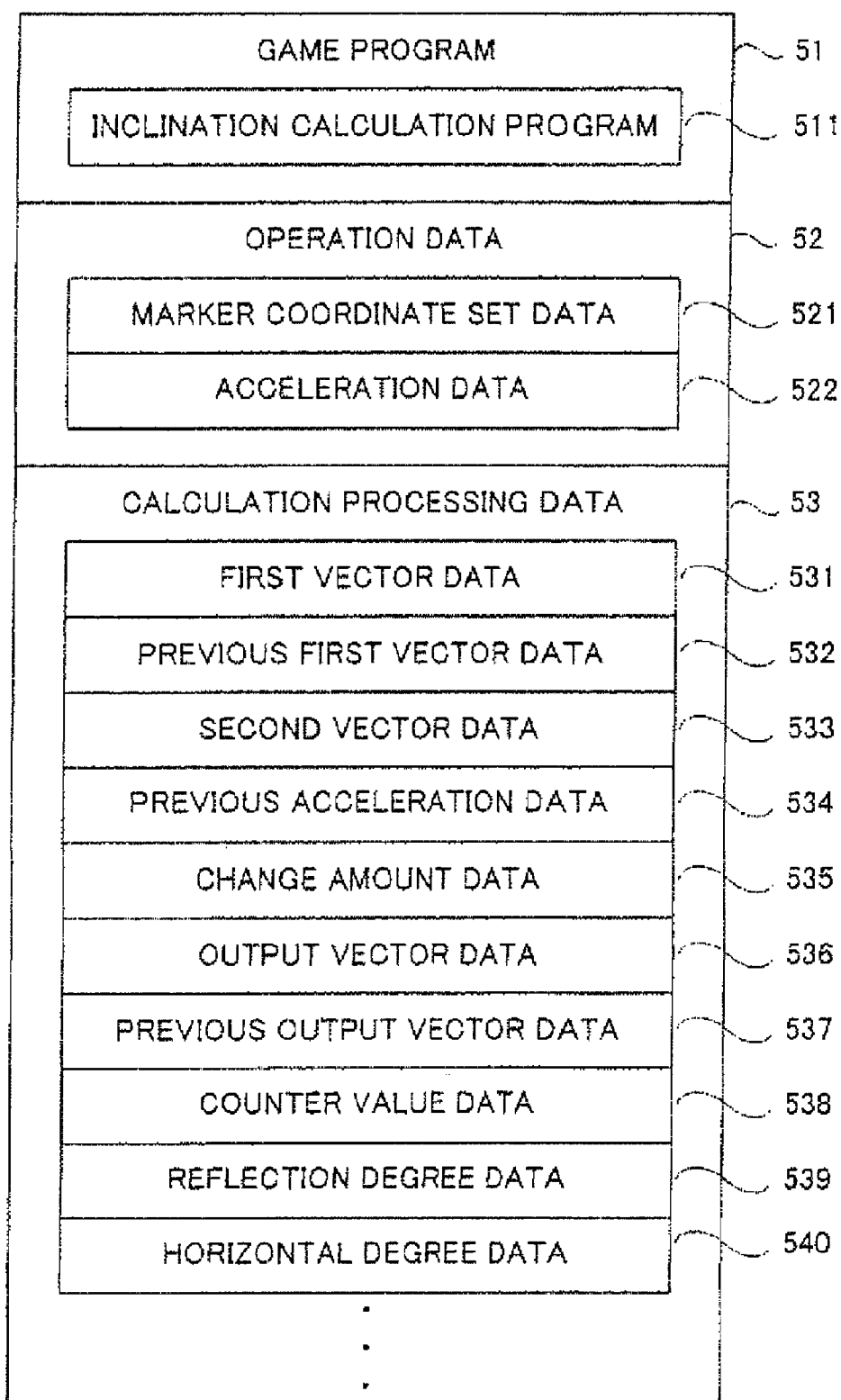
FIG. 15 shows main data stored on a main memory 13 of the game apparatus 3.

Next, the game processing executed by the game apparatus 3 will be described in detail. First, main data used for the game processing will be described with reference to FIG. 15. FIG. 15 shows main data stored on the main memory 13 of the game apparatus 3. As shown in FIG. 15, the main memory 13 has stored thereon a game program 51, operation data 52, calculation processing data 53 and the like. In addition to the above-mentioned data, the main memory 13 has stored thereon image data of characters appearing in the game, data representing various parameters of the characters, and other data necessary for the game processing.

The game program 51 is partially or entirely read from the optical disc 4 at an appropriate time after the game apparatus 3 is powered on and stored on the main memory 13. The game program 51 includes an inclination calculation program 511. The inclination calculation program 511 is a program for executing the processing of calculating an inclination of the controller 7 (the inclination calculation processing) using an output from the imaging information calculation section 35 and an output from the acceleration sensor 37. The game program 51 includes programs necessary for the game processing in addition to the inclination calculation program 511.

The operation data 52 is transmitted from the controller 7 to the game apparatus 3 and stored on the main memory 13. The operation data 52 includes marker coordinate set data 521 and acceleration data 522. The marker coordinate set data 521 represents a coordinate set detected by the image processing circuit 41, i.e., a marker coordinate set mentioned above. As described above, there is no limitation on the number of marker coordinate sets detected. Therefore, the marker coordinate set data 521 may represent a plurality of marker coordinate sets, may represent only one marker coordinate set, or may represent there is no marker coordinate set.

The acceleration data 522 represents an acceleration vector detected by the acceleration sensor 37. Herein, the acceleration data 522 represents an acceleration in three axial directions (X'-, Y'-, and Z'-axis directions) shown in FIG. 7. In addition to the marker coordinate set data 521 and the acceleration data 522, the operation data 52 includes data representing operations performed on the buttons and switches of the operation section 32.

The calculation processing data 53 is used for processing of calculating an output vector (steps S3 through S5 described later). The calculation processing data 53 includes first vector data 531, previous first vector data 532, second vector data 533, previous acceleration data 534, change amount data 535, output vector data 536, previous output vector data 537, counter value data 538, reflection degree data 539, and horizontal degree data 540.

The first vector data 531 represents a first vector described above. The first vector is basically calculated frame by frame, but may not be calculated as a result of the game apparatus 3 failing to calculate the first vector depending on the content of the marker coordinate set. The first vector data 531 is updated each time a new first vector is calculated so as to constantly represent the latest first vector. The previous vector data 532 is used in a second embodiment described later, and represents a first vector calculated previously. When a new first vector is calculated and the first vector data 531 is updated, the pre-update first vector is stored on the main memory 13 as the updated previous first vector data 532.

The second vector data 533 represents a second vector described above. The second vector V2*b* is calculated frame by frame. The second vector 533 is updated each time a new second vector is calculated so as to constantly represent the latest second vector.

The previous acceleration data 534 represents an acceleration data calculated previously. When new operation data is transmitted from the controller 7 to the game apparatus 3 and the acceleration data 522 is updated, acceleration data calculated previously is stored on the main memory 13 as the updated previous acceleration data 534 to be used in the next frame for calculating a vector.

The change amount data 535 represents a change amount from the acceleration detected by the acceleration sensor 37 previously to the acceleration detected by the acceleration sensor 37 currently. Specifically, in this embodiment, the change amount data 535 represents a change amount of the direction of the acceleration. This change amount indicates a degree of reliability of an output from the acceleration sensor 37, i.e., a degree of accuracy of the inclination represented by the output from the acceleration sensor 37 to the actual inclination of the controller 7.

The output vector data 536 represents an output vector described above. The output vector is calculated frame by frame. The output vector data 536 is updated each time a new output vector is calculated so as to constantly represent the latest output vector.

The counter value data 538 is used in the second embodiment, and represents a counter value which indicates the number of frames from the calculation state of the first vector was changed. The expression that "the calculation state of the first vector is changed" means that the first vector was calculated previously but is not calculated currently, or the first vector was not calculated previously but is calculated currently.

The reflection degree data 539 is used in the second embodiment, and represents a degree at which the vector calculated previously is to be reflected on the vector calculated currently (reflection degree). The reflection degree is calculated based on the counter value.

The horizontal degree data is used in a third embodiment described later, and represents a degree at which the controller 7 is in a horizontally direction (horizontal degree). Herein, the state in which the controller 7 is in a horizontal direction is a state in which the negative Y'-axis direction of the controller 7 (FIG. 7) matches the direction of the acceleration of gravity.

The previous vector data 532, the counter value data 538, the reflection degree data 539 and the horizontal degree data 540 are used in the second or third embodiment, and do not need to be stored on the main memory 13 in the first embodiment.

Figure 16:
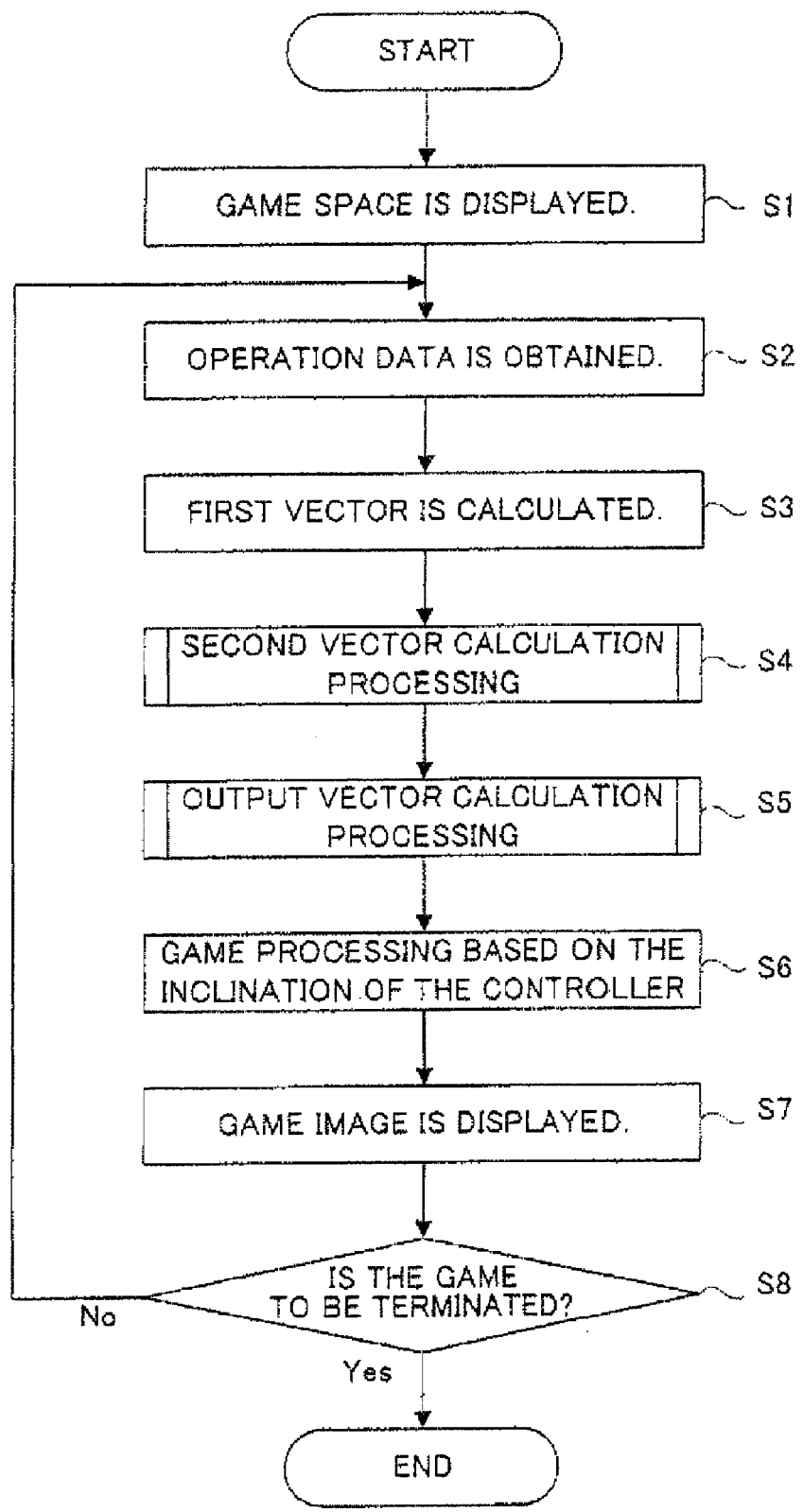
FIG. 16 is a flowchart illustrating a flow of game processing executed by the game apparatus 3.

Next, the game processing executed by the game apparatus 3 will be described in detail with reference to FIG. 16 through FIG. 19. FIG. 16 is a flowchart illustrating a flow of the game processing executed by the game apparatus 3. When the game apparatus 3 is turned on, the CPU 10 of the game apparatus 3 executes a start program stored on the boot ROM (not shown) to initialize each unit such as the main memory 13. The game program stored on the optical disc 4 is read into the main memory 13, and the CPU 10 starts the execution of the game program. The flowchart shown in FIG. 16 illustrates the game processing after the above-described processing is completed. With reference to FIG. 16, the game processing for calculating an inclination of the controller 7 from a taken image obtained from the imaging information calculation section 35 and an acceleration detected by the acceleration sensor 37 will be explained in detail, and other game processing not directly relevant to the present invention will be omitted.

First in step S1, a game space is constructed and displayed an the monitor 2. The CPU 10 constructs, for example, a three-dimensional game space (or a two-dimensional game space) and locates objects appearing in the game space at predetermined initial positions. A game image representing the game space thus constructed is generated and displayed on the monitor 2. After this, the processing loop of steps S2 through S8 is repeated frame by frame, and thus the game proceeds.

In step S2, the CPU 10 obtains operation data from the controller 7. More specifically, the controller 7 transmits the operation data to the game apparatus 3 at a predetermined time interval (for example, frame by frame), and the CPU 10 stores the transmitted operation data on the main memory 13. In the case where the operation data includes marker coordinate set data, the CPU 10 stores the marker coordinate set data on the main memory 13. In the case where the operation data includes acceleration data, the CPU 10 stores the acceleration data on the main memory 13.

After step S2, the CPU 10 executes the inclination calculation program 511 to execute steps S3 through S5. First in step S3, a first vector is calculated based on the marker coordinate set data 521 stored on the main memory 13. When two marker coordinate sets are detected (when the marker coordinate set data 521 represents two marker coordinate sets), the CPU 10 calculates a vector, having one of the marker coordinate sets as a start point and the other marker coordinate set as an end point, as a first vector. Which of the two marker coordinate sets is to be the start point of the vector and which is to be the end point of the vector may be determined in accordance with a predetermined condition. The predetermined condition is, for example, that the marker coordinate set having a smaller x coordinate value is set as the start point. Alternatively, the marker coordinate set closer to the start point of the previous output vector may be set as the start point. Data representing the calculated first vector is stored on the main memory 13 as the updated first vector 531. The pre-update first vector is stored on the main memory 13 as the updated previous vector data 532.

In this embodiment, when the number of the detected marker coordinate sets is not two (i.e., when zero marker coordinate set, one marker coordinate set, or three or more marker coordinate sets are detected), the CPU 10 determines that it is impossible to calculate a first vector. In this case, the first vector data 531 is updated to indicate that the first vector could not be calculated. Like in the case where two marker coordinate sets are detected, the pre-update first vector data is stored on the main memory 13 as the updated previous vector data 532.

In this embodiment, the first vector is calculated from two marker coordinate sets. The first vector may be calculated by another method. As the method for calculating the first vector, any method using at least a marker coordinate set is usable. For example, the first vector may be calculated using the marker coordinate set data and also acceleration data which is an output from the acceleration sensor 37. More specifically, according to one usable method, when only one marker coordinate set is detected, another marker coordinate set is estimated using the acceleration data. The two marker coordinate sets thus obtained are used to calculate the first vector. When three or more marker coordinate sets are detected, two marker coordinate sets which fulfill a predetermined condition regarding a distance between the marker coordinate sets or the like are selected from the three or more marker coordinate sets. The two marker coordinate sets thus obtained may be used to calculate the first vector.

Figure 17:
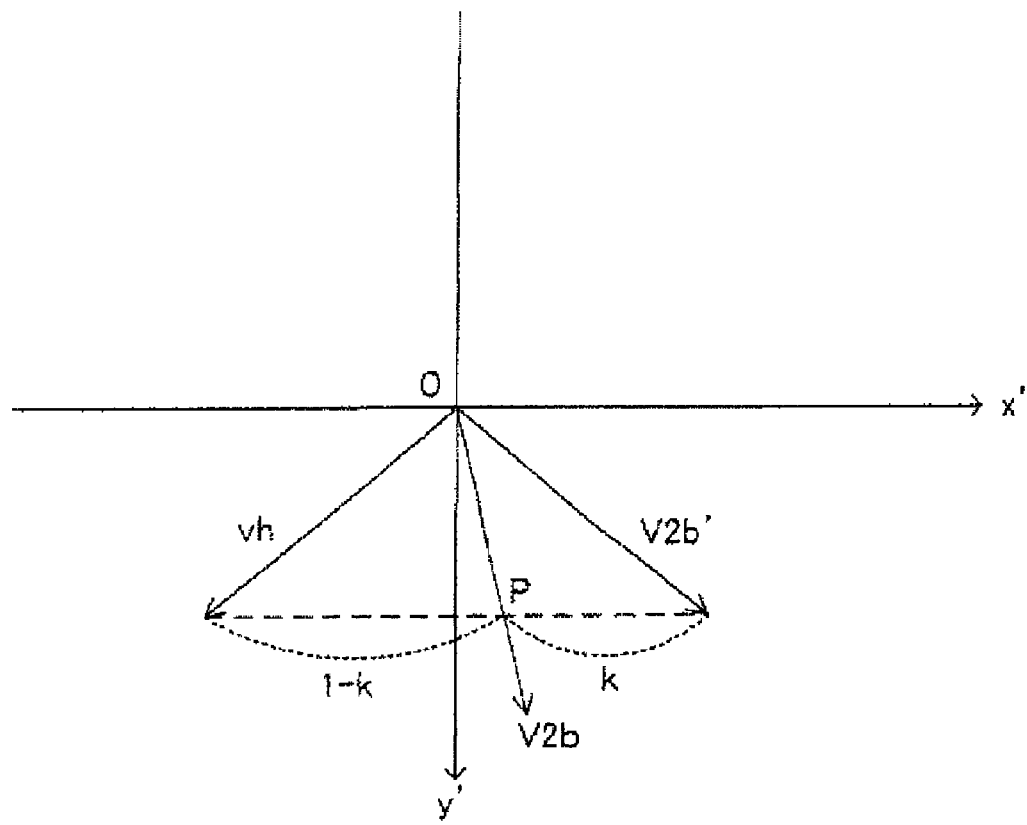
FIG. 17 illustrates second vector calculation processing.
Figure 18:
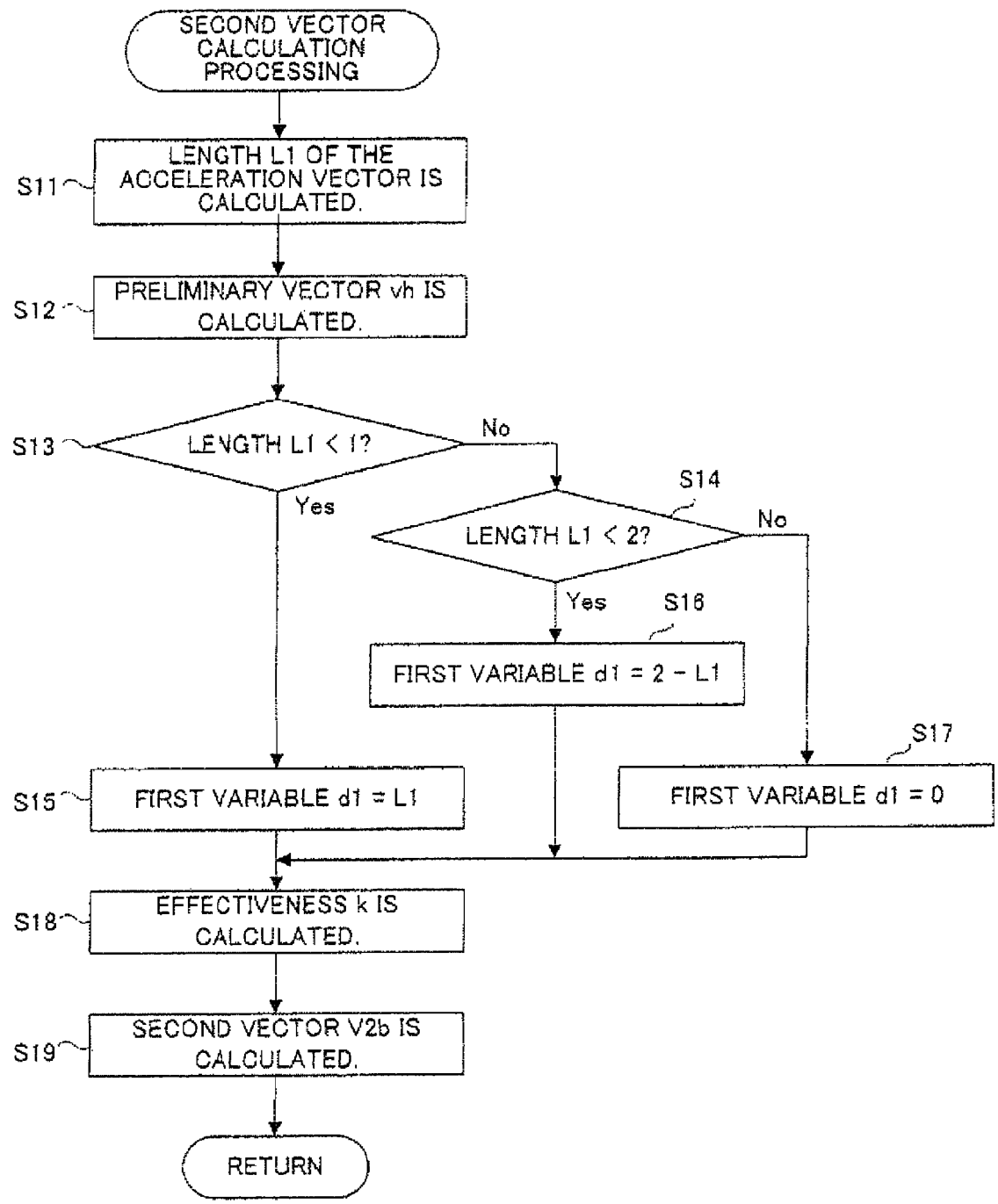
FIG. 18 is a flowchart illustrating a detailed flow of the second vector calculation processing in step S4 shown in FIG. 16.

Next in step S4, second vector calculation processing is executed. By the second vector calculation processing, a second vector is calculated based on the acceleration data 522 included in the operation data 52 stored on the main memory 13 in step S2. With reference to FIG. 17 and FIG. 18, the second vector calculation processing will be described.

First, with reference to FIG. 17, an overview of the second vector calculation processing will be described. FIG. 17 illustrates the second vector calculation processing. The second vector calculation processing is executed as follows. The game apparatus 3 first calculates a preliminary vector vh from an acceleration vector V2a detected by the acceleration sensor 37. The preliminary vector vh indicates an inclination of the controller 7 represented by the acceleration vector itself. Specifically, the preliminary vector vh is obtained by extracting an X'-axis component and a Y'-axis component of the acceleration vector V2a and performing predetermined coordinate set conversion on the extracted two-dimensional vector so as to provide a vector of the x-y coordinate system (see FIG. 11). The preliminary vector vh is represented in the x-y coordinate system, and has the origin of the x-y coordinate system as a start point. The preliminary vector vh is a unit vector having a length of 1. The preliminary vector vh is uniquely determined from the acceleration vector. The preliminary vector vh represents an inclination of the controller 7 under an assumption that the acceleration vector represents the acceleration of gravity (an assumption that the acceleration vector is directed in the direction of the acceleration of gravity).

The reason why only the X'-axis component and the Y'-axis component of the acceleration vector V2a are extracted is as follows. In the first embodiment, it is intended to calculate an inclination of the controller 7 regarding the rotation around the Z' axis (in the X'-Y' directions), and therefore a Z'-axis component is not necessary. The reason why predetermined coordinate set conversion is performed on the extracted two-dimensional vector is that a vector corresponding to the acceleration vector is to be displayed as a vector having the same direction as the first vector in an ideal state, in the same coordinate system as the first vector. By using the same coordinate system to process the first vector and the second vector in this manner, processing of calculating an output vector using the first vector and the second vector is facilitated.

After calculating the preliminary vector vh, the game apparatus 3 calculates a second vector V2b (see FIG. 17) based on the preliminary vector vh and the previous second vector V2b'. Like the preliminary vector vh, the second vector V2b and the previous second vector V2b' are both a unit vector having a length of 1, and have the origin of the x-y coordinate system as a start point. As shown in FIG. 17, the second vector V2b is obtained by making the direction of the previous second vector V2b' closer to the direction of the preliminary vector vh at a predetermined degree. In the following description, the predetermined degree will be represented as an effectiveness k ($0 \leq k \leq 1$). Specifically, the second vector V2b is directed from the origin toward point P and has a length of 1. Point P divides a line segment connecting the end point of the previous second vector V2b' and the end point of the preliminary vector vh at a ratio of k:(1−k). The effectiveness k is calculated based on the length of the preliminary vector vh. A method for calculating the effectiveness k will be described in detail later.

Hereinafter, with reference to FIG. 18, the second vector calculation processing will be described in detail. FIG. 18 is a flowchart illustrating a detailed flow of the second vector calculation processing in step S4 shown in FIG. 16. The second vector calculation processing is executed as follows. First in step S11, a length L1 regarding X' and Y' components of the acceleration data V2a detected by the acceleration sensor 37 is calculated. When the acceleration vector V2a is (ax, ay, az), the length L1 is calculated in accordance with the following expression.

$$L1=(ax^2+ay^2)^{1/2}$$

Next in step S12, the preliminary vector vh (see FIG. 17) is calculated. The preliminary vector vh can be calculated from the acceleration vector V2a. The CPU 10 refers to the acceleration data 522 stored on the main memory 13 to calculate components (hx, hy) of the preliminary vector vh in accordance with the following expressions.

$$hx=-ay/L1$$

$$hy=-ax/L1$$

In the above expressions, ax is ax is a value of the X' component of the acceleration vector V2a, and ay is a value of the Y' component of the acceleration vector V2a. The reason why −ay is used for calculating hx and −ax is used for calculating hy in the above expressions is that coordinate set conversion from the coordinate system of the acceleration vector (X'-Y'-Z' coordinate system) into the coordinate system of the first vector (x-y coordinate system) is to be performed. The reason why −ay and −ax are each divided by the length L1 is that the length of the preliminary vector vh is to be 1.

By a series of processing in steps S13 through S17, a first variable d1 is calculated based on the length L1. In the series of processing, the first variable d1 is calculated such that the value of the first variable d1 is greater within the range of $0 \leq d1 \leq 1$ as the length L1 is closer to 1. First in step S13, it is determined whether or not the length L1 is less than 1. When it is determined in step S13 that the length L1 is equal to or greater than 1, processing in step S14 is executed. When it is determined in step S13 that the length L1 is less than 1, processing in step S15 is executed.

In step S14, it is determined whether or not the length L1 is less than 2. When it is determined in step S14 that the length L1 is less than 2, processing in step S16 is executed. When it is determined in step S14 that the length L1 is equal to or greater than 2, processing in step S17 is executed.

In step S15, the value of the length L1 is set as the value of the first variable d1. In step S16, the first variable d1 is calculated in accordance with the following expression.

$$d1=2-L1$$

In step S17, the value of the length L1 is set to "0". As shown in steps S15 through S17, the first variable d1 represents a closeness of the length L1 to 1. The first variable is represented within the range of $0 \leq d1 \leq 1$. Therefore, when the length L1 is equal to or greater than 2, the value of the first variable d1 is set to 0. After step S15, S16 or S17, processing in step S18 is executed.

In step S18, an effectiveness k is calculated based on the first variable d1. As described above, the effectiveness k is a variable representing a degree at which the direction of the previous second vector V2b' is made closer to the direction of the preliminary vector vh for calculating a second vector V2b.

Specifically, the CPU 10 calculates the effectiveness k in accordance with the following expression.

$$k=d1^2 \times A$$

In the above expression, A (>0) is a constant predetermined in the inclination calculation program 511. Data representing constant A is stored on the main memory 13 in advance. As can be appreciated from the above expression, the effectiveness k is greater in the range of $0 \leq k \leq 1$ as the value of the first variable d1 is greater.

Next in step S19, a second vector V2b is calculated. In this embodiment, the second vector V2b is calculated using the preliminary vector vh, the previous second vector V2b', and the effectiveness k. Specifically, the CPU 10 first calculates a vector (ahx', ahy') in accordance with the following expressions.

$$ahx'=(hx-bhx) \times k+bhx$$

$$ahy'=(hy-bhy) \times k+bhy$$

In the above expressions, the preliminary vector vh is (hx, hy) and the previous second vector V2b' is (bhx, bhy). The vector (ahx', ahy') calculated by the above expressions is directed in the same direction as the second vector V2b. Next, the CPU 10 corrects the above-calculated vector into a unit vector in accordance with the following expressions, thus to calculate the second vector V2b (=(ahx, ahy)).

$$ahx=ahx'/((ahx'^2+ahy'^2)^{1/2})$$

$$ahy=ahy'/((ahx'^2+ahy'^2)^{1/2})$$

The second vector V2b is calculated by the above expressions. The CPU 10 stores data representing the calculated second vector on the main memory 13 as the updated second data 533. After step S19, the CPU 10 terminates the second vector calculation processing.

In this embodiment, the second vector is calculated using the acceleration vector detected by the acceleration sensor 37 and the previous second vector. In other embodiments, the second vector may be calculated by any method using the acceleration vector. For example, the second vector may be calculated using only the acceleration vector. Specifically, a vector obtained by performing the above-described coordinate set conversion on the acceleration vector, i.e., the preliminary vector, may be used as the second vector.

Returning to FIG. 16, in step S5, output vector calculation processing is executed. The output vector calculation processing is executed for calculating an output vector using the first vector and the second vector. Hereinafter, with reference to FIG. 19, the output vector calculation processing will be described in detail.

Figure 19:
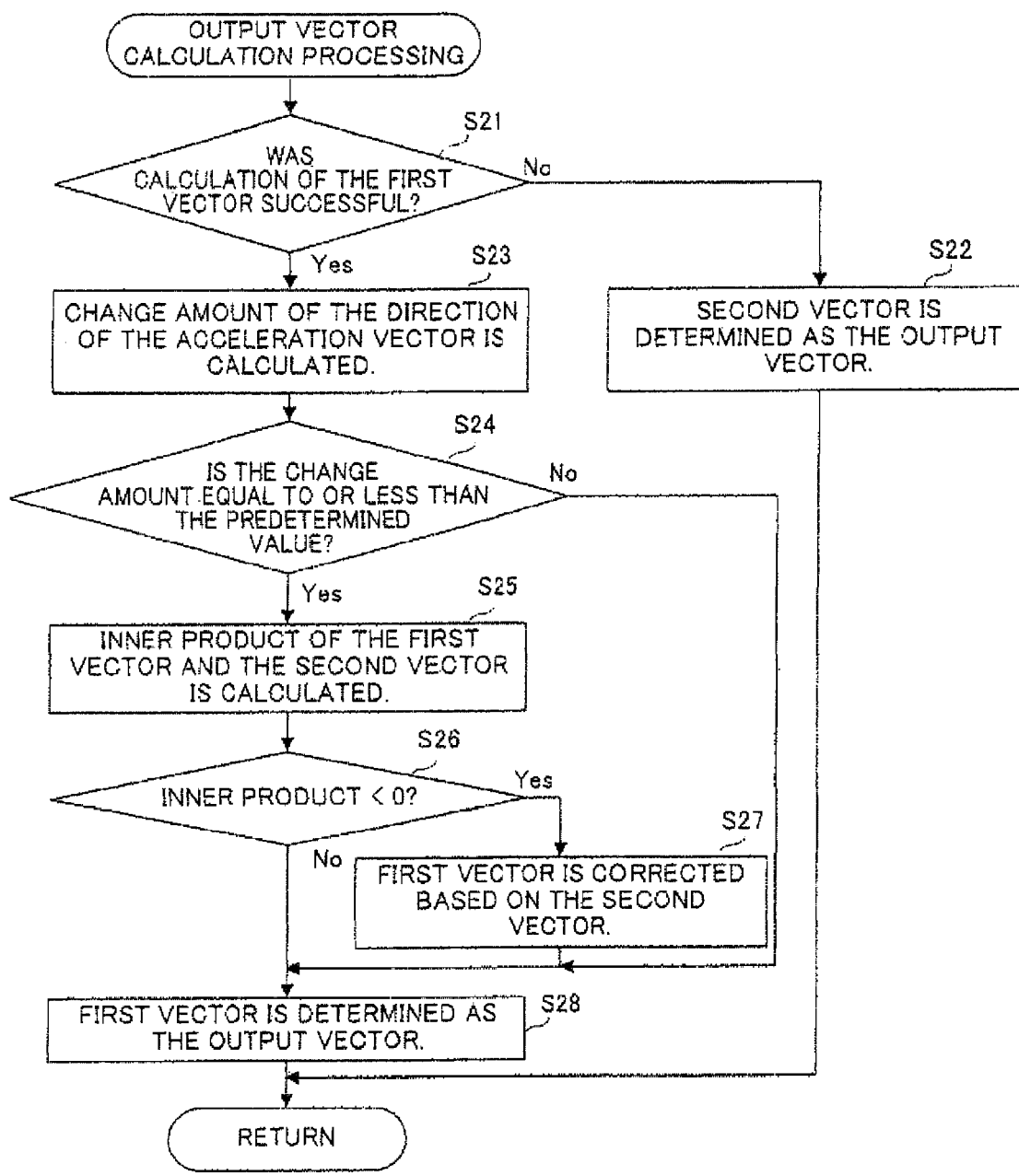
FIG. 19 is a flowchart illustrating a detailed flow of output vector calculation processing in step S5 shown in FIG. 16 in a first embodiment.

FIG. 19 is a flowchart illustrating a detailed flow of the output vector calculation processing in step S5 shown in FIG. 16. The output vector calculation processing is executed as follows. First in step S21, the CPU 10 determines whether or not calculation of the first vector was successful in step S3. The determination in step S21 can be performed by referring to the first vector data 531 stored on the main memory 13. When the first vector data 531 represents a vector value, it is determined that the calculation of the first vector was successful. When the first vector data 531 represents that it was impossible to calculate the first vector, it is determined that the calculation of the first vector was not successful. When it is determined in step S21 that the calculation of the first vector was successful, processing in steps S23 through S28 is executed. By the processing in steps S23 through S28, an output vector is calculated based on the first vector. When it is determined in step S21 that the calculation of the first vector was not successful, processing in step S22 is executed. In step S22, an output vector is calculated using the second vector without using the first vector.

In step S22, the second vector is determined as the output vector. Namely, the CPU 10 updates the content of the output vector data 536 stored on the main memory 13 into the same content as the second vector data 533 and stores the updated content as the output vector data 536. In this embodiment, when the calculation of the first vector was not successful, the second method is selected so that an output vector is calculated using the second vector without using the first vector. After step S22, the CPU 10 terminates the output vector calculation processing.

In this embodiment, the second vector is used as the output vector. In step S22, any method capable of calculating an output vector using the second vector without using the first vector may be used. For example, as in the second embodiment described later, an output vector may be calculated using the second vector and the previous output vector.

In step S23, the CPU 10 calculates a change amount of the direction of the acceleration vector. Specifically, the CPU 10 refers to the acceleration data 522 and the previous acceleration data 534 stored on the main memory 13 to calculate a change amount from the direction of the acceleration detected previously to the direction of the acceleration detected currently. The change amount can be calculated as a magnitude of an angle made by the previous acceleration vector and the current acceleration vector. Data representing the calculated change amount is stored on the main memory 13 as the change amount data 535.

Next in step S24, the CPU 10 determines whether or not the change amount calculated in step S23 is equal to or less than a predetermined value. The predetermined value is determined in advance in the inclination calculation program 511. The determination in step S24 is executed in order to determine whether or not the acceleration detected by the acceleration sensor 37 accurately corresponds to the actual inclination of the controller 7. When it is determined in step S24 that the change amount is equal to or less than the predetermined value, processing in steps S25 through S27 is executed. When it is determined in step S24 that the change amount is greater than the predetermined value, the processing in steps S25 through S27 is skipped and processing in step S28 is executed.

As described above, in this embodiment, when it is determined that the detected acceleration accurately corresponds to the actual inclination of the controller 7 (when the acceleration vector is reliable), the processing in steps S25 through S27 described below is executed. Thus, the first vector is corrected in accordance with the comparison result of the first vector and the second vector. If the processing in steps S25 through S27 is executed when the acceleration vector does not accurately correspond to the actual inclination of the controller 7, the correction performed in steps S25 through S27 is not accurate because the second vector calculated from the acceleration vector is not accurate. In this embodiment, it is determined by steps S23 and S24 whether or not the acceleration vector is reliable, and the processing in steps S25 through S27 is executed only when the acceleration vector is reliable. By such processing, the first vector is not corrected using the second vector when the acceleration vector is inaccurate. As a result, the first vector can be accurately calculated, and thus the output vector can be accurately calculated.

In steps S25 through S27, the first vector and the second vector are compared with each other. In accordance with the comparison result, the first vector is corrected. Specifically, the first vector is corrected in accordance with whether or not the directions of the first vector and the second vector are opposite to each other. First in step S25, an inner product of the first vector and the second vector is calculated. Next in step S26, it is determined whether or not the inner product calculated in step S25 is a negative value. The determination in step S26 is executed in order to determine whether or not the angle made by the first vector and the second vector is in the range of 90° to 270° and thus to determine whether or not the directions of the first vector and the second vector are opposite to each other. In this embodiment, when the angle made by the first vector and the second vector is in the range of 90° to 270°, it is determined that the directions of the first vector and the second vector are opposite to each other. In other embodiments, it may be determined that the directions of the first vector and the second vector are opposite to each other when the angle made by the first vector and the second vector is in the range of, for example, 135° to 225°.

When it is determined in step S26 that the inner product is a negative value, processing in step S27 is executed. In step S27, the first vector is corrected so as to be directed oppositely. The CPU 10 stores data representing the post-correction first vector on the main memory 13 as the first vector data 531. After step S27, processing in step S28 is executed. When it is determined in step S26 that the inner product is equal to or greater than 0, the processing in step S27 is skipped and the processing in step S28 is executed.

In step S28, the first vector is determined as the output vector. Namely, the CPU 10 updates the content of the output vector data 536 stored on the main memory 13 into the same content as the first vector data 531 and stores the updated content as the output vector data 536. In this embodiment, when the first vector was successfully calculated, the first second vector is selected so that an output vector is calculated using the first vector. After step S28, the CPU 10 terminates the output vector calculation processing. By the output vector calculation processing, an inclination of the controller 7 is calculated.

Returning to FIG. 16, in step S6, game processing in accordance with the inclination of the controller 7 calculated in step S5 is executed. Specifically, the output vector data 536 stored on the main memory 13 is transferred (output) to the program for executing the game processing, and the game processing is executed in accordance with the program. The game processing is, for example, processing of moving a player character appearing in the game space in accordance with the inclination.

Next in step S7, a game image reflecting the result of the game processing executed in step S6 is generated and displayed on the monitor 2. Next in step S8, the CPU 10 determines whether or not to terminate the game. The determination in step S8 is made in accordance with, for example, whether or not the player has cleared the game, or when a time limit is provided for the game, whether or not the time has passed. When the result of determination in step S8 is negative, the processing returns to step S2 and the processing loop in steps S2 through S8 is repeated until it is determined that the game is to be terminated. When the result of determination in step S8 is positive, the CPU 10 terminates the game processing shown in FIG. 16. So far, the game processing has been described.

In the game processing shown in FIG. 16, after the second vector is calculated (step S4), it is determined whether or not the first vector was successfully calculated (step S21). In other embodiments, it is first determined whether or not the first vector was successfully calculated, and only when the first vector was not successfully calculated, the second vector may be calculated. Specifically, this may be performed as follows. After step S3 shown in FIG. 16, the processing in step S5 is executed. In step S22 in step S5, the second vector is calculated in the same manner as in step S4. With this method, the processing of calculating the second vector can be omitted when the second vector is not used for calculating the output vector. Therefore, the processing can be simplified, and the load on the game apparatus 3 can be alleviated.

As described above, in this embodiment, a final inclination of the controller 7 is calculated using two types of inclinations obtained by a method using the acceleration sensor 37 (the first method mentioned above) and by a method using the imaging means (the second method mentioned above). Thus, the advantages of the first and the second methods are utilized while the disadvantages thereof are compensated for. Therefore, the inclination of the controller 7 can be calculated accurately and constantly.

In the above embodiment, the change amount of the direction of the acceleration vector is calculated in step S23 in order to determine whether or not the acceleration vector is reliable. In other embodiments, the magnitude of the acceleration vector may be used instead of the change of the direction of the acceleration vector. In this case, in step S24, the CPU 10 determines whether or not a difference between the magnitude of the acceleration vector and the magnitude of the acceleration of gravity is equal to or less than a predetermined value. The acceleration vector is not reliable when, for example, the controller 7 is being violently moved or vibrated. In these cases, the magnitude of the acceleration vector is farther from 1, which is the magnitude of the acceleration of gravity. Thus, by executing the processing in steps S25 through S27 only when the difference between the magnitude of the acceleration vector and the magnitude of the acceleration of gravity is equal to or less than the predetermined value, substantially the same effect as in the above embodiment is provided. In other embodiments, in step S23, the change amount of the value of the acceleration vector may be used. In this case, the reliability of the acceleration vector is determined in accordance with whether or not the change amount of the value of the acceleration vector is equal to or less than a predetermined value. Thus, a change of the direction of the acceleration vector and a change of the magnitude of the acceleration vector can both be reflected on the determination on the reliability.

In the first embodiment, the processing in steps S23 through S27 is executed frame by frame. In other embodiments, the processing in steps S25 through S27 may be executed once every several frames. Alternatively, the processing in steps S25 through S27 may be executed frame by frame (or once every several frames) without executing the processing in steps S23 and S24. In still other embodiments, the processing in steps S25 through S27 may be executed only immediately after the change amount is greater than predetermined value. Specifically, only when the determination result in step S24 is negative in the previous frame and positive in the current frame, the processing in steps S25 through 527 may be executed.

Second Embodiment

Next, a game system including a game apparatus as an example of an inclination calculation apparatus according to the second embodiment of the present invention will be described. The hardware structure of the game system according to the second embodiment is substantially the same as the game system 1 according to the first embodiment. In the second embodiment, the contents of the output vector calculation processing are different from those of the first embodiment. Hereinafter, the second embodiment will be described mainly regarding the differences thereof from the first embodiment.

Figure 20:
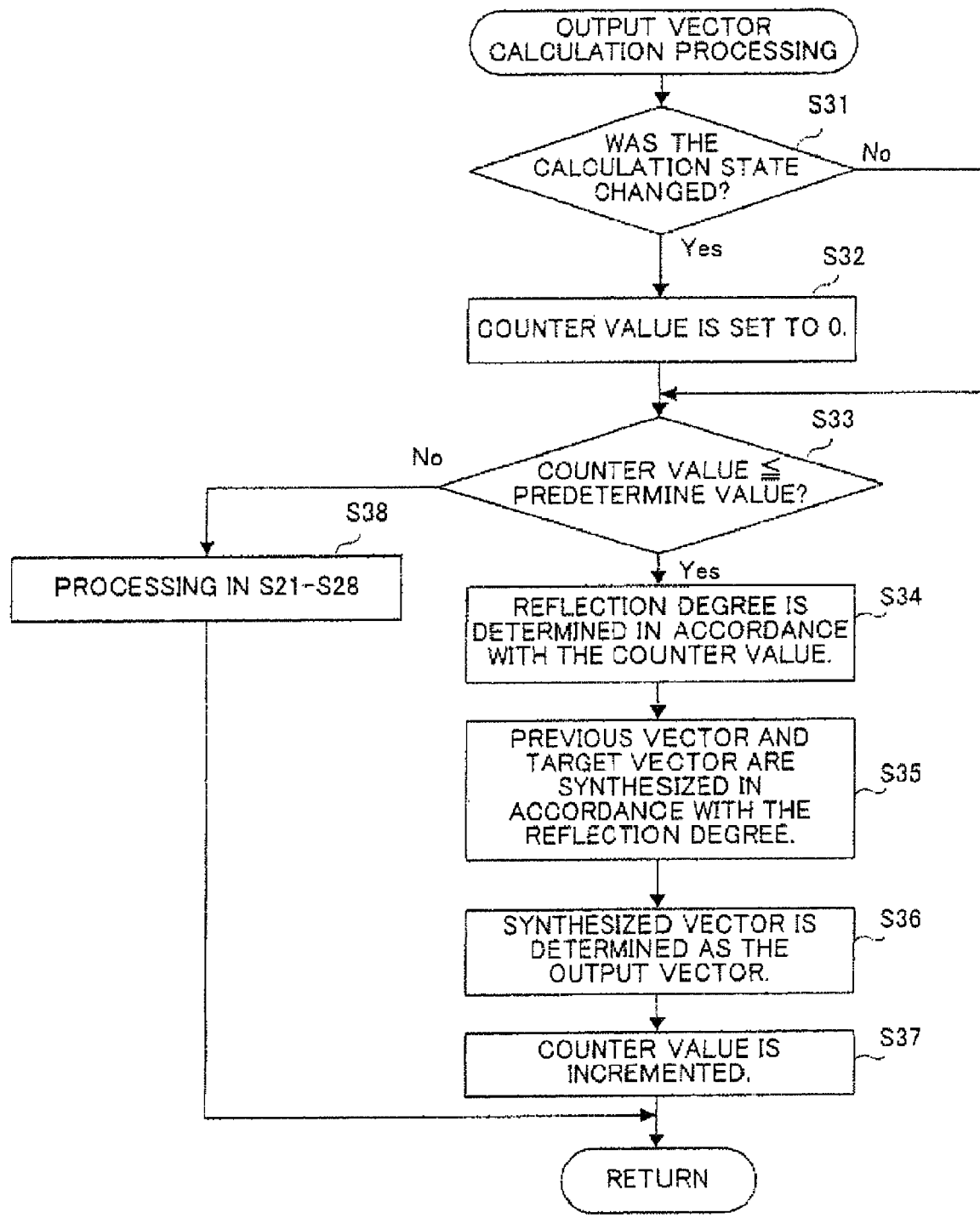
FIG. 20 is a flowchart illustrating a detailed flow of output vector calculation processing executed in a second embodiment.

FIG. 20 is a flowchart illustrating a detailed flow of the output vector calculation processing executed in the second embodiment. Except for the output vector calculation processing, the game processing in the second embodiment is substantially the same as that in the first embodiment.

The output vector calculation processing in the second embodiment is executed as follows. First in step S31, it is determined whether or not the calculation state of the first vector has been changed. As described above, the expression that "the calculation state of the first vector is changed" means that the first vector was calculated previously but is not calculated currently, or the first vector was not calculated previously but is calculated currently. The determination in step S31 is made by referring to the first vector data 531 and the previous first vector data 532 stored on the main memory 13. Specifically, when the first vector data 531 represents that the first vector was not successfully calculated and the previous vector data 532 represents a vector value, or when the first vector data 531 represents a vector value and the previous vector data 532 represents that the first vector was not successfully calculated, the CPU 10 determines that the calculation state of the first vector has been changed. When it is determined in step S31 that the calculation state of the first vector has been changed, processing in step S32 is executed. When it is determined in step S31 that the calculation state of the first vector has not been changed, the processing in step S32 is skipped and processing in step S33 is executed.

In step S32, the counter value is set to 0. Specifically, the CPU 10 updates the content of the counter value data 538 stored on the main memory 13 so as to represent "0" and stores the updated content as the counter value data 538. After step S32, the processing in step S33 is executed.

In step S33, it is determined whether or not the counter value is equal to or less than a predetermined value. The counter value which was set to 0 in step S32 is incremented by one in each frame until exceeding the predetermined value. Therefore, the counter value represents the time after the calculation state of the first vector was changed (time in units of frame). The processing in step S32 is executed in order to start counting the time after the calculation state of the first vector was changed. The processing in step S33 is executed in order to determined whether or not the time has exceeded the predetermined period. When it is determined in step S33 that the counter value is equal to or less than the predetermined value, processing in steps S34 through S37 is executed. When it is determined in step S33 that the counter value is greater than the predetermined value, processing in step S38 is executed.

In step S34, a reflection degree is determined in accordance with the magnitude of the counter value. The CPU 10 refers to the counter value data 538 stored on the main memory 13 to specify the magnitude of the counter value. The reflection degree is determined so as to be greater in the range of 0(%) to 100(%) as the magnitude of the counter value is greater. Data representing the determined reflection degree is stored on the main memory 13 as the reflection degree data 539.

Next in step S35, the CPU 10 synthesizes the previous output vector and a target vector in accordance with the reflection degree. The previous output vector is the output vector calculated in the previous frame, which is represented by the previous output vector data 537 stored on the main memory 13. The target vector is a vector as a target of synthesis. Specifically, when the first vector is calculated, the target vector is the first vector. When the first vector is not calculated, the target vector is the second vector. In other embodiments, when the first vector is the target vector, the first vector may be corrected as in the first embodiment. Namely, the first vector obtained as a result of the processing in steps S23 through S27 may be set as the target vector.

The specific processing in step S35 is substantially the same as the processing in step S18, except that the preliminary vector in step S18 is replaced with the previous output vector, the previous second vector in step S18 is replaced with the target vector, and the effectiveness in step S18 is replaced with the reflection degree. A vector obtained by the synthesis is calculated such that the direction thereof is closer to the direction of the previous output vector as the reflection degree is greater and is closer to the target vector as the reflection degree is smaller. When the reflection degree is 100%, the vector obtained by the synthesis has the same direction as the previous output vector. When the reflection degree is 0%, the vector obtained by the synthesis has the same direction as the target vector.

Next in step S36, the vector obtained in step S35 is determined as the output vector. Specifically, the CPU 10 updates the content of the output vector data 536 stored on the main memory 13 into the content of data on the vector obtained in step S35, and stores the updated content as the output vector data 536.

Next in step S37, the counter value is incremented by 1. Specifically, the CPU 10 updates the content of the counter value data 538 stored on the main memory 13 so as to be increased by 1, and stores the updated content as the counter value data 538. After step S37, the CPU 10 terminates the output vector calculation processing shown in FIG. 20.

In step S38, substantially the same processing as that in steps S21 through S28 shown in FIG. 19 is executed. In the second embodiment, when the counter value is greater than the predetermined value, the output vector is calculated by the same method as in the first embodiment.

As described above, in the second embodiment, the game apparatus 3 starts counting the time when the calculation state of the first vector is changed (step S32). Until the time exceeds a predetermined period, a vector obtained by reflecting the previous output vector is set as the output vector (steps S34 through S36), instead of setting the target vector as the output vector. The output vector is calculated using the previous output vector in order to prevent the direction of the output vector from being drastically changed immediately after the calculation state of the first vector is changed. This will be described in more detail. The first vector and the second vector calculated in one frame do not necessarily have the same value. However, when the calculation state of the first vector is changed, the vector used as the output vector is changed from the first vector to the second vector, or from the second vector to the first vector. Therefore, when the calculation state of the first vector is changed, the direction of the output vector may be possibly changed drastically. In this case, the content of the game processing in accordance with the output vector is also drastically changed (for example, the moving velocity of an object in the game space may be rapidly changed). This may appear unnatural to the player and should be avoided. In the second embodiment, even when the calculation state of the first vector is changed, the output vector is calculated using the previous output vector and the target vector in order to prevent the direction of the output vector from changing drastically. As a result, the change from the previous output vector to the current output vector can be alleviated, and the game processing is prevented from appearing unnatural to the player.

In other embodiments, in step S38, the output vector calculation processing (FIG. 21) in the third embodiment described below may be executed.

Third Embodiment

Next, a game system including a game apparatus as an example of an inclination calculation apparatus according to the third embodiment of the present invention will be described. The hardware structure of the game system according to the third embodiment is substantially the same as the game system 1 according to the first embodiment. In the third embodiment, the contents of the output vector calculation processing are different from those of the first embodiment. Hereinafter, the third embodiment will be described mainly regarding the differences thereof from the first embodiment.

Figure 21:
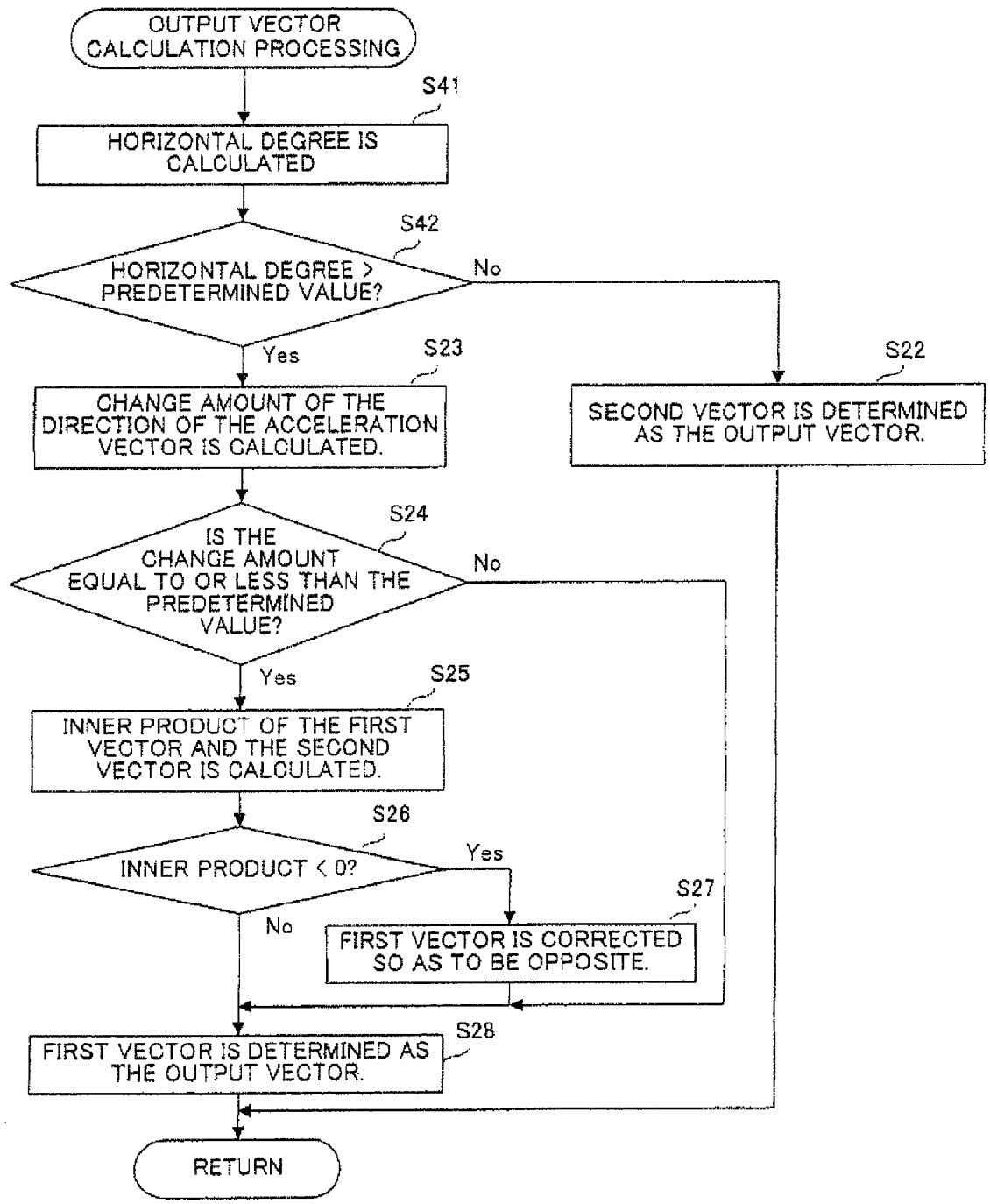
FIG. 21 is a flowchart illustrating a detailed flow of output vector calculation processing executed in a third embodiment.

FIG. 21 is a flowchart illustrating a detailed flow of the output vector calculation processing executed in the third embodiment. Except for the output vector calculation processing, the game processing in the third embodiment is substantially the same as that in the first embodiment. In FIG. 21, identical processing as that in FIG. 19 will bear the same step number and detailed description thereof will be omitted.

The output vector calculation processing in the third embodiment is executed as follows. First in step S41, a horizontal degree is calculated. Specifically, the horizontal degree is calculated based on a length L of the X' component and the Y' component of the acceleration vector detected by the acceleration sensor 37. When the acceleration vector V2a is (ax, ay, az), the length L is calculated in accordance with the following expression.

$$L=(ax^2+ay^2)^{1/2}$$

When the controller 7 is in a horizontal direction and still, the length L is the magnitude of the acceleration of gravity, i.e., "1". Therefore, the horizontal degree is calculated so as to be greater as the length L is closer to 1. For example, the horizontal degree S is calculated in accordance with the following expressions.

$$S=L \text{ (when } L \leq 1)$$

$$S=2-L \text{ (when } 1 \leq L \leq 2)$$

$$S=0 \text{ (when } L>2)$$

The CPU 10 stores data representing the calculated horizontal degree S on the main memory 13 as the horizontal degree data 540.

Next in step S42, it is determined whether or not the horizontal degree S calculated in step S41 is greater than a predetermined value. The processing in step S42 is executed in order to determine whether or not the controller 7 is in a direction close to the horizontal direction. The state in which the controller 7 is in a horizontal direction is a state in which the negative Y'-axis direction of the controller 7 (FIG. 7) matches the direction of the acceleration of gravity. When it is determined in step S42 that the horizontal degree S is greater than the predetermined value, the processing in steps S23 through S28 is executed as in the first embodiment. Namely, an output vector is calculated using the first vector. When it is determined in step S42 that the horizontal degree S is equal to or less than the predetermined value, the processing in step S22 is executed as in the first embodiment. Namely, an output vector is calculated using the second vector.

As described above, in the third embodiment, it is determined whether to calculate the output vector by the first method or by the second method in accordance with whether or not the controller 7 is in a horizontal direction (a direction close to the horizontal direction). In this embodiment, it is preconditioned that the controller 7 is operated, as shown in FIG. 9, in an area in front of the display screen of the monitor 2 or in the vicinity thereof. Accordingly, in the state where the controller 7 is in a substantially horizontal direction, the controller 7 is in the detectable range. However, in the state where the controller 7 is directed upward or downward, the controller 7 is assumed not to be in the detectable range. In this case, the images of the markers 8a and 8b are not taken. Therefore, the first vector cannot be calculated by the first method using the taken image. Even if the first vector is calculated, the calculated first vector is considered to be inaccurate. The reason is that when the controller 7 is directed upward, sunlight or light from a fluorescent lamp in the room, for example, is assumed to be incorrectly recognized as the light from the markers. Therefore, in the third embodiment, when the controller 7 is determined not to be in a horizontal direction ("No" in step S42), the output vector is calculated by the second method. Thus, an inaccurate output vector can be prevented from being calculated as a result of the imaging means incorrectly recognizing something else as the light from the markers.

In other embodiments, both the determination in step S21 in the first embodiment and the determination in step S42 in the third embodiment may be executed. In this case, the game apparatus 3 may calculate the first vector by the first method when the determination results of both of steps S21 and S42 are positive. The game apparatus 3 may calculate the first vector by the second method when the determination result of at least one of steps S21 and S42 is negative.

In the third embodiment, the horizontal degree is calculated based on the magnitude of the acceleration in two axial directions (X'-axis and Y'-axis directions) which are not parallel to the imaging direction of the imaging means. In other embodiments, the horizontal degree may be calculated based on the magnitude of the acceleration of one axial component (Z' component) which is parallel to the imaging direction of the imaging means. The length of the Z' component of the acceleration vector is smaller (closer to 0) as the controller 7 is in a direction closer to the horizontal direction. Therefore, the game apparatus 3 calculates the horizontal degree so as to be greater as the length of the Z' component of the acceleration vector is smaller. In the case where the horizontal degree is calculated using the X' component and the Y' component of the acceleration vector as in the third embodiment, the acceleration sensor 37 only needs to detect an acceleration in only two axial directions (X'-axis and Y'-axis directions). This is advantageous in simplifying the structure of the acceleration sensor 37. In the case where the horizontal degree is calculated using the Z' component, there is an advantage that the horizontal degree is calculated more easily.

The present exemplary embodiments are usable for, for example, a game apparatus or a game program for performing highly precise detection of an inclination of an input device to be used as an operation input while utilizing the advantages of detecting the inclination from an acceleration.

While the exemplary embodiments have been described in detail, the foregoing description is in all aspects illustrative and not restrictive. It is understood that numerous other modifications and variations can be devised without departing from the scope of the invention.

What is claimed is:

1. A method for calculating an inclination of a game apparatus hand-held input device operable in terms of a posture thereof, wherein the input device includes an acceleration sensor for acquiring acceleration data and an imaging element for acquiring an image of one or more specific imaging targets, the method comprising:
   computing first inclination information representing an inclination of the input device based upon a coordinate position of one imaging target in an image acquired by the imaging element and an estimated coordinate position of a second imaging target not acquired by the imaging element, wherein the estimated coordinate position of the second imaging target is determined based on acceleration data acquired by the acceleration sensor;
   computing second inclination information representing an inclination of the input device derived solely from acceleration data acquired by the acceleration sensor; and
   computing an inclination of the input device using the first inclination information and the second inclination information.

2. An apparatus for calculating an inclination of a game apparatus hand-held input device operable in terms of a posture thereof, wherein the input device includes an acceleration sensor for acquiring acceleration data and an imaging element for acquiring an image of one or more specific imaging targets, comprising:
   an information processor for computing first inclination information representing an inclination of the input device based upon a coordinate position of one imaging target in an image acquired by the imaging element and an estimated coordinate position of a second imaging target not acquired by the imaging element, wherein the estimated coordinate position of the second imaging target is determined based on acceleration data acquired by the acceleration sensor;
   an information processor for computing second inclination information representing an inclination of the input device derived solely from acceleration data acquired by the acceleration sensor; and
   an information processor for computing an inclination of the input device using the first inclination information and the second inclination information.

* * * * *